United States Patent [19]

Douceur et al.

[11] Patent Number: 5,995,971
[45] Date of Patent: Nov. 30, 1999

[54] APPARATUS AND ACCOMPANYING METHODS, USING A TRIE-INDEXED HIERARCHY FOREST, FOR STORING WILDCARD-BASED PATTERNS AND, GIVEN AN INPUT KEY, RETRIEVING, FROM THE FOREST, A STORED PATTERN THAT IS IDENTICAL TO OR MORE GENERAL THAN THE KEY

[75] Inventors: John R. Douceur, Bellevue; Ofer Bar, Newcastle; Yoram Bernet, Seattle, all of Wash.

[73] Assignee: Micdrosoft Corporation, Redmond, Wash.

[21] Appl. No.: 08/933,477

[22] Filed: Sep. 18, 1997

[51] Int. Cl.⁶ .................................................. G06F 17/30
[52] U.S. Cl. ............................ 707/102; 707/3; 707/100; 395/200.75; 395/200.48; 395/892
[58] Field of Search ................................ 707/3, 100, 102, 707/536; 326/39, 41, 105; 395/892, 200.75, 200.48; 382/187, 225, 228; 704/8, 257; 370/408

[56] References Cited

U.S. PATENT DOCUMENTS

| | | | |
|---|---|---|---|
| 5,500,609 | 3/1996 | Kean | 326/41 |
| 5,519,858 | 5/1996 | Walton et al. | 707/10 |
| 5,524,254 | 6/1996 | Morgan et al. | 395/200.75 |
| 5,768,632 | 6/1998 | Husted et al. | 395/892 |

OTHER PUBLICATIONS

Aho et al., "Chapter 3—Trees", *Data Structures and Algorithms*, (© 1983, Addison–Wesley Publishing Company, Inc.), pp. 75–106.

Bailey et al., "Pathfinder: A Pattern–Based Packet Classifier", Proceedings of the First Symposium on Operating Systems Design and Implementation (OSDI) USENIX Association, Nov. 14–17, 1994, pp. 115–123.

Bell et al., "Longest–match String Searching for Ziv–Lempel Compression", *Software–Practice and Experience*, vol. 23, No. 7, Jul. 1993, pp. 757–771.

Devroye, "A Note on the Probabilistic Analysis of Patricia Trees", *Random Structures and Algorithms*, vol. 3, No. 2, 1992, pp. 203–214.

(List continued on next page.)

*Primary Examiner*—Thomas G. Black
*Assistant Examiner*—Diane D. Mizrahi
*Attorney, Agent, or Firm*—Michaelson & Wallace; Peter L. Michaelson

[57] ABSTRACT

A technique, specifically apparatus and accompanying methods, which utilizes a trie-indexed hierarchy forest ("rhizome") that accommodates wildcards for retrieving, given a specific input key, a pattern stored in the forest that is identical to or subsumes the key. The rhizome contains a binary search trie and a hierarchy forest. The search trie provides an indexed path to each unique, most specific, pattern stored in a lowest level of the hierarchy forest and also possibly to increasingly general patterns at higher levels in the pattern hierarchy. The hierarchy forest organizes the patterns into nodal hierarchies of strictly increasing generality. For use as a packet classifier, the rhizome stores wildcard-based packet classification patterns at separate corresponding pattern nodes, along with, corresponding "reference" fields associated therewith. Operationally, as each different queue is established or removed, a corresponding classification pattern is either inserted into or removed from the rhizome. A search key is formed for each packet, typically by concatenating classification fields, e.g., source and destination addresses and source and destination port designations, appearing in a header of the packet. The search key is then applied to the rhizome to determine whether that key exists therein, by virtue of either matching an identical classification pattern or being completely subsumed within a more general pattern stored therein. When such a classification is found, the classifier returns the contents of the associated reference field, which for scheduling, is a designation of a transmission queue to which the packet is to be directed.

130 Claims, 20 Drawing Sheets

OTHER PUBLICATIONS

Doeringer et al., "Routing on Longest–Matching Prefixes", *IEEE/ACM Transactions on Networking,* vol. 4, No. 1, Feb. 1996, pp. 86–97.

Knuth, *The Art of Computer Programming, vol. 3–Sorting and Searching,* (©1973, Addison–Wesley Publishing Company, Inc.), pp. 490–499.

McCanne et al., "The BSD Packet Filter: A New Architecture for User–level Packet Capture", Proceedings of the 1993 Winter USENIX Conference, San Diego, California, Jan. 25–29, 1993, pp. 259–269.

Merrett et al., "Dynamic Patricia", Proceedings of the International Conference on Foundations of Data Organization, 1985, pp. 19–29.

Mogul et al., "The Packet Filter: An Efficient Mechanism for User–level Network Code", *Operating Systems Review,* vol. 21, No. 5, 1987, pp. 39–51.

Morrison, "Patricia–Practical Algorithm to Retrieve Information Coded in Alphanumeric", *Journal of the Association for Computing Machinery,* vol. 15, No. 4, Oct. 1968, pp. 514–534.

Wu et al., "Fast Text Searching Allowing Errors", *Communications of the ACM,* vol. 35, No. 10, Oct. 1992, pp. 83–91.

Wu et al., "AGREP–A Fast Approximate Pattern–Matching Tool", Proceedings of the Winter 1992 USENIX Conference, San Francisco, California, Jan. 20–24, 1992, pp. 153–162.

Yuhara et al., "Efficient Packet Demultiplexing for Multiple Endpoints and Large Messages", USENIX–1994 Winter, San Francisco, California, Jan. 17–21, 1994, pp. 153–165.

Zobel et al., "Finding Approximate Matches in Large Lexicons", *Software–Practice and Experience,* vol. 25, No. 3, Mar. 1995, pp. 331–345.

U.S. application No. 08/933,476, Douceur et al., filed Sep. 18, 1997.

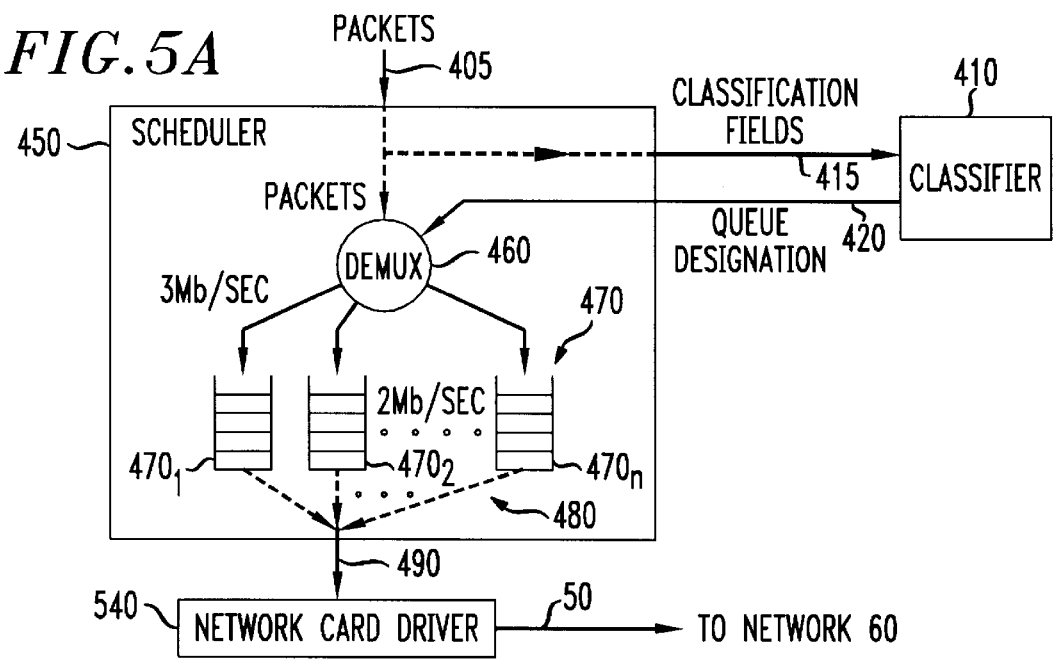
FIG.5A
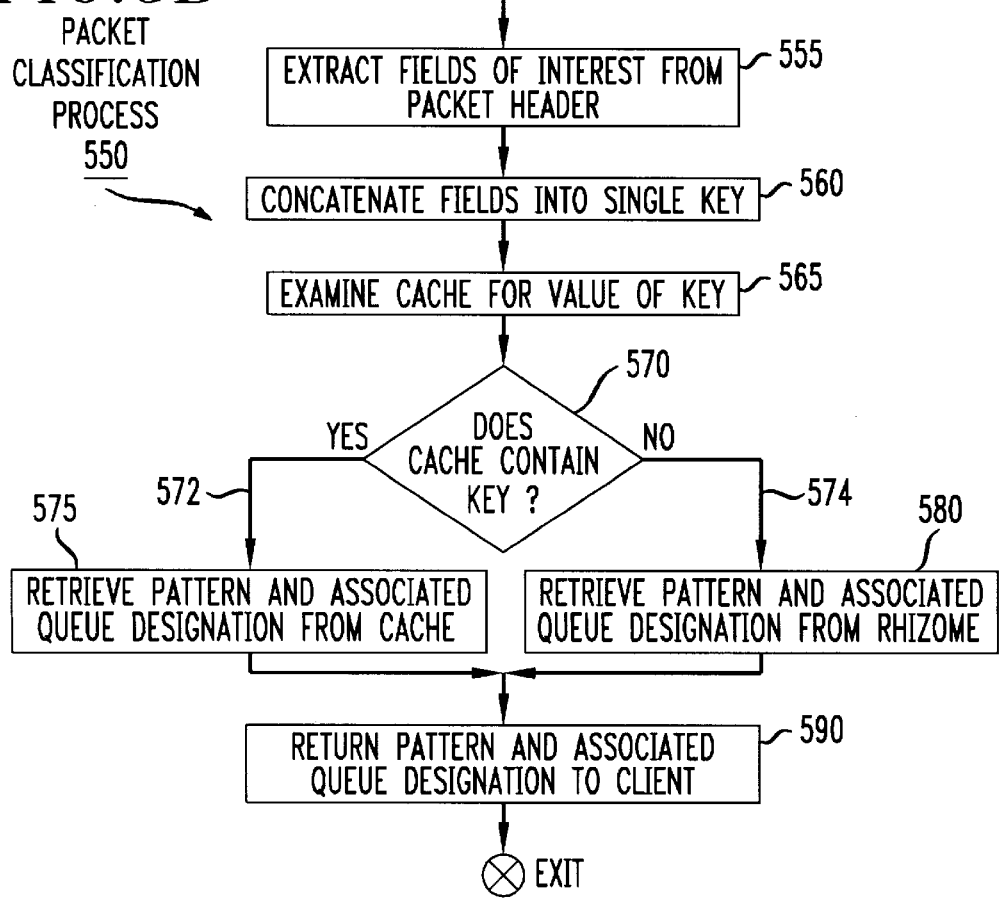
FIG.5B PACKET CLASSIFICATION PROCESS 550

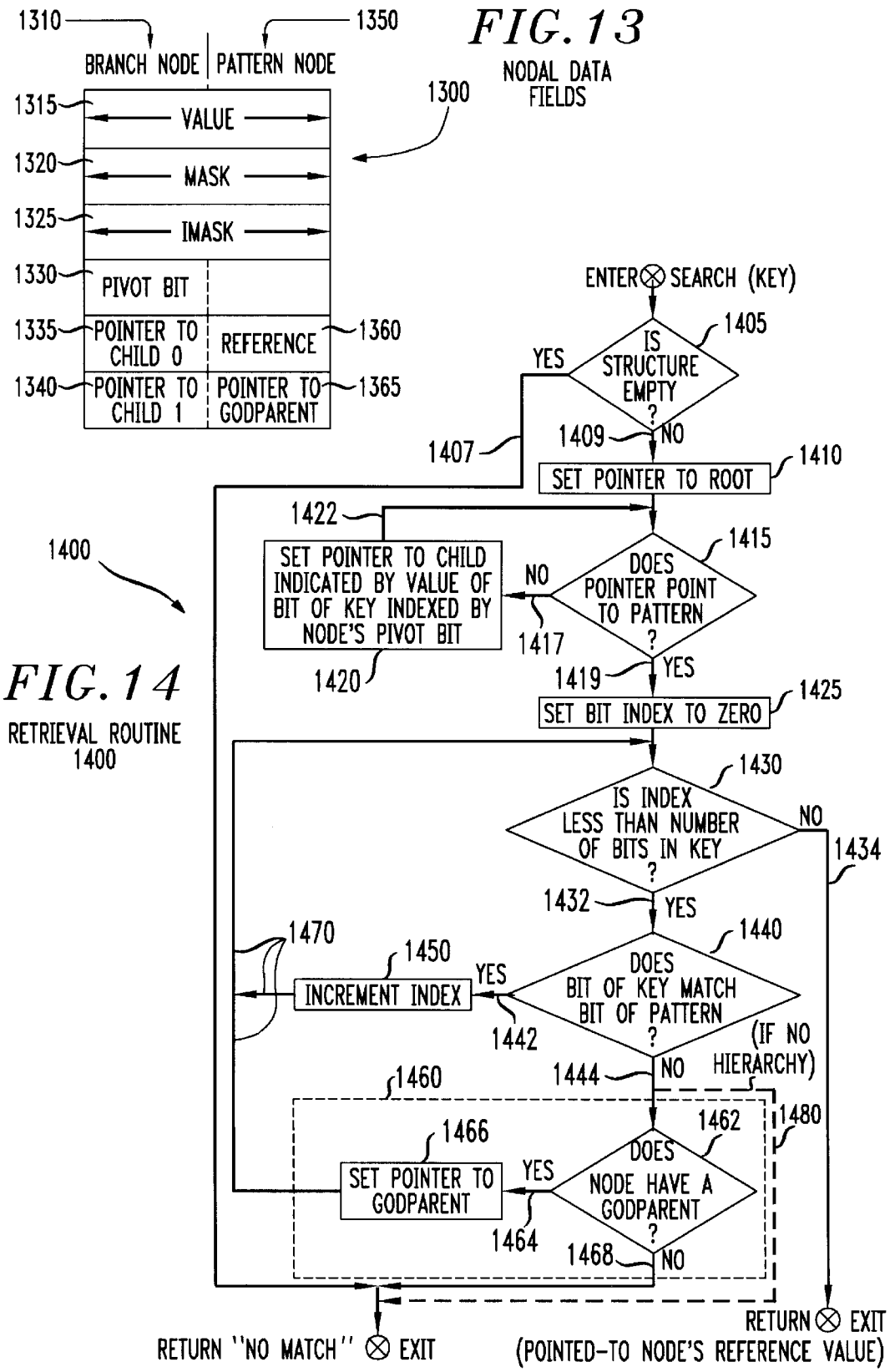

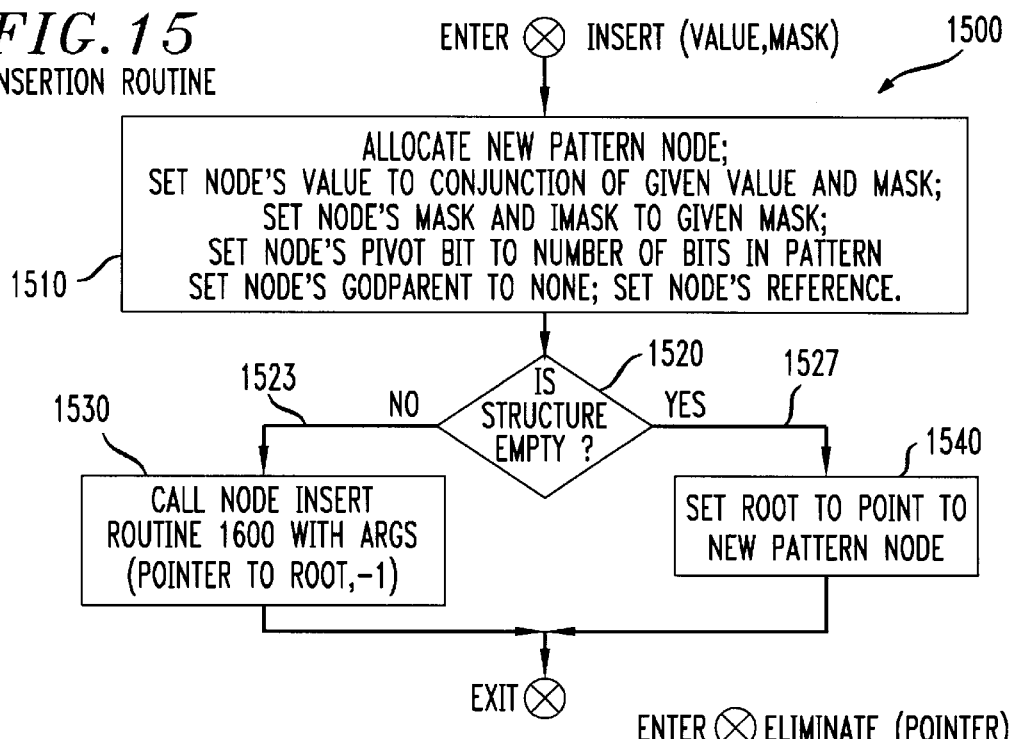
FIG. 15 INSERTION ROUTINE
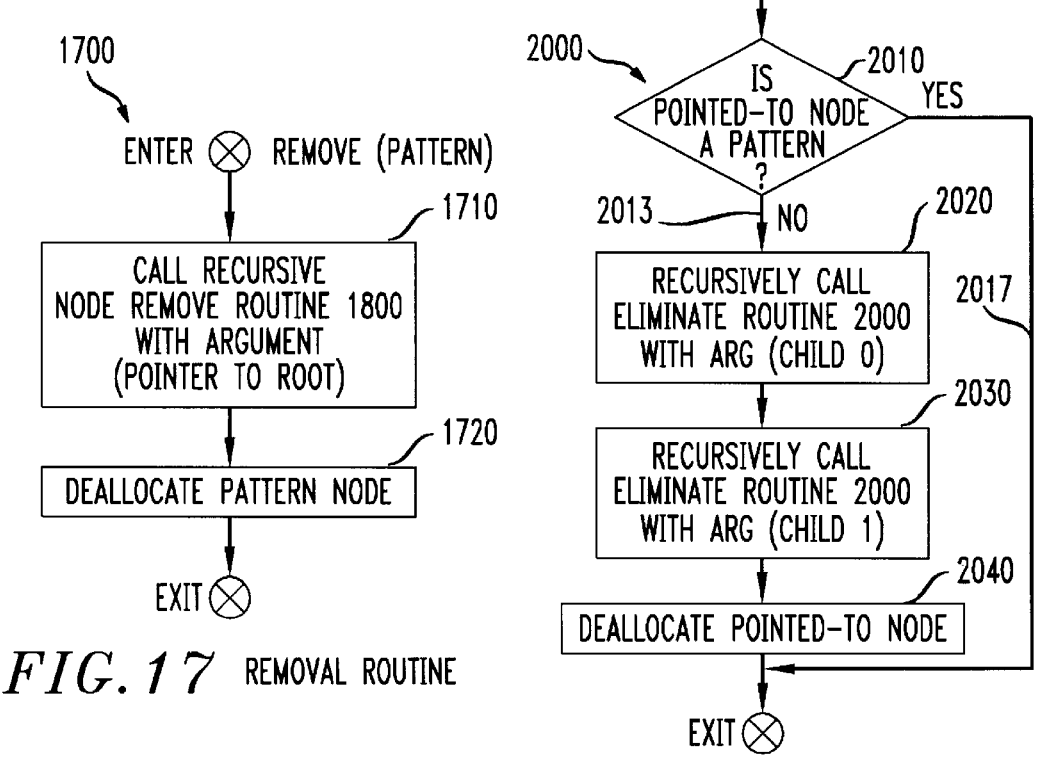
FIG. 17 REMOVAL ROUTINE
FIG. 20 ELIMINATE ROUTINE

NODE INSERT ROUTINE

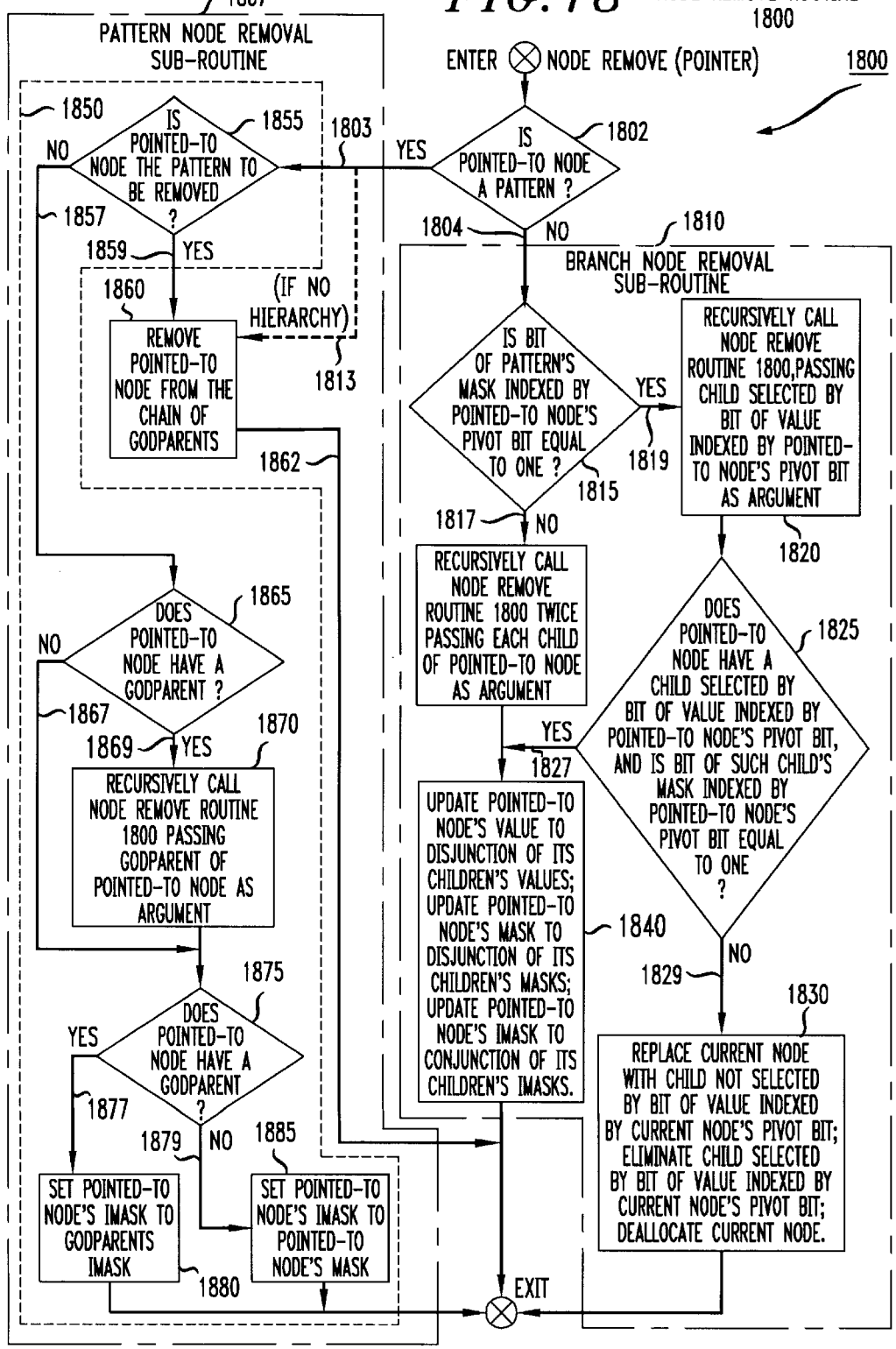

REPLICATE ROUTINE

APPARATUS AND ACCOMPANYING METHODS, USING A TRIE-INDEXED HIERARCHY FOREST, FOR STORING WILDCARD-BASED PATTERNS AND, GIVEN AN INPUT KEY, RETRIEVING, FROM THE FOREST, A STORED PATTERN THAT IS IDENTICAL TO OR MORE GENERAL THAN THE KEY

BACKGROUND OF THE DISCLOSURE

1. Field of the Invention

The invention relates to a technique, specifically apparatus and accompanying methods, which utilizes a trie-indexed hierarchy forest that accommodates wildcards for, inter alia, retrieving, given a specific input key, a pattern stored in the forest that is identical to or subsumes the key. This technique finds particular, though not exclusive, use in a computer-based network, for efficiently classifying packets in order to apply any network related processing applicable to the packet, e.g., packet scheduling. Thus, this invention also relates to apparatus for a packet classifier and accompanying methods for use therein that embody this technique.

2. Description of the Prior Art

Packets are routinely used within a computer network to carry digital communication between multiple nodes on the network. Any such network possesses a finite number of different connections among the nodes therein. Generally speaking, whenever a computer stationed at one such node is executing an application wherein the results of that application will be sent to a computer at another network node, the former computer will establish a connection, through the network, to the latter computer and then send these results, in packetized form, over that connection.

A network interface for a personal computer contains both specialized hardware, as required to physically and electrically interface that computer to the network itself, and associated software which controls the interface and governs packetized communication therethrough. Inasmuch as the interface hardware is irrelevant to the present invention, we will not discuss it in any detail. The software is often part of the operating system, such as exists in, e.g., the Windows NT operating system currently available from the Microsoft Corporation of Redmond, Wash. (which also owns the registered trademark "Windows NT"). In particular, the software implements, inter alia, various processes that rely on classifying each packet and processing the packet accordingly. One such process is packet scheduling. While several other such packet-related processes, such as routing, security and encryption, are also employed in the software, for purposes of brevity and illustration, we will confine the ensuing discussion to scheduling.

In particular, while a physical network interface to a computer operates at a single speed, e.g., 10 or 100 Mb/second, several different streams of packetized traffic, depending on their data content, can be interleaved together by the computer for simultaneous transmission at different rates through that interface. To accommodate this, a packet scheduler directs individual packets in each such stream to a corresponding software transmission queue (also referred to hereinafter as simply a "queue") from which packets in each such stream will be dispatched, in proper order, for network transmission at a corresponding rate—regardless of the network destinations of these streams. Given the substantially increased data rate required for, e.g., video data over textual data, the scheduler encountering both video and textual packetized data will ensure that each type of data packet is directed to the proper queue such that a significantly greater number of video-carrying packets than text-carrying packets will subsequently be transmitted per unit time through the interface. Other software implemented processes successively pull individual packets from the queues, at the corresponding data rates associated therewith, for multiplexing and subsequent transmission through the interface to the network. Inasmuch as these other processes are not relevant to the present invention, they will not be discussed in any further detail.

Packet classification, for purposes of packet scheduling, will be performed, by constructing a so-called "key" from select fields, contained in a packet in order to associate the packet with a corresponding queue. These fields are illustratively source and destination addresses (typically IP addresses) and corresponding port designations (all of which are collectively referred to herein as "classification fields"). This association typically occurs by consistently concatenating the classification fields, in the packet being classified, into a key which, in turn, is used to access a data structure in order to retrieve therefrom an identification of a corresponding queue for that packet. Since a group of packets that have differing values for their classification fields can nevertheless be transmitted at the same rate and hence should be directed to the same queue, a mask field containing one or more so-called "wildcard" (oftentimes referred to as "don't care") values is often used, through logical combination with the classification fields, to yield an identification associated with a single queue. Generally speaking, this identification is viewed as a "classification pattern", i.e., a bit field having a length equal to the total length of the concatenated classification fields wherein any bit in the pattern can have a value of "1", "0" or "X", where "X" is a wildcard. As a result, a single pattern having a wildcard(s) therein can serve to classify an entire group of such packets. If a match occurs between the non-wildcard bits of the pattern (i.e., taking the wildcard value(s) into account) and corresponding bits of the classification fields for the packet being classified, then an associated queue designation for that pattern is accessed from the data structure.

By virtue of permitting wildcards within packet classifications (i.e., patterns), the complexity associated with searching the data structure, for a pattern given the classification fields for a packet, as well as that of the structure itself, increases considerably. Furthermore, the process of classifying packets lies directly within the data flow and adds another layer of processing thereto, i.e., each outgoing packet must be classified before it is launched into the network. Consequently, any added complexity necessitated by accommodating wildcards will require additional processing. Since only a finite amount of processing time can be allocated to classify each packet and packet classification tends to be processor intensive, such classification needs to be rather efficient—particular for use in a computer that is to experience significant packet traffic.

A principal way to increase classification efficiency is to utilize a process that retrieves stored classification information as fast as possible from a data structure.

While the art teaches various approaches for classifying packets, such as that typified in M. L. Bailey et al, "Pathfinder: A Pattern-Based Packet Classifier", *Proceedings of First Symposium on Operating Systems Design and Implementation (OSDI)*, USENIX Assoc., Nov. 14–17 1994, pages 115–123 (hereinafter the "Bailey et al" paper), and W. Doeringer et al "Routing on Longest-matching Prefixes", *IEEE/ACM Transactions on Networking*, Vol. 4, No. 1, February 1996, pages 86–97 (hereinafter the "Doeringer et al" paper), these approaches, while efficient and effective in their target environments, are limited. In that regard, the techniques described therein exhibit retrieval times that are generally linearly related to the number of elements (n) in a classification database. A large network will have a substantial number of different patterns. Hence, the size of a classification data structure for such a network can be considerable which, in turn, will engender linearly increasing and hence relatively long retrieval times as the database expands. For packetized payload data that requires a high data rate, such retrieval times may be inordinately long and cause excessive delay to a recipient user or process.

Furthermore, packet classifiers fall into two distinct types: declarative and imperative. Basically, a declarative classifier stores a pattern as a filter while the filter, used in an imperative classifier, contains a small segment of executable code. In particular, a declarative classifier relies on embedding a description, such as a key, in each packet for which a classification is sought and then matching the key to a pattern in a stored classification and retrieving an associated value, such as a queue designation, therefrom. An imperative classifier, on the other hand, executes, possibly on an interpretive basis, the code segment in each and every stored classification, in seriatim, against the header of an incoming packet to compute a result. The result specifies a corresponding pattern for that packet. Where the number of patterns is rather small, an imperative classifier executes a relatively small number of code segments against each packet. Inasmuch as each code segment is implemented through a highly simplified instruction set, the classification delay for small networks, with relatively few patterns, tends to be tolerable. However, both processing complexity and associated delay become intolerable for packet classification in a large network that has an extensive number of different patterns. Declarative classifiers eliminate the need to process each incoming packet through a separate code segment for each and every classification, and hence provide significantly shorter response times. However, prior art declarative classifiers, such as that typified by the methodology described in the Bailey et al paper, exhibit classification delay that is linear in the number of stored patterns and hence can be intolerably long in a large network which is expected to carry packetized payload data, such as video, that requires a high data rate.

While the Doeringer et al paper describes a declarative classification methodology that can handle a pattern containing wildcards, this methodology requires that all wildcards be located in a contiguous group at the end of the pattern. Inasmuch as this methodology is directed to IP (Internet Protocol) routing where arbitrarily placed wildcards do not occur, this methodology is acceptable in that application. However, for packet classification, where classification can occur for various different purposes, such as scheduling, and a wildcard can arbitrarily occur anywhere in a pattern, the methodology taught by the Doeringer et al paper is simply unsuited for such broad-based classification.

Therefore, a need exists in the art for a fast and versatile packet classifier that incorporates a search technique capable of rapidly retrieving stored information, from a data structure, given a specific value in a group of classification fields in the packet. Furthermore, this technique should accommodate a wildcard(s) located in any arbitrary position within a stored pattern and, to reduce delay, should preferably exhibit retrieval times that increase less than a linear function of the number of stored patterns.

Moreover, and apart from use in packet classification, a broad need continues to exist in the art for a generalized technique that, given specific input data (in the form of, e.g., a key), can rapidly retrieve a stored pattern, containing a wildcard(s) at any location therein, from a data structure—regardless of what the input data and patterns specifically represent. Such a technique would likely find widespread use including, but not limited, to packet classification. While the opposite problem of how to rapidly find a specific datum stored in a database given a generalized input pattern has been extensively investigated in the art, the converse problem, inherent in, e.g., a packet classifier, of how to swiftly retrieve a generalized stored pattern from a data structure given specific input data, e.g., classification fields, has apparently received scant attention in the art, which thus far, as discussed above, has yielded rather limited and disappointing results.

SUMMARY OF THE INVENTION

Our present invention satisfies these needs and overcomes the deficiencies inherent in the art through a stored data structure predicated on our inventive rhizome-indexed hierarchy forest, specifically our inventive modified hierarchical Patricia tree. In that regard, by structuring stored pattern data through a binary search trie, i.e., a search structure, that indexes into pattern hierarchies, i.e., a pattern hierarchy structure, wherein the hierarchies accommodate wildcard(s), the structure can be used to retrieve a pattern stored in the forest, given a specific input key, that is identical to or subsumes the key. Advantageously, our inventive structure permits a wildcard to be stored at any arbitrary bit position in a pattern.

In accordance with our broad teachings, our inventive data structure (also, for simplicity, referred to herein as a "rhizome"), typically stored in computer memory and/or on a computer-readable storage medium, contains two interconnected data structures: a binary search trie (forming a "search structure" when stored in memory and/or on a readable storage medium) and a hierarchy forest (forming a "hierarchy structure" when stored in memory and/or on a readable storage medium). The search trie, implemented through, e.g., a generalization of a Patricia tree, provides an indexed path to each unique, most specific, pattern stored in a lowest level of the hierarchy forest. The hierarchy forest, which extends beyond the search trie, organizes the patterns into nodal hierarchies of strictly increasing generality, starting with those that are most specific. Each pattern is stored in a separate pattern node. Each hierarchy of pattern nodes, at its lowest level, contains a node with a specific lowest level pattern. That node is then followed in the hierarchy by nodes, to the extent they exist, with increasingly general patterns. Each of these latter patterns, owing to an included wildcard(s), completely subsumes, by virtue of strict hierarchy, the pattern in the node situated immediately therebelow. By virtue of accommodating hierarchically related wildcard-based patterns, our inventive rhizome permits multiple nodes, either branch or pattern nodes, to point to a common pattern node.

By virtue of our specific inventive teachings, given a specific input ("search") key, a stored pattern, that provides the most specific match, either identically or which completely subsumes the key, is retrieved from the stored database through a two-fold retrieval process. First, the search trie, having a topology of branch nodes, is traversed by branching, via child paths, at successive branch nodes therein as determined by corresponding bits in the key, each such bit being designated by a so-called "pivot bit" associated with each such branch node, until a lowest-level pattern node is reached. The pivot bit defines a bit position at which at least a pair of stored patterns in the rhizome disagree with each other. The branch nodes are organized in terms of increasing pivot bit value. Second, the pattern hierarchy, containing that lowest-level pattern node, is itself searched until the most specific pattern therein is found which matches or completely subsumes the key. A search ultimately succeeds if the retrieval process locates a stored pattern that most specifically matches, either identically or in terms of subsuming, the search key. If a search succeeds, then contents of a so-called "reference field" associated with the stored pattern are returned for subsequent use.

Our inventive rhizome exhibits the advantageous characteristic that the key will match either a specific pattern stored in the rhizome or an increasingly general pattern stored above it in a hierarchical chain, or that key will not have a matching pattern stored anywhere in the rhizome. Hence, our inventive rhizome effectively narrows down a search for a pattern that most specifically matches a key from an entire database of stored patterns to just a linear chain of patterns in order of strict hierarchy, the latter being usually substantially smaller in size than the former. Specifically, through our inventive rhizome, the maximum number of bit comparisons that needs to be made to retrieve a pattern for a given search key generally equals the number of bits in the key itself plus the number of patterns, in the longest hierarchy chain in the hierarchy forest, less one. Moreover, owing to the strict hierarchy inherent in every hierarchical chain in our inventive rhizome, i.e., where patterns at higher levels in a given pattern hierarchy completely subsume those at lower levels therein, then, if a bit-by-bit comparison is to be made for patterns in a pattern hierarchical chain against an input key, then as increasingly general patterns are encountered in that hierarchy, there is no need to compare a bit in any bit position of the key that has previously been compared against and found to match that in any lower level pattern in that chain. This, in turn, further reduces processing time required to find a desired pattern in the rhizome.

Advantageously, our present invention finds particular, though not exclusive, use in a packet classifier for efficiently, i.e., very rapidly, classifying packets for scheduling. In such an application, our inventive rhizome stores packet classifications as individual classification patterns therein, wherein each classification (i.e., pattern) is typically formed of, e.g., source-destination addresses and source-destination port designations (all collectively referred to as "classification fields"). Depending upon a specific implementation, the classification field may also contain: other fields from a packet in addition to the addresses and port designations, fewer fields than these addresses and port designations, or even other fields from a packet. Wildcard-based classifications, i.e., patterns containing one or more wildcards, occur inasmuch as packets with different classification fields can be directed to a common transmission queue; hence, having a common classification. Each different pattern is stored at a separate corresponding pattern node in the inventive rhizome, along with, as the corresponding reference field therewith, a queue designation. Packets are dispatched from each queue for network transport at a particular data rate associated with that queue. In operation, as each different queue is established or removed, a corresponding classification pattern is either inserted into or removed from the classifier, specifically our inventive rhizome therein, respectively. Our inventive packet classifier forms a search key for each packet, typically by consistently concatenating the classification fields appearing in a header of the packet. The search key is then applied to our inventive rhizome which determines whether that key exists in the rhizome, by virtue of either matching an identical classification pattern, i.e., a match of all non-wildcard bits in the key with corresponding bits in the pattern, stored therein or being completely subsumed by a stored classification pattern. In either case, if such a classification pattern is found for the key, the search succeeds. Hence, the classifier then returns the contents of associated reference field therefor to specify the queue to which the packet is then directed.

Our inventive rhizome provides an advantageous feature that, for large databases, asymptotically, average search delay through the rhizome is a logarithmic function of a number of patterns stored in the rhizome rather than linear in the number (n) of patterns, as occurs with conventional databases of patterns containing wildcards. Hence, use of our inventive rhizome, particularly with a large and increasing classification database—as frequently occurs in packet classifiers, appears to provide significant time savings over conventional packet classification techniques.

Another advantageous feature provided by our inventive rhizome is backward compatibility with a conventional Patricia tree. In particular, if no wildcard-based patterns exist within our inventive rhizome or are to be inserted therein, then the structure of this rhizome would be identical to that of a conventional Patricia tree containing these patterns—thereby assuring full backward compatibility. Furthermore, our inventive retrieval, insertion and removal processes would each operate on this rhizome, in the absence of any wildcard-based patterns, with substantially, if not totally, the same degree of computational complexity as would the corresponding processes in a conventional Patricia tree.

BRIEF DESCRIPTION OF THE DRAWINGS

The teachings of the present invention can be readily understood by considering the following detailed description in conjunction with the accompanying drawings, in which:

FIG. 5A depicts a simplified high-level diagram of a packet scheduler that utilizes our inventive packet classifier;

FIG. 5B depicts a high-level flowchart of our inventive packet classification process 550 performed by packet classifier 410 shown in FIGS. 4 and 5A;

FIGS. 7A and 7B depict single pattern 710, containing so-called wildcards, and resulting patterns 750 all subsumed therein, respectively;

FIGS. 8A, 8B and 8C respectively depict a group of wildcard-containing patterns, the same group hierarchically organized as a tree, and four-bit keys that are mapped into the patterns;

FIG. 13 graphically depicts data fields associated with each node in our inventive rhizome;

FIG. 14 depicts a flowchart of Retrieval routine 1400 which executes within our inventive pattern classifier 410 shown in FIG. 4;

FIG. 15 depicts a flowchart of Insertion routine 1500 which is executed by our inventive pattern classifier 410 shown in FIG. 4;

FIG. 16 depicts the correct alignment of the drawing sheets for FIGS. 16A and 16B;

FIG. 17 depicts a flowchart of Removal routine 1700 which is also executed by our inventive pattern classifier 410 shown in FIG. 4;

FIG. 18 depicts a flowchart of Node Remove routine 1800 that is executed by, e.g., Removal routine 1700 shown in FIG. 17;

FIG. 20 depicts Eliminate routine 2000 that is executed by, e.g., Node Remove routine 1800 shown in FIG. 18.

To facilitate understanding, identical reference numerals have been used, where possible, to designate identical elements that are common to the figures.

DETAILED DESCRIPTION

After considering the following description, those skilled in the art will clearly realize that the teachings of our present invention can be readily utilized in substantially any environment that processes packets to expedite packet classification. Our present invention will advantageously function not only within a computer system but also, generally speaking, within any apparatus that applies substantially any network-related processing to packets. Furthermore, though the broad teachings of our invention, particularly our inventive rhizome, are suitable for advantageous use within a wide variety of computer-based data classification processes to locate a stored generalized pattern given specific input data, to facilitate understanding and for brevity, we will describe our invention in the context of illustratively and predominantly a computer system which, as part of its operating system, classifies packets, for scheduling.

A. Packet Classification in a Network Environment

Figure 1:
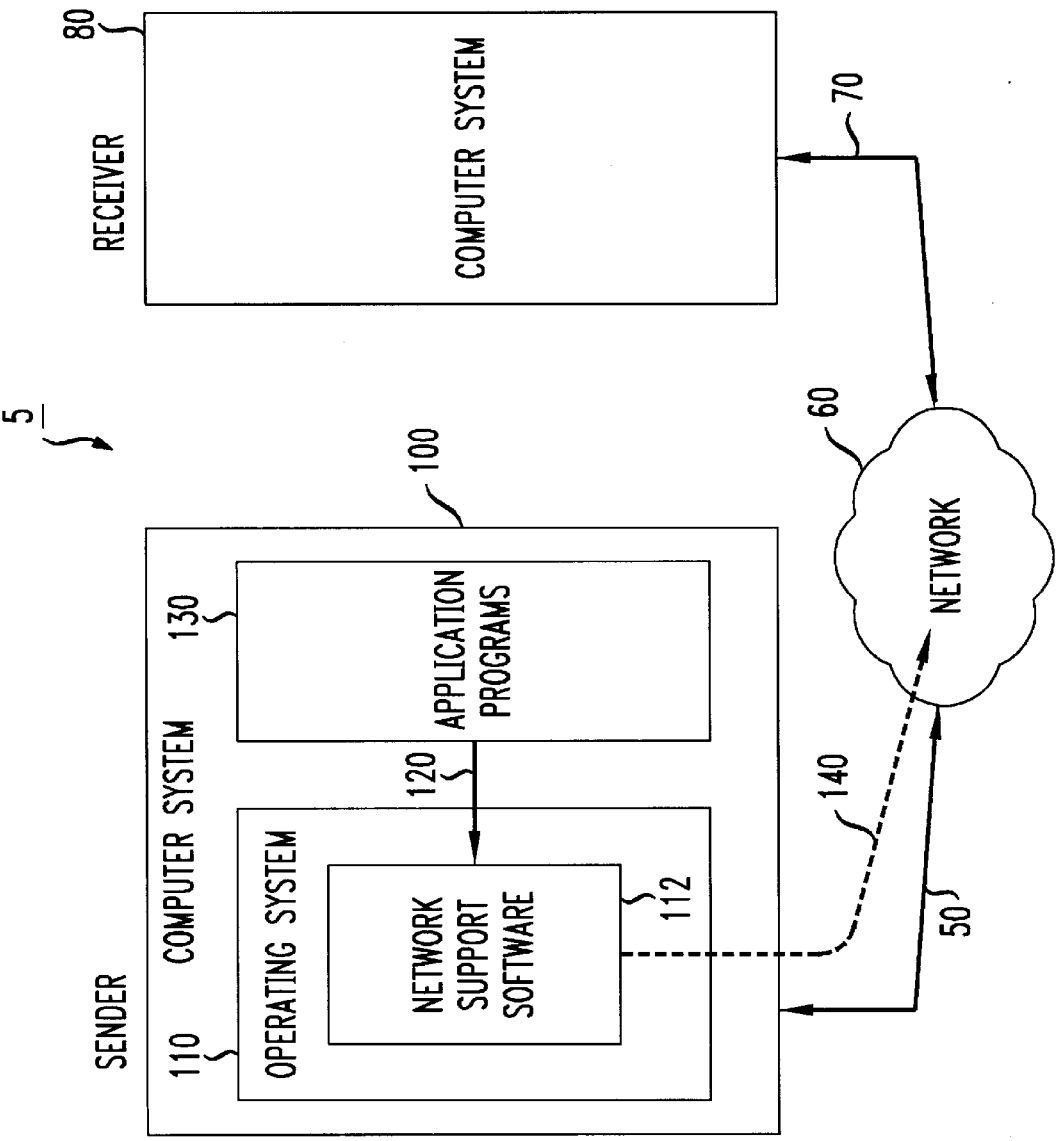
FIG. 1 depicts a high-level block diagram of two illustrative networked computers which each utilizes the teachings of the present invention.

FIG. 1 depicts a high-level block diagram of networked environment 5 which illustratively contains computers 80 and 100 inter-connected through network 60. Inasmuch as the specific components that constitute network 60 are irrelevant to the present invention, these aspects will not be addressed hereinafter. Computers 100 and 80 are connected, via appropriate electrical connections 50 and 70, to network 60. These connections can be, e.g., wired, i.e., physical, or wireless links, the latter including radio and/or optical links; the actual form of the link being immaterial to the present invention.

Suffice it to say and to the extent relevant, computer system 80 located at a receiving location (henceforth a "receiver") can obtain data, such as, e.g., video or text data, from, e.g., application programs 130 located at a sending location (henceforth a "sender")—the actual mechanism through which the data is requested being irrelevant to the present invention. To provide network connections, computer system 100 also provides within its executing operating system 110 appropriate network support software 112. This network support software is often part of operating system 110, which is typified by, e.g., the Windows NT operating system currently available from the Microsoft Corporation of Redmond, Wash. (which also owns the registered trademark "Windows NT"). For a clear understanding, the reader should also simultaneously refer, throughout the following discussion, to both FIGS. 1 and 4, the latter depicting a simplified block diagram (to the extent relevant) of network support software 112.

Network support software 112 provides, inter alia, packet classification and packet scheduling functionality, implemented through packet classifier 410 and packet scheduler 450, respectively. In operation and in essence, the network support software receives, as symbolized by path 120, a stream of packets from, e.g., application programs 130, and then, for purpose of scheduling, classifies, through packet classifier 410, each such packet as to its corresponding transmission queue (also referred to herein as simply a "queue"). The scheduler then directs each such packet to its corresponding queue. Thereafter, as symbolized by dashed line 140, the packets in each queue (not specifically shown in either FIGS. 1 or 4, but will be discussed in detail below in conjunction with FIG. 5A) are collectively interleaved together and transmitted onto network 60 at a corresponding data rate for each queue. Thus, through packet classification, scheduler 450 assures that the individual packets are to be launched into network 60 at a rate commensurate with a data rate of their payload data, Each queue may contain packets destined for different corresponding networked computers, e.g., computer 80 and/or any other computer(s) connected to network 60.

Figure 2A:
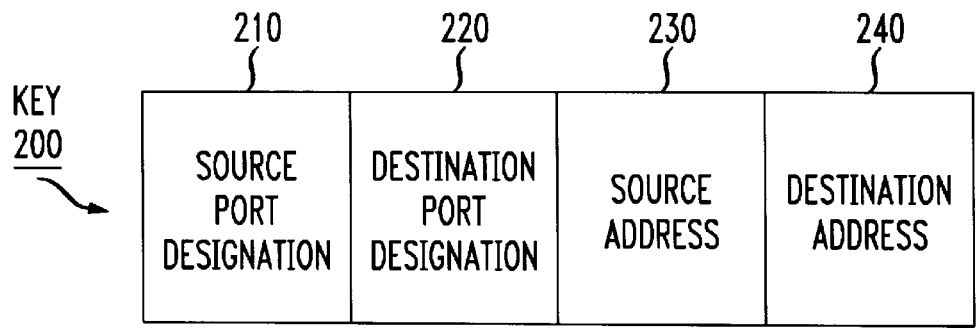
FIG. 2A and 2B depict typical key 200, and pattern 250 and its accompanying mask field 255, respectively, used in classifying a packet for scheduling.

In essence, packet classification will be performed, for purposes of scheduling, by using values of specific classification fields contained in header of a packet, and specifically concatenating these fields together, in a consistent manner, to form a so-called "key" which, in turn, is used to access a data structure to retrieve a designation of a proper transmission queue. These classification fields that form illustrative key 200 are graphically shown in FIG. 2A.

In particular, each packet contains source and destination IP (Internet Protocol) addresses, i.e., an network address of a computer or other network device ("source device") at which that packet was created and a network address of a computer or other network device ("destination device") at which that packet is to be delivered. The packet also contains designations of source and destination ports, i.e., specific ports at the source and destination devices at which the packet originated and at which the packet is to be received, respectively. The source and destination addresses, and source and destination port designations collectively form the "classification fields". In other implementations, the classification fields may contain: other fields from a packet in addition to these addresses and port designations, fewer fields than these addresses and port designations, or even other fields from a packet. In any event, for purposes of the present embodiment, these addresses and port designations, when appropriately concatenated to form key 200, are used to access a so-called "classification pattern" from a stored database. As shown, key 200 contains four successive contiguous fields as the classification fields: source port designation field 210, destination port designation field 220, source address field 230 and destination address field 240. Though classification patterns are a specific type of pattern, for brevity, we will use these two terms synonymously during the course of describing our invention in the context of a packet classifier.

For each different transmission queue established at a computer, a separate corresponding pattern exists and is stored within a database. Moreover, multiple stored patterns may often correspond to the same queue. In any event, complications arise inasmuch as packets with different values for their classification fields are often to be transmitted at a common data rate, and hence are to be directed to a common transmission queue. In order to direct packets with different values of the classification fields to a common queue, each pattern, such as pattern 250 shown in FIG. 2B, has mask field 255 associated therewith, wherein a separate mask sub-field is provided for each of the individual classification fields, i.e., for each of the source and destination address fields and the source and destination port designation fields. As shown, pattern 250 is formed of: source port designation field 264, destination port designation field 274, source address field 284 and destination address field 294; with mask field 255 being formed, with corresponding concatenated sub-fields, of: source port designation mask sub-field 267, destination port mask sub-field 277, source address mask sub-field 287 and destination address mask sub-field 297.

Each mask sub-field identifies, by a one in a given bit position, each bit that is important (i.e., must be matched in value) in a corresponding classification field, (i.e., an address or port designation), and, by a zero in a given bit position, which bit in that classification field can be ignored, i.e., that which is a so-called "don't care" bit or (as will be equivalently referred to hereinafter) "wildcard". For an example shown in FIG. 2B, consider, as example 285, an address in source address field 284 to be the value 101001010 and a corresponding mask in mask sub-field 287 to be the value 111001110. What this means is that the source address bit-values in address bit positions (starting at MSB (most significant bit) position zero on the left and counting to the right) three, four and eight can be ignored. Hence, the source address becomes 101XX101X where "X" represents a "wildcard". Hence, any packet having a source address that contains the values "101" in bit positions zero through two and again in bit positions five through seven, regardless of its bit values in bit positions three, four and eight, will match the source address in pattern 250. By virtue of having a wildcard(s), a single source address in a pattern, such as that in pattern 250, can match against multiple different source addresses in packets. To specify just one particular source address rather than a group, all bits in the mask sub-field for the source address in a pattern would be set to one, i.e., denoting no wildcards; hence requiring a match over all bits in the address field with a corresponding source address in a key for a packet. The source port designation, destination port designation and destination address are all identically specified for a pattern through by a combination of an address or port designation in fields 264, 274 and 294, respectively, with a corresponding value in mask sub-fields 267, 277 and 297, respectively, of mask field 255.

As noted above, once the database search successfully retrieves a pattern that matches or subsumes within it the key for a packet, the queue designation associated with that pattern specifies a particular transmission queue, within the scheduler, to which that packet will be directed. The queue designations are simply predefined and stored in the database. Since the manner through which the bits in the queue designations are set to specify an associated transmission queue is irrelevant to the present invention, we will omit all those details from the ensuing discussion.

By virtue of permitting wildcards within patterns, the complexity associated with searching the data structure, for a pattern given a key, as well as that of the structure itself increases considerably. Furthermore, the process of classifying packets lies directly within the data flow and adds another layer of processing thereto, i.e., each outgoing packet must be classified before it is launched into the network. Consequently, since packet classification is processor intensive, then any added complexity necessitated by accommodating wildcards will require additional processing. Since only a finite amount of processing time can be allocated to process each packet, packet classification should proceed as efficiently as possible—particularly for computers that are expected to handle significant packet traffic.

As discussed in much greater detail below and in accordance with our inventive teachings, we teach an inventive data structure which can rapidly classify specific data to associated wildcard-based patterns. This structure is used illustratively in a packet classifier, but it can be employed in any application that requires storage and rapid retrieval of any patterns containing wildcards. However, prior to discussing specific details of our invention, we will digress somewhat to describe the salient aspects of a typical computer system, such as system 100 shown in FIG. 1, which utilizes our invention.

Figure 3:
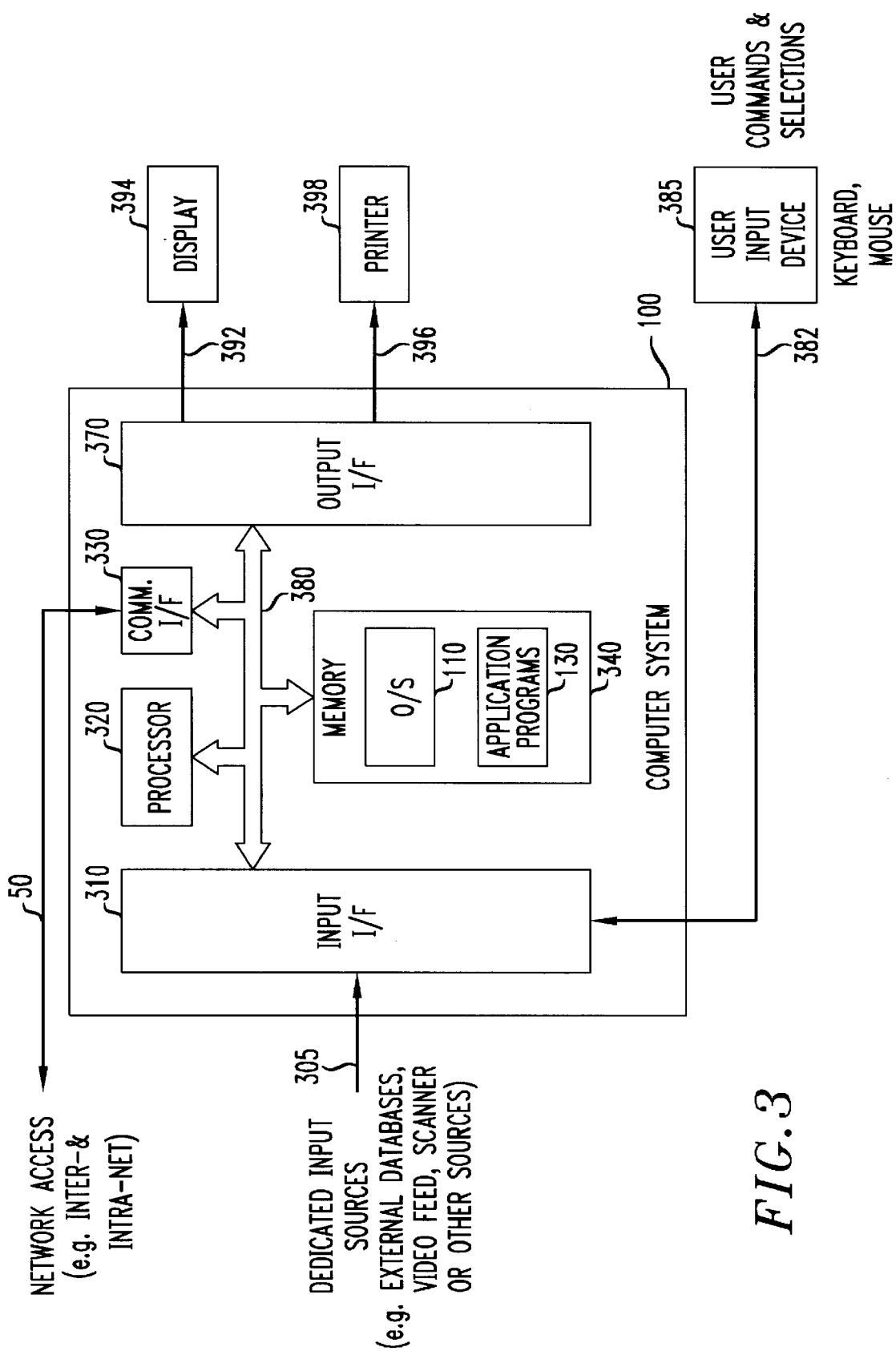
FIG. 3 depicts a block-diagram of illustrative computer system 100, shown in FIG. 1, which utilizes the teachings of the present invention.

In that regard, FIG. 3 depicts a block-diagram of illustrative computer system 100, shown in FIG. 1, which utilizes the teachings of the present invention.

As shown, this system, illustratively a personal computer, comprises input interfaces (I/F) 310, processor 320, communications interface 330, memory 340 and output interfaces 370, all conventionally interconnected by bus 380. Memory 340, which generally includes different modalities (all of which are not specifically shown for simplicity), illustratively random access memory (RAM) and hard disk storage, stores operating system (O/S) 110 and application programs 130. As noted above, the specific software modules that implement our inventive teachings are incorporated within O/S 110. This operating system, apart from these modules, may be implemented by any conventional operating system, such as the WINDOWS NT operating system. Given that, we will not discuss any components of O/S 110 other than those needed to specifically implement our invention, inasmuch as the rest are irrelevant.

As shown in FIG. 3, incoming information can arise from two illustrative external sources: network supplied information, e.g., from the Internet and/or other networked facility such as an intra-net (all generally shown as network 60 in FIG. 1), through network connection 50 to communications interface 330 (shown in FIG. 3), or from a dedicated input source via path(s) 305 to input interfaces 310. Dedicated input can originate from a wide variety of sources, e.g., an external database, video feed, scanner or other input source. Input interfaces 310 are connected to path(s) 305 and contain appropriate circuitry to provide the necessary and corresponding electrical connections required to physically connect and interface each differing dedicated source of input information to computer system 100. Under control of the operating system, application programs 130 exchange commands and data with the external sources, via network connection 50 or path(s) 305, to transmit and receive information typically requested by a user during program execution.

Input interfaces 310 can also electrically connect, via leads 382, and interface user input device 385, such as a keyboard and mouse, to computer system 100. Display 394, such as a conventional color monitor, and printer 398, such as a conventional laser printer, can be connected, via leads 392 and 396, respectively, to output interfaces 370. The output interfaces provide requisite circuitry to electrically connect and interface the display and printer to the computer system. As one can appreciate, the particular type of input and output information and a specific modality through which that information is applied to or produced by system 100 are both immaterial for purposes of the present invention and thus will also not be discussed in any detail hereinafter.

In operation, typically one or more application programs 130, such as a browser or other application that requests data, such as here video data, from a remote server, execute under control of O/S 110. For each executing application program, one or more separate task instances are invoked by a user in response to each user specified command, typically entered interactively through appropriate manipulation of user input device 385 given available command choices, such as in a menu or icons in a toolbar, and accompanying information then presented on display 394. Hardcopy output information from an executing application is provided to the user through printer 398.

Furthermore, since the specific hardware components of computer system 100 as well as all aspects of the software stored within memory 340, apart from the modules that implement the present invention, are conventional and well-known, they will not be discussed in any further detail.

Figure 4:
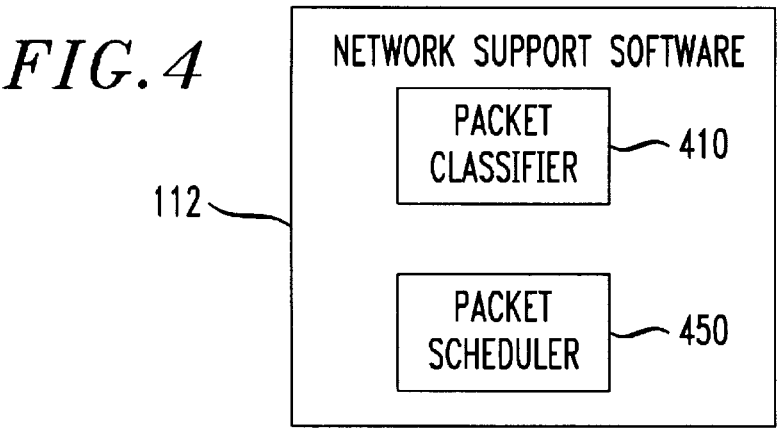
FIG. 4 depicts a simplified block diagram of network support software 112 that forms part of operating system (O/S) 110 shown in FIGS. 1 and 3.

FIG. 5A depicts a simplified high-level diagram of packet scheduler 450 that utilizes our inventive packet classifier 410 and forms part of network support software 112 shown in FIG. 4. For ease of understanding, the reader should also simultaneously refer to FIGS. 1, 3, 4 and 5A during the following discussion.

Packets destined for transmission over network 60 from computer 100 are applied, as symbolized by line 405, to scheduler 450 located within network support software 112. These packets can contain multiple streams of different packetized data, such as, for example, separate streams of packetized video data or packetized textual data. These streams, generated by a common computer and regardless of their data content, are transmitted through a common network interface, via network 60, to the same or different network destinations. Though a physical networked connection operates at a single speed, several different streams of packetized traffic, depending on their data content, are interleaved together by network support software 112 for simultaneous transmission at different rates through the network interface—with the rate provided to each stream being governed by its data content. To accomplish this, scheduler 450 contains internal transmission queues 470, composed of individual queues $470_1, 470_2, \ldots, 470_n$. Each queue is associated with a different transmission rate. For example, packets of, for example, video data, to be transmitted at 3 Mb/second would be directed to queue $470_1$; those packets to be transmitted at 2 Mb/second would be directed to queue $470_2$, and so forth for transmission speeds associated with the other queues. Packets to be transmitted at a relatively low data rate, such as packetized textual data, would be directed to queue $470_n$. To properly direct each packet appearing on line 405, scheduler 450 reads the classification fields from each such packet and forms a key therefor. This key is then passed, as symbolized by line 415, to classifier 410. As discussed above, the classifier, in turn, searches for a pattern stored therein which either matches or subsumes the key. If such a key is found, classifier 410 accesses the queue designation associated with that pattern and returns that designation, as symbolized by line 420, to the scheduler. In response to this designation, demultiplexor 460 contained within the scheduler directs the packet to the specific queue, i.e., one of queues 470, specified by the designation. By appropriately classifying each packet in succession based on its classification fields and directing that packet to the proper queue therefor, scheduler 410 and classifier 450 collectively ensure that each stream of packets will be scheduled for transmission over network 60 at a rate commensurate with the data carried in that stream. Other software implemented processes (not specifically shown but well-known) successively pull individual packets from the queues, at the corresponding data rates associated therewith, for multiplexing (as collectively symbolized by dashed lines 480) and subsequent transmission, via line 50 and through a network interface adapter (contained within communication interfaces 330) and accompanying network card driver 540, onto network 60. Inasmuch as these other processes are not relevant to the present invention, they will not be discussed any further.

FIG. 5B depicts a high-level flowchart of our inventive Packet Classification process 550 performed by our inventive packet classifier 410 shown in FIG. 4.

Upon entry to this process—which is separately performed for each packet, block 555 is executed which extracts the fields of interest, i.e., the classification fields, from a header of that packet. Thereafter, the extracted fields are consistently concatenated, by block 560, into a single key, i.e., a current search key, to form key 220 shown in FIG. 2. To minimize search delay, recently used keys and their associated flows are cached within memory 340 (see FIG. 3) so as to advantageously eliminate the need to conduct a complete database retrieval operation on each and every search key. Hence, once the current search key is formed, block 565, as shown in FIG. 5B, examines a cache to locate that key. Next, decision block 570 determines whether the cache contains the current search key. If it does, then execution proceeds, via YES path 572, to block 575 which retrieves the pattern, and its associated queue designation, for this packet from the cache. Alternatively, if the cache does not contain the current search key, then this decision block routes execution, via NO path 574, to block 580. This latter block, when executed, retrieves the pattern for the current block by searching our inventive data structure, also referred to herein as a "rhizome" and which will be discussed in considerable detail below, for that pattern. Once this pattern is located, either by retrieving it from the cache or from our inventive rhizome, the queue designation therefor is then returned, through execution of block 590, to a requesting client, thereby completing execution of process 550 for the packet. Though not specifically shown, once the pattern and the queue designation are retrieved from our inventive rhizome, these items are then cached for subsequent short-term retrieval.

B. Conventional Database Searching vis-à-vis Packet Classification Searching

Our inventive data structure and retrieval algorithms, particularly for use in packet classification, are directed to an entirely opposite problem to that routinely encountered with conventional databases.

Figure 6A:
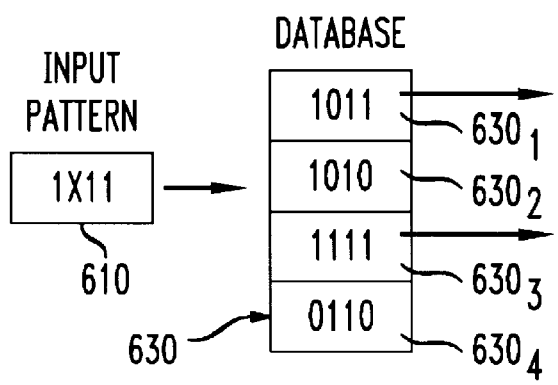
FIGS. 6A and 6B graphically depict a conventional database retrieval problem and an inverse problem inherent in a packet classifier, respectively.

In particular, and as shown in FIG. 6A, a conventional database, illustrated by database 630, contains specific pieces of information, such as entries $630_1$, $630_2$, $630_3$ and $630_4$, each of which stores a different numeric value. These values are illustratively 1011, 1010, 1111 and 0110 for entries $630_1$, $630_2$, $630_3$ and $630_4$, respectively. With such a conventional database, a generalized input pattern, such as pattern 610 here having an illustrative value 1X11 with a wildcard in bit position one, is applied; the database manager is instructed to return all stored data values that match, i.e., are identical to or are subsumed by, the pattern. Accordingly, entries $630_1$ and $630_3$ will be returned as containing values 1011 and 1111 that are both subsumed within input pattern 1X11.

Figure 6B:
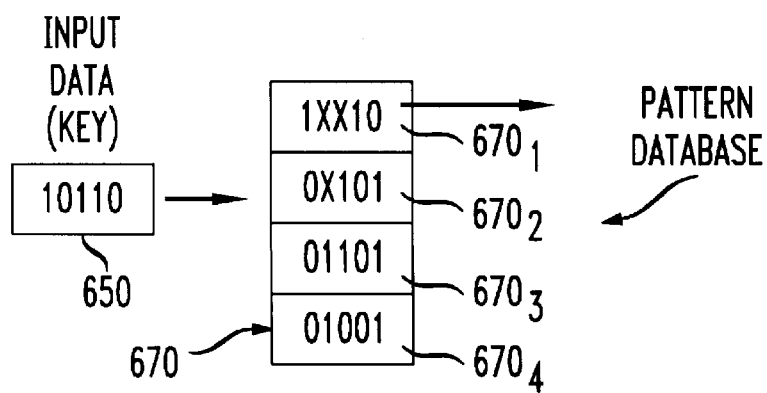

In sharp contrast, we are faced with the problem, inherent in a packet classifier and as illustrated in FIG. 6B, of searching a database of generalized patterns for a classification pattern that matches, either identically or subsumes within it, a specific input value, i.e., a key. Here, database 670 illustratively contains stored values "1XX10" in entry $670_1$, "0X101" in entry $670_2$, "01101" in entry $670_3$ and "01001" in entry $670_4$. Illustrative input key 650, containing a value "10110", is applied to a retrieval process in an attempt to return a stored classification pattern that is either identical to or contains the key. Here, the retrieval succeeds in returning the stored classification pattern "1XX10" in entry $670_1$. As one can appreciate, the stored and returned classification pattern "1XX10", containing wildcards in bit positions one and two, subsumes within it the input key "10110".

As noted, a specific input key can identically match or be subsumed within a generalized stored classification pattern. The number of different keys that will be subsumed within any given classification pattern will be dictated by the number of wildcards contained within that pattern. If a stored classification pattern contains no wildcards, then only one key, i.e., that which identically matches the stored classification pattern, will result in that pattern being returned. Alternatively, if a stored four-bit classification pattern contains all wildcards, i.e., the value "XXXX", then any possible four-bit key, for a total of 16 different four-bit keys, will result in that stored classification pattern being returned. In that regard, consider FIG. 7A which depicts stored eight-bit classification pattern 710 having three wildcards, in bit positions two, three and seven. As a result, eight different eight-bit keys 750, as shown in FIG. 7B, when applied to a database containing stored classification pattern 710 will result in that particular classification pattern being returned.

Classification patterns can also be arranged hierarchically as trees with arbitrary depths and in terms of increasing generality. For example, FIG. 8A depicts six illustrative four-bit classification patterns 810. Three of these classification patterns do not contain any wildcards, while the remaining three contain one, two or three wildcards. These classification patterns result in a pattern hierarchy, i.e., a tree, shown in FIG. 8B having three levels; namely, level 832 being the topmost, level 834 being an intermediate level and level 836 being a lowest level. The lowest level in the tree contains those classification patterns, here 1101, 0111 and 0101, that are the most specific, i.e., contain the least number of wildcards, i.e., here zero. Inasmuch as classification patterns 0111 and 0101 are both subsumed within pattern 01XX, and pattern 1101 is subsumed within pattern 110X, intermediate level 834 contains higher-level patterns 110X and 01XX. Because both of these higher-level patterns are themselves subsumed within classification pattern X1XX, the latter pattern is situated at the highest level. Following a retrieval strategy that if any two or more patterns match (or subsume) a key, the most specific pattern is selected first and applied as output, then for set 850 of sixteen possible four-bit input keys, as shown in FIG. 8C, resulting patterns 870 would be retrieved for those keys. A hierarchy tree need not be binary or even regular; any shape at all can occur provided the tree conforms to the actual hierarchical relationship among the stored classification patterns. Furthermore, a classification pattern does not need to have a hierarchical connection to all or any other such patterns; therefore, a group of classification patterns may include several different hierarchy trees. We will hereinafter refer to a group of trees as a "forest" and a structure realized by a group of classification patterns as a pattern "hierarchy forest".

A pattern classifier functions by retrieving, for a given specific input key, the most specifically matching stored classification pattern from among all the classification patterns stored in a pattern hierarchy forest in a database.

C. Classification Data Structures

We have discovered that a very efficient data structure for pattern classification results from appropriately modifying, in accordance with our inventive teachings, a conventional trie, specifically a Patricia tree, to accommodate hierarchically-related classification patterns that contain wildcards. A trie is a search tree in which branches are followed, during retrieval, based upon a digital value of a search key and wherein the data against which a key is ultimately matched is stored in the leaves of the tree. A Patricia tree is such a binary trie in which each internal node has only two children emanating therefrom and no one-way branching. A superset of a conventional Patricia tree, the superset which we have developed in accordance with our invention and which we will refer to hereinafter as a "rhizome", advantageously accommodates wildcards in stored patterns—an accommodation wholly absent from a conventional Patricia tree.

To simplify reader understanding, we will proceed from here by first discussing, through examples, a conventional Patricia tree; followed by discussing our inventive rhizome; and finally discussing the various inventive software routines that, in the context of use in illustratively a packet classifier for use in scheduling, execute within network support software 112 (see FIGS. 1 and 4) and implement retrieval, insertion and removal operations on our inventive rhizome. Our discussions of the conventional Patricia tree and of our inventive rhizome will also include graphical-based descriptions of the associated retrieval, insertion and removal operations thereupon.

1. Conventional Patricia Tree a. Overview

Any data structure designed for use in packet classification must support retrieval of a stored classification pattern therefrom, insertion of a new classification pattern therein and removal of a stored classification pattern therefrom. One data structure that provides relatively fast retrieval, insertion and removal operations is a Patricia tree.

As noted above, a Patricia tree is a binary trie. Each internal node in this tree has exactly two branches emanating therefrom and contains a bit index value. When a given node is reached, movement therefrom can occur in either of two directions, namely along one branch to a child or along the other branch to another child. The child can be either another internal node or a leaf node. Each leaf in the tree contains a data value. Nodes extend outward from a root of the tree in a hierarchical, typically multi-level, fashion as one traverses a path through the tree. Each internal node contains a numeric bit index value which specifies the specific bit in an input key that governs movement from that node: if that bit has a one value, one branch is taken; else if it has a zero value, the other branch is taken, and so forth through successive nodes along the path until a leaf node is reached. While the bit index for any child is greater than that of its parent, the bit indices encountered along any such path need not be consecutive, merely ascending.

The manner through which nodes are interconnected to form a Patricia tree and the values of their associated bit indices are strictly determined by the value that is to be stored in each leaf node and by disagreements, where they occur starting at the root and continuing at each successively higher bit position, among all such leaf values. Each bit index specifies a bit position at which such a disagreement exists.

Figure 9A:
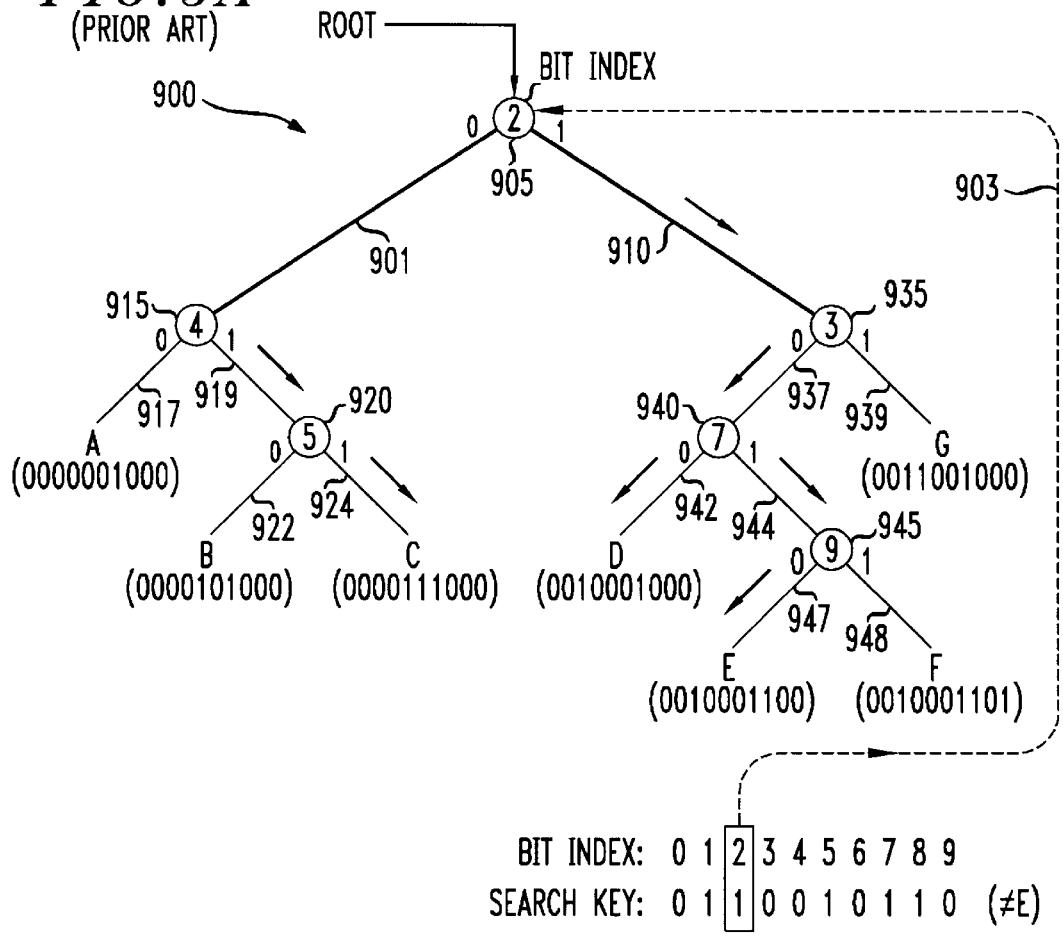
FIGS. 9A and 9B depict illustrative conventional Patricia trees 900 and 960, respectively, with exemplary data retrieval operations shown therefor.

With this in mind, consider FIG. 9A which depicts illustrative conventional Patricia tree 900. This tree stores seven data values, labeled for simplicity as A (value 0000001000), B (value 0000101000), C (value 0000111000), D (value 0010001000), E (value 0010001100), F (value 0010001101) and G (value 0011001000) stored in corresponding leaves. This tree, which is relatively simple, contains six internal nodes, hierarchically arranged in at most four levels, specifically nodes 905, 915, 920, 935, 940 and 945. Each node has two branches, specifically a "zero" branch and a "one" branch, emanating therefrom, such as branches 907 and 910 respectively emanating from node 905, and so forth for all the other nodes. As noted above, the nodal pattern is determined by the bit positions at which disagreements exist among the bits of all the stored values, starting at the root and continuing throughout the remaining bit positions.

In that regard, considering values A–G, starting with the highest order bit position (with the most significant bit (bit position zero) situated at the far left) and progressing incrementally in a step-wise fashion throughout the other bit positions from left to right, a disagreement among bits for these stored values first occurs in bit position two. This position yields node 905, i.e., the root of the tree with a bit index of two. Two branches emanate from node 905: zero branch 907 and one branch 910. For those values that have a zero in bit position two (i.e., values A, B and C), the next disagreement occurs in bit position four. Hence, a second node, here node 915, terminates zero branch 907. This second node, assigned a bit index of four, also has zero and one branches emanating from it: here zero and one branches 917 and 919, respectively. Value A, being the only value with a zero in bit positions two and four, terminates zero branch 917 and hence is child zero of node 915. Now, for those values that have a zero in bit position two and a one in bit position four, a further disagreement exists with respect to bit position five, i.e., values B and C respectively have a zero and one at this bit position. Hence, a third node, here node 920 with a bit index of five terminates one branch 919 (and becomes child one of node 915) with value B terminating zero branch 922 (hence being a child zero of node 920) and value C terminating one branch 924 (hence being a child one of node 924), and so forth.

Hence, given the differences among values A–G in bit positions 2, 3, 4, 5, 7 and 9, conventional Patricia tree 900 results.

Figure 9B:
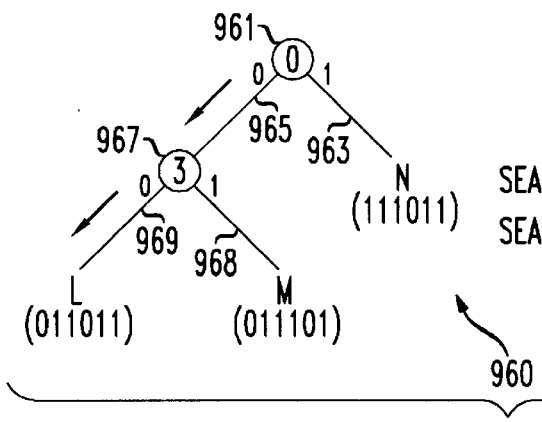

Another illustrative example of a Patricia tree is tree 960 depicted in FIG. 9B. Here, tree 960 contains two internal nodes: specifically node 961, being the root; and node 967. This tree stores three values L (value 011011), M (value 011101) and N (value 111011). Inasmuch as these three values, L, M and N, have bit disagreements at bit position zero and next at bit position three, nodes 961 and 967 have bit indices of zero and three, respectively, thus forming tree 960 with three leaves sufficient to store the three values L, M and N. In that regard, root node 961 has zero branch 965 and one branch 963 emanating therefrom, with node 967 terminating the zero branch and a leaf containing value N terminating one branch 963. Node 967 has zero branch 969 and one branch 968 emanating therefrom which terminate at corresponding leaf nodes storing values L and M, respectively. While disagreements exist among these values at higher-order bits, such disagreements can be ignored since no further decision nodes are needed to provide a distinct path through tree 960 to each stored value.

b. Retrieval

Retrieving data from a Patricia tree involves searching the tree through use of a so-called key. Bit values of the key define a search path that will be traversed through the tree. Advantageously, Patricia trees exhibit a property that either the key will be identically stored in a leaf of the tree that terminates the path designated by the key or the key will not exist in the tree at all. In that regard, a key defines one and only one path through a conventional Patricia tree. Consequently, if a value specified by a key is stored in a Patricia tree, then that value can only be accessed through one unique path, as defined by the key, through the tree. Each leaf stores not only such a value but also, as a data item, a reference field, wherein information stored in the reference field is returned if the search is successful. Usually, the reference field is the object of the search with the key being a mechanism needed to uniquely traverse the tree. As we will describe below in conjunction with our inventive rhizome, the reference field illustratively stores a designation of a transmission queue while the key is correspondingly formed by appropriately concatenating classification fields.

Returning to FIG. 9A, assume that a search key of 0110010110 is provided; the goal is to determine whether this key is stored in this conventional Patricia tree. To determine this, one starts at the root of tree 900 and traverses along a search path therethrough. The search path incrementally progresses through the tree in a branch-wise fashion with the branch taken at each node being specified by a value of a bit in the key, that bit being designated by the bit index of that node. The retrieval operation ends when a leaf is reached. Specifically, given this search key, the root node of tree 900 carries a bit index of two, which, as symbolized by dashed line 903, designates bit two of the key. This particular bit is one which, in turn, causes the search path to then traverse one branch 910 of tree 900. The entire search path for this key is shown by arrows. The next node encountered is node 935 which has a bit index of three. Hence, bit three of the key is examined next. This particular bit in the key carries a zero value thereby causing the search path to next traverse zero branch 937 emanating from node 935. Next, node 940 is encountered which specifies a bit index of seven. Accordingly, bit position seven of the search key is examined. Inasmuch as the key has a one at this bit position, the search path traverses along one branch 944 to node 945. This particular node carries a bit index of nine. Bit position nine of the key contains a zero-bit; hence causing the search path to traverse along zero branch 947 emanating from node 945. Branch 947 leads to a leaf node at which value E is stored. Once this leaf node is encountered, the search key is compared to the value, here E (value 0010001100), stored thereat. Inasmuch as the search key, having a value of 0110010110, does not identically match the stored value at this leaf (i.e., search key≠E), the retrieval operation terminates with a result that the key is not present in the structure. Hence, the search was unsuccessful.

As one can clearly appreciate, many different search keys can often produce the same search path through a conventional Patricia tree. However, the search will succeed if and only if, as a result of the comparison operation, the stored value ultimately accessed at a leaf identically matches the key being searched. This is evident in FIG. 9B. Here, two search keys, i.e., keys 011011 (search key 1) and 010010 (search key 2), are applied to tree 960. Both keys result in a common search path, as given by arrows, through the tree, i.e., from root node 961, along zero path 965 (zero in bit zero of the key), to node 967 and along zero path 969 (zero in bit three of the key) emanating therefrom. This search terminates at a leaf node storing value L which is illustratively 011011. Inasmuch as value L matches search key 1 (011011), a search on key 1 succeeds with the reference field (not shown) associated with value L being returned as a result. In contrast, the search on search key 2, which traverses the same search path as search key 1, does not succeed. Specifically, this search progresses from root node 961, along zero path 965 (zero in bit zero of search key 2), to node 967 and along zero path 969 (zero in bit three of the this key) emanating therefrom. This search also terminates at the leaf node having stored value L. However, inasmuch as search key 2 (010010) does not identically match stored value L (011011), this search is unsuccessful.

c. Insertion

To sufficiently elucidate insertion and, as will be shortly discussed below, removal operations, we will digress slightly to first describe, prior to discussing insertion, the data stored at each node in a Patricia tree—inasmuch as this data is used and appropriately modified during each of these operations.

Figure 9C:
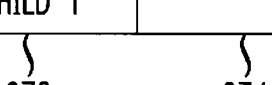
FIG. 9C depicts data stored at each node, either branch or data node, of a conventional Patricia tree, such as that illustratively shown in either FIG. 9A or FIG. 9B.

FIG. 9C depicts this data as collectively data structure 970, arranged, for ease of understanding, in columnar form.

In particular, data structure 970 contains data 972 which is stored at a branch node, and data 974 which is stored at each leaf (data node). Branch node data includes, in three separate fields, the pivot bit, and separate pointers (addresses) to child zero and child one of that node. The pivot bit is the bit index value associated with a corresponding branch node. Each data node stores two fields: a value, e.g., a pattern, which is ultimately matched against a search key, and a reference. The reference field is immaterial for search purposes and can store any item. As noted above, when a search of a key succeeds, the content of the reference field, stored at a corresponding data node at which the search terminates, is simply returned for subsequent use.

Figure 9D:
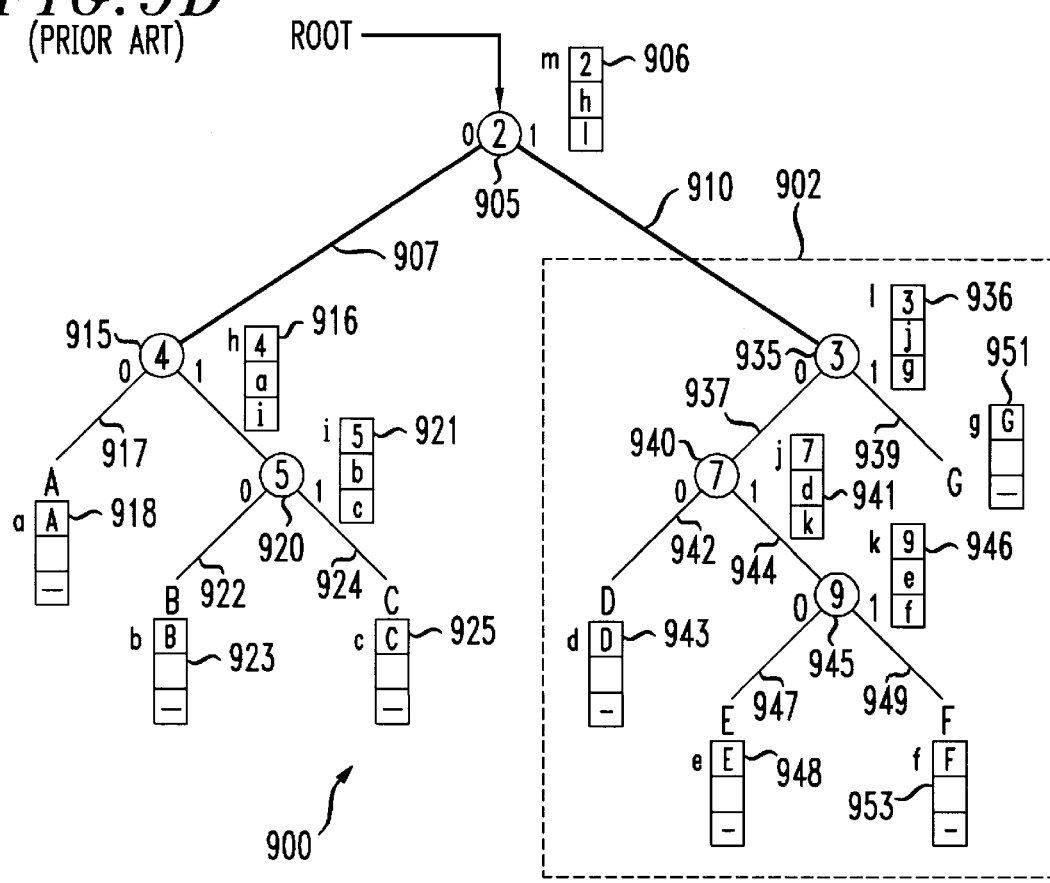
FIG. 9D depicts data stored at each node of conventional Patricia tree 900 shown in FIG. 9A.

With the above in mind, FIG. 9D depicts tree 900 shown in FIG. 9A and specifically the data stored at each node in that tree. A starting address at which the data structure for each node is stored in memory is designated by a lower case letter. Specifically, letters a, b, c, d, e, f and g designate these addresses for data structures 918, 923, 925, 943, 948, 953 and 951 which store data for the leaves that store values A, B, C, D, E, F and G, respectively. For example, inasmuch as data structure 918 exists for a leaf having stored pattern A, this structure stores value A, in lieu of a pivot bit, in a first field in this structure, and so forth for the data structures for the other leaves of the tree. To simplify presentation, data has been omitted from the reference field for all the data structures for the leaves of tree 900. Letters m, h, i, j, k and l designate starting addresses for data structures 906, 916, 921, 941, 946 and 936, that store data for branch nodes 905 (root), 915, 920, 940, 945 and 935, respectively. Data structure 906 stores data for the root node of the tree wherein the pivot bit contains the value two, and the following two fields in structure 906 contains addresses h and l as pointers to the child zero and child one nodes, respectively; address h being that for data structure 916 associated with node 915, and address l being that for data structure 936 associated with node 935; and so forth for all the other branch nodes in the tree. Inasmuch as the data structures themselves contain an implicit representation of the tree hierarchy, only these structures themselves are stored in O/S 110 (see FIG. 3) within memory 340.

We will now turn our attention to the insertion operation. For simplicity of illustration, we will discuss both the insertion and removal operations with specific reference to such operations performed on sub-tree portion 902, depicted in FIG. 9D, of conventional Patricia tree 900. Essentially, insertion involves creating a new data structure for each new node and altering the contents, specifically the pointers, in appropriate data structures then existing within the sub-tree portion, as well as storing appropriate pointers in the new data structure, to properly designate paths to and from the new node and existing nodes impacted thereby. Each time a new value is to be added to a Patricia tree exactly one new branch node and one new leaf node are created. The number of different values stored in a Patricia tree, and hence the number of its leaf nodes, always equals one more than the total number of its branch nodes.

Figure 9E:
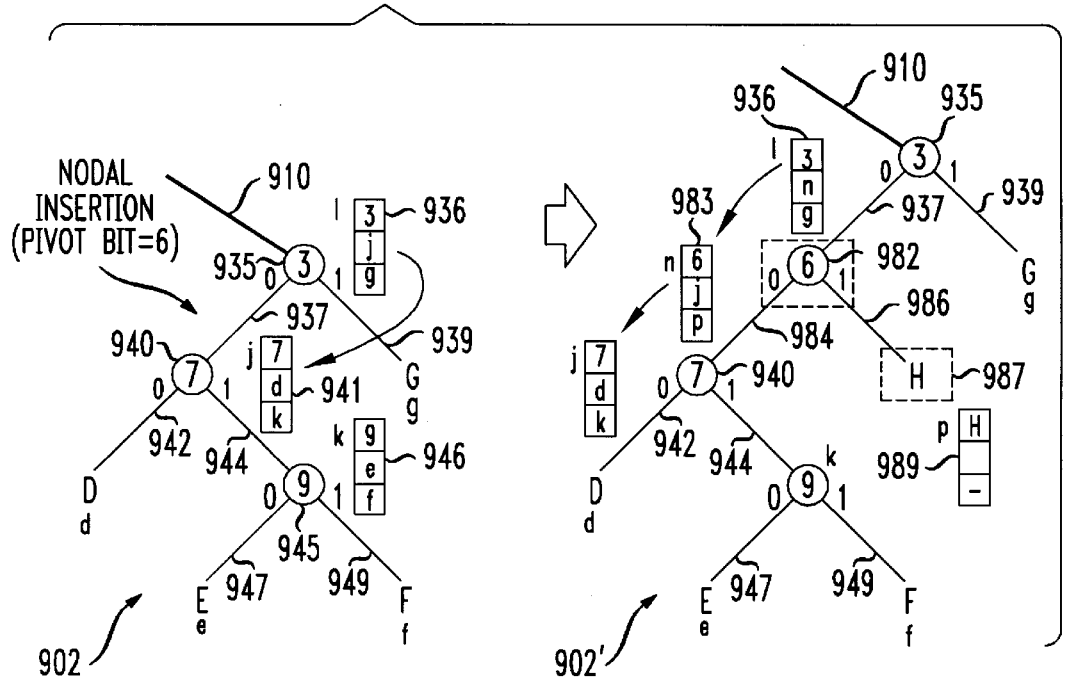
FIG. 9E depicts a conventional node insertion operation performed on sub-tree portion 902 shown in FIG. 9D.

FIG. 9E depicts a conventional insertion operation performed on sub-tree portion 902. Here, illustratively, a node with a pivot bit of six is to be inserted into sub-tree portion 902. This node, given the hierarchy within portion 902, is to be inserted on the child zero branch 937 between node 935, having a pivot bit of three, and node 940 having a pivot bit of seven. As shown, prior to insertion, the child zero pointer for node 935, specifically that stored within data structure 936, points to address j which is the starting address for data structure 941 for node 940; hence, as shown by arrows, linking the data structures for these two nodes together.

Inserting a node arises whenever a new and different value, here designated by H, is to be inserted within sub-tree portion 902. A new branch node is created with a pivot bit designating a lowest bit position at which a disagreement exists between the bits of the values presently stored in the sub-tree portion and the new value H. Here, such a disagreement illustratively occurs at bit position six. Hence, new node 982 (indicated by a dashed box) is created; memory is allocated for new data structure 983 at an illustrative starting address n with this new structure being stored thereat. The pivot bit for this node is set to six, as indicated within structure 983. A new leaf node (also indicated by a separate dashed box), specifically its associated data structure 989 containing value H, is also created with this data structure being assigned illustrative starting address p. The pointers of the existing nodes and new node are now set appropriately to modify the sub-tree to include the new node. In that regard, since new node 982 is reachable through the child zero branch of node 935, then the child zero pointer field for node 935, specifically that stored within data structure 936, is changed to point to new node 982, i.e., address n. The child zero and one branches for new node 982 and specified by addresses j and p are stored within data structure 983. As a result, sub-tree portion 902 is transformed into sub-tree portion 902' containing new nodes 982 and 987. Hence, rather than merely linking node 935 (pivot bit three) directly to branch node 940 (pivot bit seven) as in sub-tree portion 902, this linkage, in sub-tree portion 902' now extends through new node 982, as shown by the arrows therein.

d. Removal

Essentially, removal involves deleting desired nodal structure, specifically desired leaf nodes and associated branch nodes that provide unique paths to these leaf nodes, from the sub-tree portion and modifying the pointers of remaining affected nodes to exclude the deleted structure. For every stored value that is to removed from a Patricia tree only one leaf node and one corresponding branch node will be eliminated.

Figure 9F:
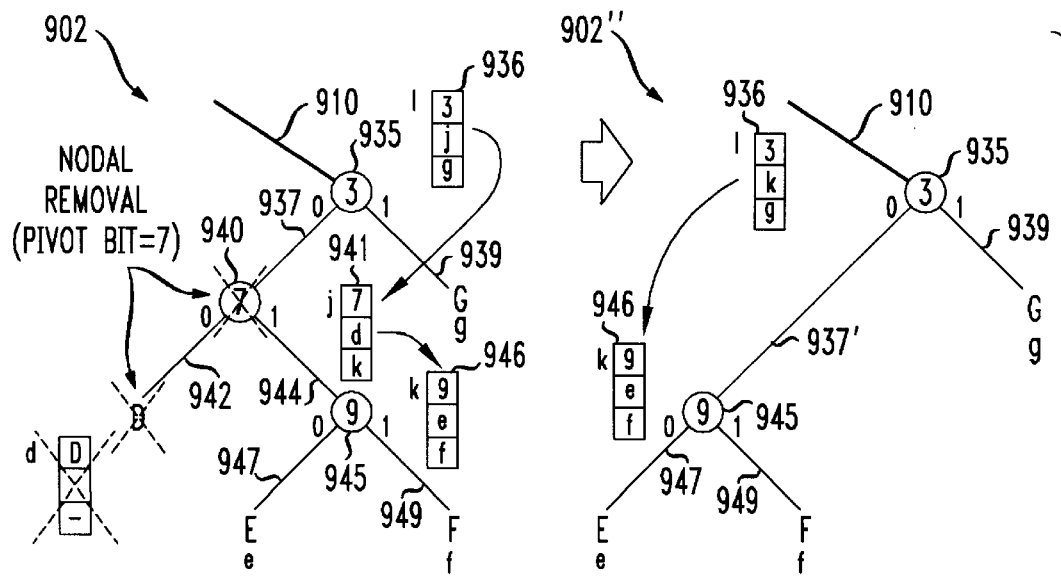
FIG. 9F depicts a conventional node removal operation performed on sub-tree portion 902 shown in FIG. 9D.

FIG. 9F depicts a conventional removal operation performed on sub-tree portion 902. Here, illustratively, a leaf node storing value D and associated internal node 940 (with a pivot bit of 7)—as indicated by dashed X's—are to be deleted from sub-tree portion 902. As shown, prior to deletion, the child zero pointer for node 935, specifically that stored within data structure 936, points to address j which is the starting address for data structure 941 for node 940. Node 940, in turn, points through its child one branch to node 945 (having a pivot bit of 9) having data structure 946 with a starting address of k. The linkages among the data structures for these three nodes is shown by arrows.

To remove a leaf node and its associated branch node—the illustrative structure to be removed here being indicated by dashed X's, pointers in remaining nodes are modified to appropriately point around the nodes to be removed followed by deleting the data structures, for these nodes, from memory and finally de-allocating the memory locations previously used thereby. In that regard, if illustrative value D is to be removed from sub-tree portion 902, then node 940 which provides a unique path to this leaf node is removed as well. To effectuate this, the child zero pointer in data structure 936, for node 935, is modified to point directly to node 945, i.e., to address k, rather than to address j. As such, sub-tree portion 902" results wherein node 935 (pivot bit three) directly links, via child zero branch 937', to branch node 945 (pivot bit nine), specifically address k for data structure 946, as shown by the arrow in this sub-tree portion. Once this occurs, leaf node D and branch node 940 are deleted from the tree; the memory locations used thereby are then appropriately de-allocated and made available for subsequent use.

For further information on a conventional Patricia tree, the reader is referred to: D. Morrison, "PATRICIA—Practical Algorithm to Retrieve Information Coded in Alphanumeric", *Journal of the ACM*, Issue 15, No. 4, October 1968, pages 514–534; D. Knuth, *The Art of Computer Programming, Vol. 3—Sorting and Searching* (©1973, Addison-Wesley Publishing Company), pages 490–499; and, for a well-known extension to a conventional Patricia tree: T. Merrett et al, "Dynamic Patricia", *Proceedings of the International Conference on Foundations of Data Organization*, 1985, pages 19–29—all of these references being incorporated by reference herein.

2. Our Inventive Rhizome a. Overview

As noted above, conventional Patricia trees do not accommodate wildcards at all. In sharp contrast, our inventive rhizome does. By doing so, our invention achieves retrieval efficiencies typically associated with conventional Patricia trees and with, though as not heretofore provided by the art, wildcard capability which advantageously and collectively renders our inventive rhizome particularly well suited for use in, e.g., a packet classifier. Through use of such a classifier, network packets can be classified very rapidly. Furthermore, not only can our inventive structure accommodate wildcards, but also this structure can retrieve, for an input key, stored wildcard-based pattern values in an increasing order of generality, i.e., for such stored values that are hierarchically related the most specific such stored pattern value will be returned first, as output, followed by each of those pattern values situated at a correspondingly increasing level of generality. As noted above, such a strategy is required of a packet classifier inasmuch as two classification patterns can be identical to each other or one such pattern can be subsumed within the other.

Essentially, through our inventive teachings, we have appropriately modified a Patricia tree, both in terms of its structure as well as the retrieval, insertion and deletion operations used in conjunction therewith, to provide a trie-indexed forest that accommodates hierarchically related wildcard-based stored values. Our inventive rhizome contains two interconnected data structures: a binary search trie (being a "search structure" once stored in memory or and/on a readable storage medium) and a hierarchy forest (being a "hierarchy structure" once stored in memory and/or on a readable storage medium)—the latter required to accommodate wildcard-based patterns and being totally absent from a conventional Patricia tree. Inasmuch as our inventive rhizome is particularly well suited for use in packet classification, for ease of understanding, we will discuss our inventive rhizome in the context of use with packet classification, for use in, e.g., scheduling, in which packet classification patterns, that contain wildcards, are stored in the structure.

Figure 10:
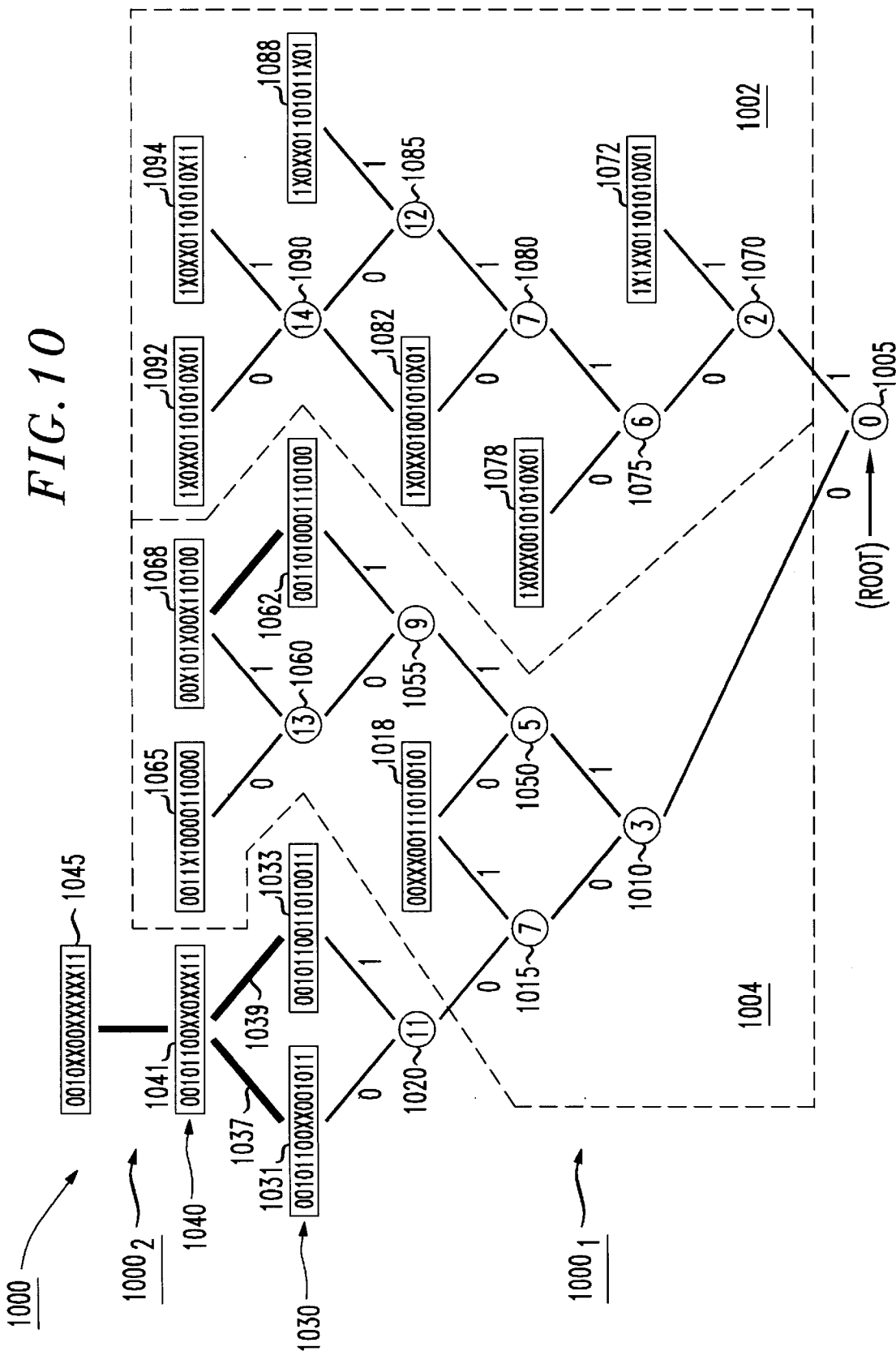
FIG. 10 depicts illustrative rhizome 1000 which embodies the teachings of our present invention.

In particular, FIG. 10 depicts illustrative rhizome 1000 which embodies the teachings of our present invention. As shown, rhizome 1000, which for enhanced readability is drawn upside-down with a root at the bottom, is organized into binary search trie 1000₁ (comprising branch nodes and child links), which feeds, rather than just individual leaves as in a conventional Patricia tree, hierarchically-arranged wildcard-based patterns in hierarchy forest 1000₂ (comprising pattern nodes and hierarchical links). A subset of nodes and their interconnecting links in our inventive rhizome can be regarded as a sub-structure, of which two are illustratively shown as 1002 and 1004. Each pattern node, such as node 1031, is indicated by a rectangle with a corresponding stored pattern associated with that node being indicated therein; each branch node, such as node 1010, is indicated by a circle with the value of the pivot bit for that node being specified therein.

Rhizome 1000 contains a forest of ten hierarchy trees. Generally speaking, a forest contains one or more trees. One such tree comprises pattern node 1045 at a root, pattern node 1041, pattern node 1031, and pattern node 1033. A second such tree comprises pattern node 1068 at a root and pattern node 1062. The remaining eight hierarchy trees are degenerate, each containing a single pattern node, those pattern nodes being 1018, 1065, 1072, 1078, 1082, 1088, 1092 and 1094. The thick lines in this figure, that connect pairs of individual pattern nodes, indicate a hierarchical relationship between the patterns stored within those nodes. In particular, for the hierarchy tree rooted at pattern node 1045, the lowest-level hierarchically related patterns stored therein, i.e., the most specific, are 00101100XX001011 and 0010110011010011 stored at level 1030 in pattern nodes 1031 and 1033, respectively. At the next higher level, i.e., level 1040, pattern 00101100XX0XXX11, by virtue of its wildcards, stored within pattern node 1041 subsumes patterns 00101100XX001011 and 0010110011010011. Hence, this hierarchical relation between node 1041 and each of nodes 1031 and 1033 is indicated by darkened lines 1037 and 1039, respectively. A similar hierarchical relationship exists between the patterns, i.e., 0011010001110100, and 00X101X00X110100, stored within nodes 1062 and 1068, and is so indicated by a darkened line as well. Furthermore, given the patterns in node 1041 in view of the pattern, i.e., 0010XX00XXXXXX11, stored within node 1045, the latter pattern subsumes the former pattern. Hence, a hierarchical relationship also exists between the latter node and the former node, and is so indicated by again a darkened line. Inasmuch as rhizome 1000 does not store any patterns that are increasingly more general, e.g., 0010XXXXXXXXXX11, than that in node 1045, node 1045, being the most general pattern in this hierarchy, occupies the highest level in this particular hierarchy tree.

For the hierarchy tree rooted at pattern node 1068, the most specific pattern is 0011010001110100 in node 1062. At a higher level, pattern 00X101X00X110100, by virtue of its increased generality, is stored in node 1068.

Figure 11A:
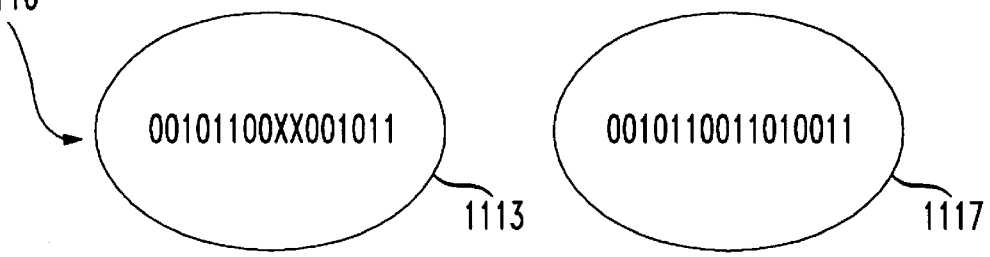
FIGS. 11A and 11B diagrammatically depict, through corresponding Venn diagrams, permitted hierarchical relationships between a pair of patterns stored in our inventive rhizome and specifically within hierarchy forest $1000_2$ shown in FIG. 10.
Figure 11B:
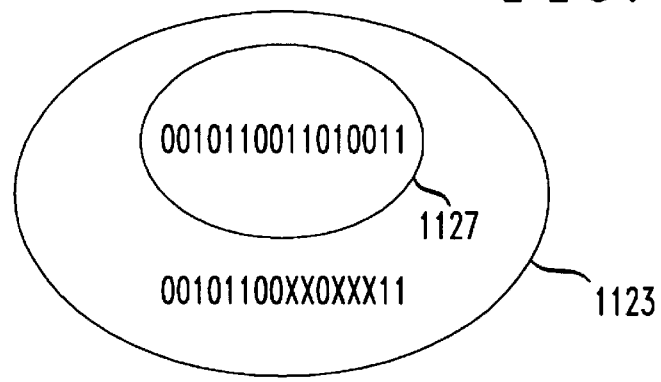

To generalize the relationships in a hierarchy forest, FIGS. 11A and 11B diagrammatically depict, through a Venn diagram, permitted hierarchical relationships among any pair of patterns stored in a rhizome, and specifically within hierarchy forest 1000₂ shown in FIG. 10. To fully appreciate this figure, the reader should simultaneously refer to FIGS. 10, 11A and 11B throughout the following discussion.

For any two stored patterns, apart from a trivial case of their identicality (which is not shown and will result in only one stored pattern in our inventive rhizome), two stored patterns can either be unique or subsumed one by the other, as represented by depictions 1110 and 1120, respectively, shown in FIGS. 11A and 11B, respectively.

In particular, if both patterns are unique, i.e., one is no more general than the other and neither subsumes the other, as is the case for illustrative patterns 00101100XX001011 and 0010110011010011, stored within nodes 1031 and 1033 at level 1030, then, as represented by corresponding circles 1113 and 1117 in depiction 1100, these patterns are stored independently of each other. The nodes may be indirectly interconnected, as nodes 1031 and 1033 happen to be by node 1041, or they may be completely separate, as is the case for most of the unrelated patterns in structure 1000.

Alternatively, if one pattern is subsumed within the other, as is the case for illustrative patterns 0010110011010011 and 00101100XX0XXX11 stored at nodes 1033 and 1041, then, as represented by circles 1127 and 1123 in depiction 1120, the more general pattern, here 00101100XX0XXX11, completely contains the more specific pattern, here 0010110011010011, and is stored at a higher hierarchical level, here level 1040, in the hierarchy tree than is the latter pattern, here at level 1030.

Figure 11C:
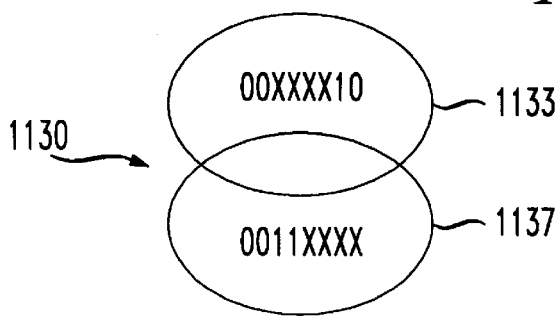
FIG. 11C diagrammatically depicts, through a Venn diagram, disallowed relationships between a pair of patterns stored in our inventive structure.

In addition to identity, independence, and subsumption, another possible relationship exists between two patterns as illustrated by depiction 1130 in FIG. 11C. In this depiction, pattern 00XXXX10 defines a set of sixteen values collectively represented by circle 1133; similarly, pattern 0011XXXX defines a set of sixteen values collectively represented by circle 1137. There are some values, such as 00000010, that fall within circle 1133 but do not fall within circle 1137; there are other values, such as 00110000, that fall within circle 1137 but do not fall within circle 1133; and there are still other values, such as 00110010, that fall within both circles. Therefore, these two patterns are not independent, but neither does either one of them subsume the other. Patterns that partially overlap in this manner may not be stored in our inventive rhizome, since no defined hierarchical relationship holds for these patterns. Such patterns are said to "conflict".

Now, returning to FIG. 10, search trie 1000₁ is situated immediately below and is connected to hierarchy forest 1000₂. The former implements a binary search trie which provides a unique path to each of those patterns situated at the lowest level hierarchy forest, and possibly to those at higher levels. This trie, often unbalanced as is the case here, is formed of branch nodes, each of which, as noted above, is indicated by a circle and contains a value of the corresponding pivot bit, i.e., the bit index. Also, for enhanced readability, zero and one branches project to the left and right, respectively, from each branch node. As shown, search trie 1000₁ contains branch nodes 1010, 1015, 1020, 1050, 1055 and 1060 all located on a left side of root node 1005; and branch nodes 1070, 1075, 1080, 1085 and 1090 all situated on a right side of root node 1005.

Generally speaking, the organization of the branches in the search trie, such as search trie 1000₁, and a corresponding pivot bit value at each branch node therein are both governed, in a similar fashion as with a conventional Patricia tree, by bit locations at which bits, in the patterns stored in the hierarchy forest, disagree. A unique search path is defined through the search trie to each pattern stored at the lowest level, and possibly to those at higher levels, of the hierarchy forest. As discussed above, the ordering in the hierarchy forest, such as forest 1000₂, is governed by whatever order of increasing generality, if any and by virtue of wildcards, exists among pairs of the stored patterns.

As one can see, by virtue of accommodating hierarchically related patterns, our inventive modified Patricia tree permits multiple nodes, either branch or pattern nodes and here illustratively branch nodes 1015 and 1050, to point to a common leaf, here illustratively pattern node 1018. In contrast, a conventional Patricia does not permit this condition inasmuch as only one node therein can point to any one leaf. However, as with a conventional Patricia tree, our inventive rhizome does not permit one-way branching.

b. Retrieval

As with a conventional Patricia tree, a search of our inventive rhizome is conducted on the basis of an input search key. In a conventional Patricia tree as discussed above, either the search key will match a value found by tracing through the tree or that key will not have a matching value anywhere in the tree. With our inventive rhizome, the search key will match either a specific pattern stored in the rhizome or a increasingly general pattern stored above it in a hierarchical chain, or that key will not have a matching pattern stored anywhere in the rhizome. Hence, the binary search trie effectively narrows down a search from an entire database of stored patterns to just a linear chain of patterns in order of strict hierarchy, the latter being usually substantially smaller in size than the former. A search succeeds if the retrieval process locates a stored pattern that most specifically matches, either identically or in terms of subsuming, the search key.

In particular, to determine whether an input search key exists in rhizome 1000, search trie 1000$_1$ is searched by first tracing through this trie and specifically branching at each node based on the value of a bit in a search key. Once the search reaches a lowest-level pattern node, the pattern stored at that node is tested against the search key. Inasmuch as the most specific pattern is to be returned for any search key, then if this lowest-level pattern does not match the search key, testing for a match continues, through hierarchy forest 1000$_2$, with the next higher pattern node in succession until all pattern nodes in a pattern hierarchy chain, that includes and extends from the lowest-level pattern node, have been tested. As soon as a pattern is found in the chain that subsumes the search key, the search is successful and the reference value associated with that particular pattern is returned for subsequent use. In the event no pattern in the hierarchy chain subsumes the search key within it or no such pattern hierarchy chain exists, then the search does not succeed and an appropriate indication therefor is provided by a retrieval routine.

To fully appreciate how a stored wildcard-based pattern is retrieved, let us discuss retrieval in the context of a few examples for rhizome 1000. First, consider the search key 0010110010001011. Searching begins at root node 1005, which has a pivot bit (bit index) of zero. Since the value of bit zero for this search key is zero, the search path traverses a zero branch, emanating from this node, to node 1010. This latter node has a pivot bit of three which for this particular key necessitates that the zero branch emanating from this node is traversed to node 1015. Node 1015 carries a pivot bit of seven, which for key 0010110010001011, identifies bit position seven therein here being a zero, thereby causing the search to traverse the zero path emanating from branch node 1015 to branch node 1020. This latter branch node carries a pivot bit of eleven, which, designates bit eleven in the key. Inasmuch as bit eleven of the exemplary key contains a zero, a zero branch emanating from node 1020 is then traversed to pattern node 1031. This pattern node contains the stored pattern 00101100XX001011. Since, owing to the wildcards within this pattern, the search key is subsumed within the pattern, the search is successful and the reference value associated with this particular pattern node is returned. No further matching occurs, inasmuch as any other higher-level pattern nodes, such as 00101100XX0XXX11 and 0010XX00XXXXXX11 in nodes 1041 and 1045, respectively, that subsumes the search key, owing to strict hierarchy in the rhizome, will be more general than 00101100XX001011.

As a further example, consider the search key 1001111101010101. Searching begins at root node 1005, which has a pivot bit (bit index) of zero. Since the value of bit zero of this particular search key is one, the search path traverses a one branch, emanating from this node, to node 1070. This latter node has a pivot bit of two which for this key necessitates that the zero branch emanating from this node is traversed to branch node 1075. Given this key, the search traverses, as a result of indexed bit positions in the key, through a one path emanating from node 1075 to node 1080, from a one path emanating from node 1080 to node 1085, from a zero path emanating from node 1085 to node 1090, and finally from a zero path from node 1090 to pattern node 1092. This pattern node contains the stored pattern 1X0XX01101010X01. This pattern, even with its various wildcards, does not match the search key of 1001111101010101 inasmuch as a bit disagreement occurs in bit position five (the search key having a one at this bit position; the stored pattern containing a zero thereat). Since node 1092 has no pattern hierarchy chain, the search is unsuccessful.

Lastly, consider the search key 0010110011001111. Beginning at root node 1005, the search path then traverses through nodes 1010, 1015, and 1020 and finally reaches pattern node 1031 which stores pattern 00101100XX001011. Though this particular pattern does not match the key—owing to a bit disagreement in bit position thirteen (here, a one in the key, a zero in the stored pattern), a pattern hierarchy exists above node 1031 in which patterns may be stored, specifically those within nodes 1041 and 1045, that might be sufficiently general to encompass this key. Consequently, the search successively traverses a hierarchical path emanating upward from node 1031 to locate the least general (most specific) pattern, if any exist, that subsumes the key. Pattern node 1041, which contains pattern 00101100XX0XXX11 that does subsume the key, is encountered. Hence, the search is successful with the reference value for node 1041 being returned for subsequent use. If, alternatively, the search key was not subsumed by pattern node 1041 but was subsumed by node 1045, then the search would still have succeeded; however, the reference field for node 1045 would have been returned instead of that for node 1041.

As one can appreciate, the search trie tends to drastically reduce the number of patterns that need to be examined to locate one that most specifically matches a given input search key. Moreover, owing to the strict hierarchy in which patterns at higher levels in a given hierarchy are strictly more general and hence completely subsume those at lower levels therein, then, if a bit-by-bit comparison is made of successive patterns in a pattern hierarchy chain against a search key, then as increasingly general patterns are encountered in that chain, there is no need to compare a bit in any bit position of the search key that has previously been compared against and found to match that in any lower level pattern in that chain. In particular, with the last example given above, bit position zero in the search key was found to match bit position zero in pattern 00101100XX001011 stored in node 1031. Hence, when a next higher pattern, i.e., that being 00101100XX0XXX11 in node 1041, is encountered, there is no need to recheck bit zero for the pattern stored in 1041 as that bit was already found to match, via pattern node 1031, that in the search key. In view of the strict hierarchy, re-checking bit positions that have already been found to match are redundant and hence can be advantageously eliminated to reduce retrieval time. Generally, the maximum number of bit comparisons that needs to be made to retrieve a given search key equals the number of bits in the key itself plus the number of patterns, in the longest hierarchy chain in the hierarchy forest, less one. In practice, further efficiencies might be gained by comparing bits in groups, such as bytes or nibbles, rather than singly since available processors can simultaneously compare certain-sized groups of bits just as fast as they can compare single bits.

c. Insertion

For insertion, the presence of a wildcard(s) in a pattern can cause complications. First, inserting a new pattern containing a wildcard(s) into our inventive rhizome is not as simple, as with a conventional Patricia tree, as inserting a new branch node, a new pattern node and a new path—as previously discussed in the context of FIG. 9E. A single wildcard in a pattern permits a corresponding pattern node to be reached by two different paths. Hence, insertion for our inventive rhizome, based on the bit position of the wildcard(s) in the new pattern, may require inserting multiple branch nodes, some with identical pivot bits, and multiple paths therefrom to reach the new corresponding pattern node. Second, if a pattern is to be inserted into our inventive rhizome that already contains one or more pattern nodes that each carries a wildcard(s), then existing portions of the rhizome may need to be fully or partially replicated to assure that existing pattern nodes can be reached through multiple paths, specifically via both sides of a new branch node that will be created for that new pattern node.

To sufficiently elucidate, for our inventive modified Patricia tree, insertion and, as will be shortly discussed below, removal operations, we will digress slightly to first describe, prior to discussing insertion, the data stored in memory at each node in our inventive rhizome—inasmuch as this data is used and appropriately modified during each of these operations. As will be seen, this data includes additional fields for handling these complications.

FIG. 13 depicts this data as collectively data structure 1300, arranged, for ease of understanding, in columnar form. This data structure, which, when stored in memory and/or on a computer readable medium, forms a "memory structure", encompasses all the fields for a conventional Patricia tree, as shown in structure 970 in FIG. 9C but with additional fields for both a branch node and a pattern node in order to accommodate wildcards and accompanying pattern hierarchy.

In particular, data structure 1300 shown in FIG. 13 contains data 1310 which is stored at a branch node, and data 1350 which is stored at each pattern node. Data for VALUE, MASK and IMASK fields 1315, 1320 and 1325, are stored for each node, regardless of whether that node is a branch or pattern node. The MASK and IMASK fields, which will shortly be defined and discussed in considerable detail below, are necessary to specify a wildcard(s) at a given pattern node and to propagate the existence of that wildcard(s), at that node, downward into underlying structure of the rhizome. The reason, as will be described in detail below, supporting the need for such propagation is to provide a mechanism at each branch node that indicates whether a section of the structure, starting at that node and extending upward, needs to be replicated (i.e., to provide alternate search paths) during insertion. This propagated information is also necessary, as will be discussed below, for determining, during removal, just how much structure in the rhizome is redundant, in view of a pattern to be removed.

Data specific to a branch node encompasses a pivot bit stored in field 1330, and pointers to child zero and one, of that branch node, stored in fields 1335 and 1340, respectively. Inasmuch as this particular data is used in exactly the same manner as in a conventional Patricia tree and has been discussed above, we will not dwell on that data any further.

Data specific to a pattern node encompasses a reference value and a pointer to a godparent node, as stored in respective fields 1360 and 1365. Reference field 1360 can store any arbitrary data and is used in much the same manner as the reference field in a conventional Patricia tree, i.e., the value of that field is merely returned for subsequent use in the event of a successful search terminating at that node. For use in a pattern classifier, the reference field usually stores a class designation for a packet, which for packet scheduling is a designation of a transmission queue. Generally speaking, whenever a new pattern is to be inserted into the rhizome, then a given unique designation is assigned to that pattern and stored in the reference field associated therewith. For any pattern node, field 1365 stores a pointer (address) to a "godparent" node. A godparent for a given pattern node is defined as a next higher-level hierarchically related pattern node. In particular, for a hierarchy chain of pattern nodes, the godparent of a given pattern node in that chain is the next higher pattern node in that chain that is more general that the given pattern node. The pattern node situated at the top of the hierarchy chain has no godparent. If no godparent exists for a pattern node, then a pre-defined null value is stored in godparent field 1365 for that pattern node. Further, by way of definition, for any pattern node that is a godparent, the node situated immediately below it in a hierarchical pattern chain and containing the next more specific pattern, is a "godchild" of that pattern node.

As with a conventional Patricia tree, pivot bit field 1330 stores the pivot bit, i.e., bit index, for a branch node associated therewith. Now, apart from this function, the data stored in pivot bit field 1330 also identifies the type of node, i.e., branch or pattern, for which structure 1300 stores data—this being necessary since, as noted above, the same data structure is used to store data for each of these two different nodes. In particular, for a branch node, the pivot bit field stores a bit index which has a value between zero and one less than the total number of bits in a stored pattern, inclusive. If a value stored in the pivot bit field equals the length of a stored pattern (all the patterns in a rhizome have the same length), then this indicates structure 1300 is storing data for a pattern node. In particular, for a rhizome containing eight-bit patterns, the pivot bit will store values from zero to seven, inclusive, for a branch node, but will be set equal to eight for each pattern node; and so forth for rhizomes storing patterns of other sizes.

Now, as to the VALUE, MASK and IMASK (being an abbreviation for an "inverse mask") fields, the purpose of each of these fields differs between a pattern node and a branch node. To facilitate understanding, we will discuss each of these fields, first in terms of its use in a pattern node and then in terms of its use in a branch node.

Simply stated, for any pattern node, VALUE field 1315 stores the actual binary pattern therefor.

Figure 2B:
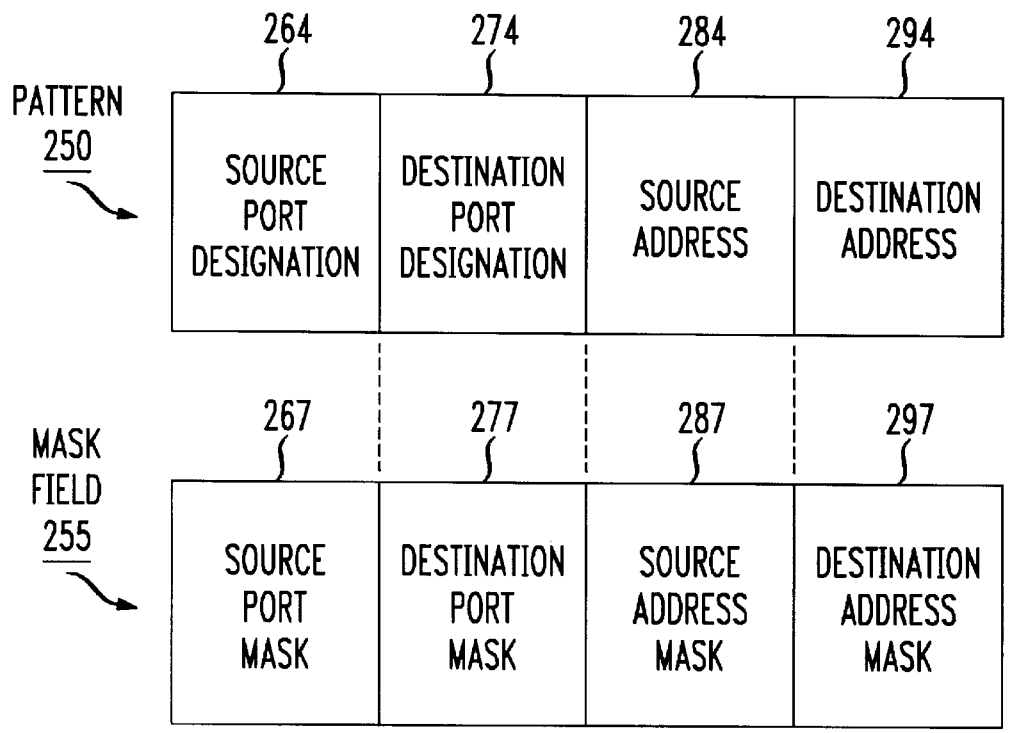

With respect to the MASK field used in any pattern node, this field specifies the existence of a wildcard in the corresponding pattern (stored in the associated VALUE field). In that regard, if a given bit in the MASK field is a zero, then the corresponding bit in a pattern is a wildcard (denoted by an "X" in the patterns shown, for example, in FIG. 10); if the given bit in the MASK field is a one, then the corresponding bit of the pattern equals the corresponding bit in the VALUE field. Thus, the pattern 00101100XX001011 (stored in pattern node 1031 shown in FIG. 10) is represented by a MASK field of 1111111100111111 and a VALUE field 0010110000001011. The two adjacent bits in the eighth and ninth bit positions in this pattern, given the wildcards situated there, are irrelevant and could equally be 00, 01, 01 or 11. However, to simplify the logic and testing used in our inventive insertion routine for our inventive rhizome, as discussed in detail below in conjunction with FIGS. 15, 16A and 16B, we set any bit position in the VALUE field, at which a wildcard exists at that bit position in the pattern, to zero. For a shorthand notation, though each of the pattern nodes situated in rhizome 1000 shown in FIG. 10 is formed of a combination of the VALUE and MASK fields, for this and other figures, a wildcard at any bit position in the VALUE field (identified by a corresponding zero bit in MASK field) is set to "X" to denote that wildcard. As shown in FIG. 2B and discussed above in conjunction therewith, a pattern, for use in packet scheduling, such as pattern 250, is formed by consistently concatenating the classification fields; a MASK field therefor, such as mask field 255, is formed by consistently concatenating the corresponding mask sub-fields for each of the individual classification fields.

As another example, consider the pattern 00101100XX0XXX11 stored in pattern node 1041 shown in FIG. 10, this pattern is represented by a VALUE field of 0010110000000011 and a MASK field of 1111111100100011. Likewise, consider the pattern 0010XX00XXXXXX11 stored in pattern node 1045. This pattern is represented by a VALUE field of 0010000000000011 and a MASK field of 1111001100000011.

For each pattern node, the IMASK field of that node is set equal to the IMASK field of its godparent, if it exists, of that node. For any pattern node that does not have a godparent, the IMASK field of that particular pattern node is set equal to its own MASK field. Inasmuch as pattern hierarchies in any hierarchy chain follow strict hierarchical rules as the chain is incrementally traversed upward to successively more general patterns, then, setting the IMASK field of a pattern node to that of its godparent is equivalent to stating that the IMASK field of that pattern node is equal to a conjunction (i.e., logical AND combination) of the MASK field of that node and the IMASK field of its godparent. This occurs because, as a result of the strict hierarchy in a pattern chain, the MASK field of the godparent is guaranteed not to have any bits set therein that are not set in the MASK field of the pattern node immediately below it (i.e., a godchild) in the chain.

Furthermore, in each instance where hierarchy is irrelevant or nonexistent, such as for a hierarchy chain that contains just one pattern node, then the MASK and IMASK fields of that pattern node are set equal to each other.

As noted above, the MASK, IMASK and VALUE fields serve a different purpose for any branch node than for any pattern node. Specifically, the fields of any given branch node specify, in condensed form, information about the fields of all patterns reachable from that branch node. There are five possible states maintained for each bit position: (a) all descendent patterns require that the bit be zero; (b) all descendent patterns require that the bit be one: (c) some but not all descendent patterns require that the bit be zero; (d) some but not all descendent patterns require that the bit be one; and (e) no descendent patterns care about the value of the bit. This information is necessary, as stated above, during: (a) insertion, for determining just how what portion of the rhizome needs to be replicated in order to insert a new pattern, and (b) removal, for determining, just how much structure in the rhizome is redundant, in view of a pattern to be removed.

In particular, the MASK field for any branch node is set to the disjunction (logical OR combination) of the MASK fields of its two child nodes, up to the bit position specified by the pivot bit of this branch node. Since this is a recursive definition extending upward through both the search and hierarchy structures, a bit value of one in a MASK field of a branch node indicates that at least one pattern node, reachable from (i.e., a lineal descendant of) that branch node, cares about the value of that bit. If a bit position in a MASK field of a branch node is a zero, then this means that no descendent pattern, i.e., any of those in a pattern hierarchy chain reachable from this branch node, cares about this bit position; hence, the value at this bit position is irrelevant to all those patterns.

The IMASK field for any branch node is set to the conjunction (logical AND combination) of the IMASK fields of its two child nodes, up to the bit position specified by the pivot bit of this branch node. Since this is also a recursive definition extending upward through both the search and hierarchy structures, a bit value of zero in an IMASK field of a branch node indicates that at least one pattern node, descending from that branch node, does not care about the value of that bit.

The VALUE field for any branch node is set to the disjunction of the VALUE fields of its two child nodes, up to the bit position specified by the pivot bit of this branch node. Since this is also a recursive definition extending upward through both the search and hierarchy structures, a value in a bit position of the VALUE field of a branch node indicates, if at least one pattern node in a pattern hierarchy chain containing this branch node cares about the value of this particular bit, just what that particular bit value is.

As stated above, a zero is set in the VALUE field of each pattern node at a bit position when a wildcard exists in that pattern. Should a one be used here instead of a zero, then determining a branch VALUE field for any branch node would require performing a conjunction operation instead of a disjunction operation.

Given the existence of pattern-based wildcards in our inventive rhizome, our inventive insertion process maintains the following attributes:

(a) each branch node can only have exactly two child nodes (children), each of which may be either another branch node or a pattern node;

(b) for any branch node and any descendent pattern stored within the structure, if the bit of that pattern indexed by the pivot bit of this branch node is a zero, then that pattern must be reachable via a child zero branch emanating from that branch node and not via a child one branch emanating from that branch node;

(c) for any branch node and any descendent pattern stored within the structure, if the bit of that pattern indexed by the pivot bit of this branch node is a one, then that pattern must be reachable via the child one branch emanating from that branch node and not via the child zero branch emanating from that branch node;

(d) for any branch node and any descendent pattern stored in the structure, if the bit of that pattern indexed by the pivot bit of this branch node is a wildcard, then this pattern must be reachable via both child one and zero branches emanating from that branch node;

(e) for any two patterns stored in the rhizome, if neither pattern is more general than the other, then there must exist a branch node that meets both of the following two conditions:

(1) the pivot bit index matches a first bit index at which these two patterns disagree; and (2) this branch node is reached by following a path, from the root node of the structure, taken by branching on all lower-indexed matching bits of the two patterns; and (f) for any two patterns stored in the structure, specifically within the hierarchy forest therein, if one of these patterns is more general than the other pattern, then the first pattern is a god-ancestor (meaning a godparent or a god-ancestor of a godparent, recursively) of the other pattern.

Figures 12A, 12B:
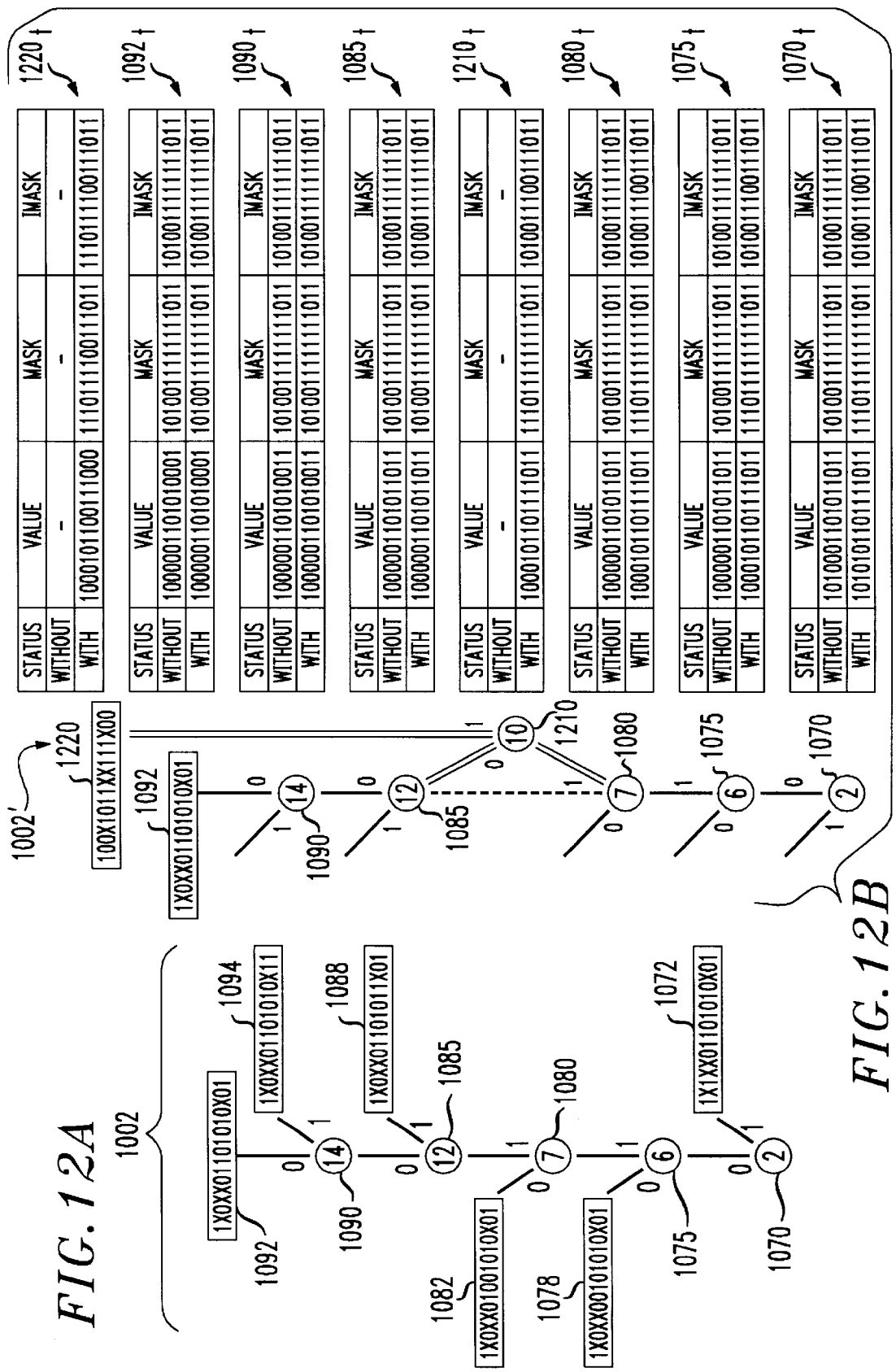
FIG. 12A depicts sub-structure portion 1002, as shown in FIG. 10, prior to a node insertion operation.
FIG. 12B depicts sub-structure portion 1002' which results after a node has been inserted into sub-structure 1002 shown in FIG. 12A, along with corresponding contents of VALUE, MASK and IMASK fields of each of the nodes shown in sub-structure portion 1002' both before and after the insertion.

To further enhance understanding, we will now turn to FIGS. 12A and 12B. These figures diagrammatically depict an insertion operation in our inventive rhizome and the resulting impact on the VALUE, MASK and IMASK fields. For ease of understanding, the reader should simultaneously refer to both of these figures during the course of the ensuing discussion.

Specifically and illustratively, a new pattern 100X1011XX111X00 is to be inserted into rhizome 1000 shown in FIG. 10. To simplify the drawings, FIG. 12A depicts a vertical chain in this rhizome that will be affected by this insertion. As can be seen from comparing this new pattern with those already stored in the rhizome, the lowest bit position at which a bit disagreement occurs is in bit position ten. Hence, a new branch node, with a pivot bit of ten, specifically node 1210, will be added to sub-structure 1002 shown in FIG. 12A. This new pattern will be stored in a new pattern node, specifically pattern node 1220. To provide proper links to this new pattern node, an existing link from a child one branch emanating from node 1080 to node 1085, this link indicated by a dotted line in FIG. 12B, will be removed and replaced by a link to new branch node 1210. The child zero branch of branch node 1210 will link to node 1085; the child one branch of new branch node 1210 will link to new pattern node 1220, thereby forming sub-structure, here vertical chain, 1002'. The new links inserted into sub-structure 1002 to accommodate the new pattern are shown by solid double lines. In addition, during node insertion, the contents of the VALUE, MASK and IMASK fields for those nodes in the chain below new branch node 1210 are all updated accordingly, through disjunction or conjunction as discussed above, to reflect the corresponding values for the new pattern node, particularly the wildcards therein. In that regard, to the right of each of nodes 1070, 1075, 1080, 1210, 1085, 1090, 1092 and 1220 in FIG. 12B are corresponding tables $1070_t$, $1075_t$, $1080_t$, $1210_t$, $1085_t$, $1090_t$, $1092_t$ and $1220_t$. Each of these tables specifies the contents of the VALUE, MASK and IMASK fields of that corresponding node both without the new node (status being "without"), i.e., for sub-structure 1002 in FIG. 12A, and with the new node having been inserted into the rhizome (status being "with"), i.e., for sub-structure 1002' in FIG. 12B.

Though the child one pointer would also be updated accordingly for node 1080, for simplification, all fields other than VALUE, MASK and IMASK for each of the nodes in sub-structure 1002' have been omitted from FIG. 12B. Based on the description, as given above, of each of these other fields, it will be quite apparent to those skilled in the art how the contents of those fields would be set or modified, as required, to accommodate insertion (as well as for removal as will be described immediately below).

d. Removal

Essentially, removal involves deleting desired nodal structure, specifically desired leaf nodes and associated branch nodes that provide paths to these leaf nodes, and modifying the VALUE, MASK and IMASK fields and associated child pointers of remaining affected nodes in the rhizome to eliminate the deleted structure. For every stored pattern that is to removed from our inventive rhizome, one or more branch nodes, depending upon any resulting redundancy in the structure occasioned by the removal, will be eliminated. Whether a branch node is to be removed or not is determined by whether the pattern being removed cares about the pivot bit of that branch node. If it cares, but no other hierarchically related pattern so cares, then that branch node is removed. Owing to wildcards, removal of a pattern node can engender removing a significant part of the search trie—not just one branch node and an associated path as shown in FIG. 9F for a conventional Patricia tree.

Figure 12D:
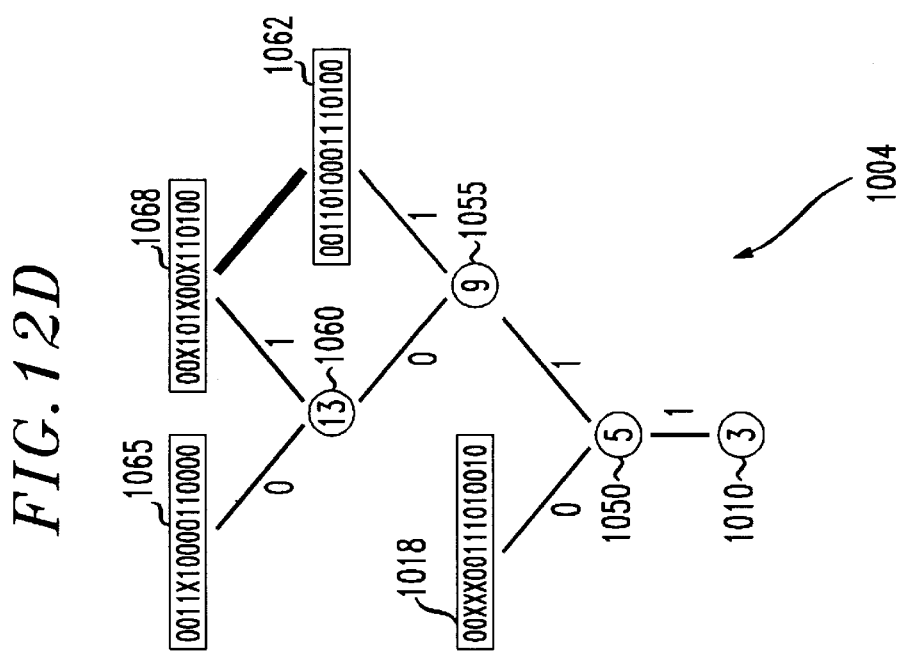
FIG. 12D depicts sub-structure portion 1004 of rhizome 1000 shown in FIG. 10.
Figure 12C:
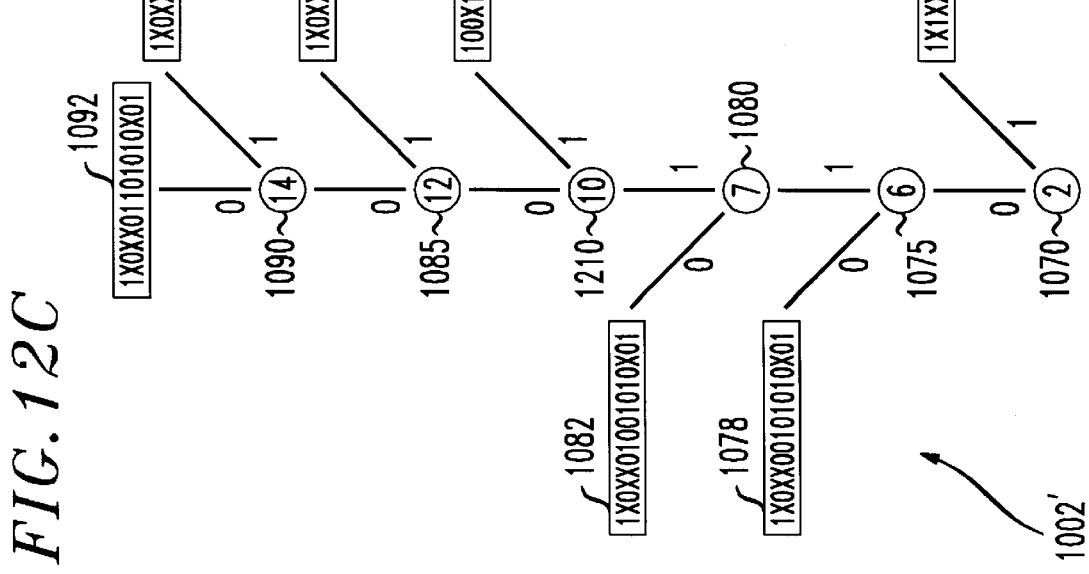
FIG. 12C depicts sub-structure portion 1002' prior to removal of node 1220 therefrom.

To illustrate removal consider FIG. 12C which depicts sub-structure 1002'. Pattern node 1220, which has been inserted into sub-structure 1002 shown in FIG. 12A to produce sub-structure 1002' shown in FIGS. 12B and 12C, will now be removed. Since this node is the only node that presents a bit disagreement at bit position ten, that node along with associated branch node 1210 are both removed. To do so, these nodes are simply deleted and the values of fields VALUE, MASK and IMASK are updated accordingly. The values for these fields, prior to removal, are indicated in the tables shown in FIG. 12B and specifically those under the "with" status designation. With the removal of these nodes, the resulting updated fields will contain the values shown in these tables, specifically those under the "without" designation.

e. Replication and Elimination of Rhizome Structure

1. Structural Replication Upon Insertion

As stated above, insertion of a new pattern node into our inventive rhizome may require a portion of the existing rhizome to be replicated. If a pattern node having a new pattern is to be inserted into the rhizome that already contains one or more pattern nodes that each carries a wildcard(s), then existing portions of the rhizome may need to be fully or partially replicated to assure that the extant pattern nodes can be reached through multiple paths, specifically via both sides of a new branch node that will be created for that new pattern node.

Figure 12F:
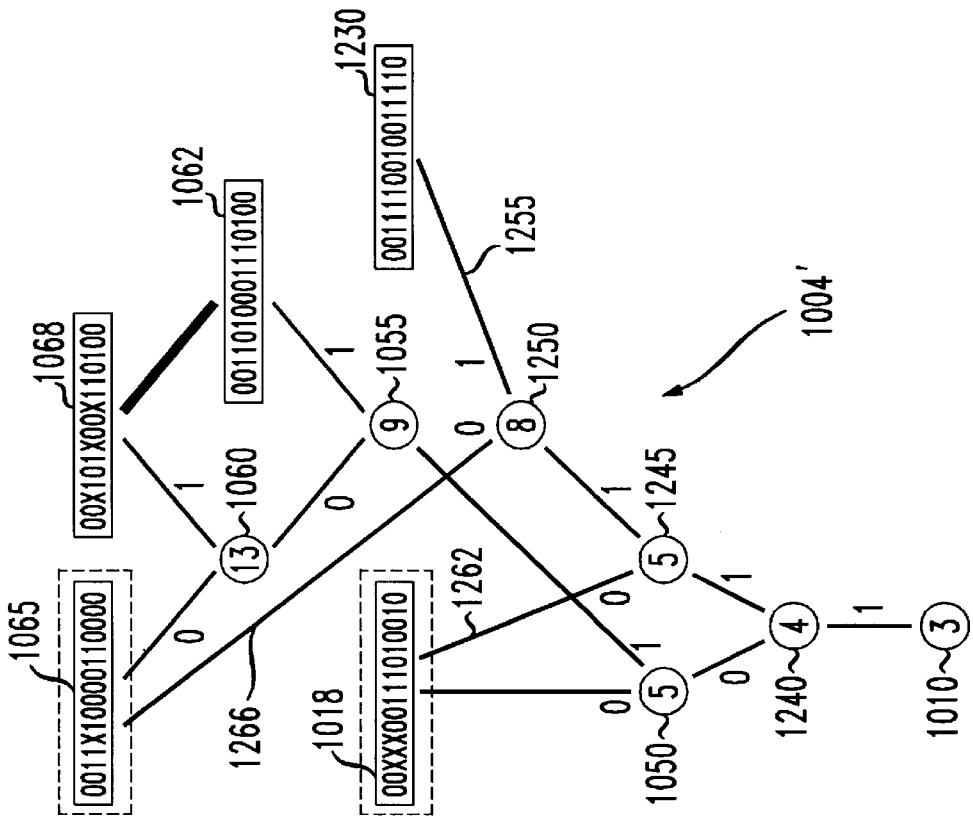
FIG. 12F depicts sub-structure portion 1004' which results after insertion of new pattern node 1230 into sub-structure portion 1004 shown in FIG. 12E.
Figure 12E:
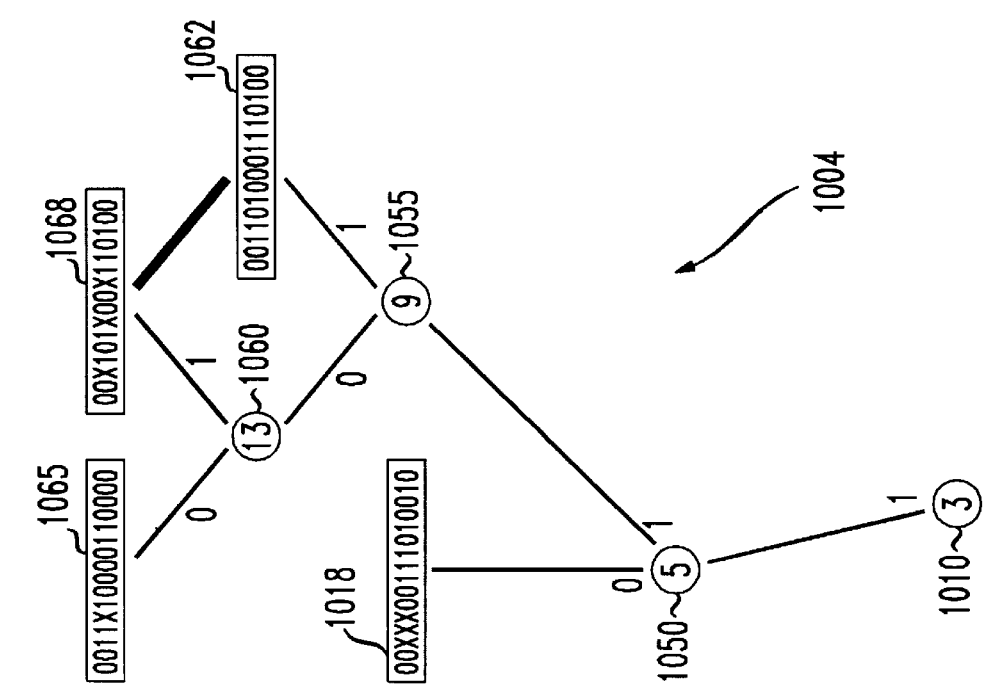
FIG. 12E depicts sub-structure portion 1004 in a re-oriented position prior to insertion of a new pattern node therein.

FIGS. 12D, 12E and 12F collectively depict an example of insertion that necessitates replication. Here, FIG. 12D depicts sub-structure portion 1004 of rhizome 1000 shown in FIG. 10. The nodes shown in FIG. 12D are re-arranged in FIG. 12E to provide room in the figure for newly added structure, to be shown in FIG. 12E. Here, a new pattern, specifically 0011110010011110, is to be inserted into sub-structure portion 1004. Once inserted, sub-structure portion 1004' depicted in FIG. 12F results. The new pattern, stored in pattern node 1230, causes the creation of new branch node 1240 with a pivot bit of four. This occurs inasmuch as the first bit at which a disagreement now occurs, between any existing pattern stored in the structure and the new pattern, is at bit position four. Since existing patterns 0011010001110100 and 00X101X00X110100 that disagree with the new pattern have a zero in bit position four, the existing sub-structure for these particular patterns must reside below child zero of the new branch node. Moreover, since two of the patterns reachable through new branch node 1240, specifically 00XXX00111010010 and 0011X10000110000, have a wildcard in bit position four, these patterns must be reachable from both sides of this new branch node. Therefore, structure leading to the pattern nodes for these two patterns must be replicated below child one of the new branch node. Inasmuch as the first bit at which these two particular patterns disagree amongst themselves occurs at bit position five, then branch node 1050 is replicated as branch node 1245 to distinguish between these two patterns. Finally, a new branch node 1250 with a pivot bit of eight is created to completely distinguish the newly inserted pattern from those already in the structure. The replicated structure, here pattern nodes 1018 and 1065 contained in dashed blocks, is achieved by additional child zero paths 1262 and 1266 emanating from new branch nodes 1245 and 1250, respectively. To greatly simplify FIGS. 12D–12F, the values of the VALUE, MASK and IMASK fields have been intentionally omitted, for each of the nodes, therefrom; nevertheless, these values can be easily determined through the specific manner set forth above.

2. Structural Elimination Upon Removal

As noted above, owing to the presence of wildcard(s) in a stored pattern(s), removal of a pattern node, whether itself contains a wildcard or not, can engender removing a significant part of the search trie—not just one branch node and an associated path as is the case with a conventional Patricia tree.

Similar to our prior description of FIGS. 12C and 12B in the case of removal, consider FIG. 12F and 12E which depict sub-structures 1004' and 1004, respectively. Pattern node 1230, containing pattern 0011110010011110, which has been inserted into sub-structure 1004 shown in FIG. 12E to produce sub-structure 1004' shown in FIG. 12F, will now be removed from sub-structure 1004'. Here, the branch node, i.e., branch node 1250 with a pivot bit of eight, that is a parent to this particular pattern node (node 1230), would be left with only one child branch upon removal of this pattern node and thus should be removed. Consequently, once this branch node is removed, pattern node 1065 containing pattern 0011010000110000 would extend from a child one branch of branch node 1245 which has a pivot bit of five. Since at this point, none of the patterns descending from branch node 1240, having a pivot bit of four, would care about the value of the bit in bit position four, this branch node can be removed as well, with its child one branch also being eliminated. Consequently, the sub-structure that results from removing pattern node 1230 is sub-structure 1004 depicted in FIG. 12E.

D. Software Routines for Use with Our Inventive Rhizome for Packet Classification There may exist applications for which it is necessary to store patterns containing wildcards in a database, yet for which no need for hierarchical pattern retrieval is necessary. In such cases, virtually all of the structure thus far described is still required, with the exception of the godparent pointer 1365 in nodal data structure 1300, which can be omitted. However, the routines which implement retrieval, insertion, and removal can be simplified significantly for such applications. Therefore, the present section will describe two embodiments of the invention, the hierarchical rhizome and the non-hierarchical rhizome, and the routines will similarly be known as hierarchical retrieval and non-hierarchical retrieval, and so forth. To simplify reader understanding, the description refers to the hierarchical rhizome, in keeping with the description thus far presented. Where appropriate, the ensuing description will specifically delineate those portions of the routines which can be deleted for the non-hierarchical embodiment.

Of all the operations, i.e., retrieval, insertion and deletion, to be performed on our inventive rhizome, retrieval is expected to be the most frequently used, and in that regard, substantially more often than will either insertion or deletion. In the context of a packet scheduler, this will occur because each and every packet destined for network transport will need to be separately classified to determine its corresponding transmission queue. In that regard, for each such packet, its classification fields, i.e., its source-destination addresses and source-destination port designations, will be used in concatenated form, as a search key, to retrieve an associated queue designation from our inventive rhizome. Insertion and deletion, on the other hand, will be used merely to establish or remove queue designations from the rhizome. Clearly, these two operations will not be used with each and every packet. Given this, the retrieval operation used with our inventive rhizome is intentionally far simpler and significantly faster than both the insertion and deletion operations.

1. Retrieval (Search) Routine

FIG. 14 depicts a flowchart of Retrieval routine 1400 which executes as step 580 shown in FIG. 5B within pattern classifier 410 shown in FIG. 4. Given an input search key, routine 1400 searches our inventive rhizome in an attempt to locate a stored pattern, in a pattern node, that matches or, in its least general form, subsumes the search key, and then return a reference value, i.e., a queue designation for packet scheduling, associated with the resulting pattern.

Upon entry into routine 1400, execution first proceeds to decision block 1405, which determines whether the entire rhizome (structure) is empty. If the rhizome is empty, then clearly no match will result; the search is unsuccessful. In this case, execution exits from the routine, via YES path 1407 emanating from decision block 1405, and a "no match" message is returned. Alternatively, if the rhizome is not empty, then execution is directed, via NO path 1409, to block 1410. This latter block initializes a pointer to point to the root node of the rhizome, specifically that within the search trie thereof. Execution proceeds to a loop containing blocks 1415 and 1420 which appropriately traverses through the search trie based on the bits of the search key and the pivot bits of the branch nodes in that trie. In particular, execution proceeds to decision block 1415 which tests, through examining the pivot bit field as discussed above in conjunction with FIG. 13, whether the pointer currently points to a pattern node. If the pointer does not currently point to a pattern node, but rather to a branch node, then this decision block routes execution, via NO path 1417 shown in FIG. 14, to block 1420. This latter block, when executed, examines the bit of the search key designated by the pivot bit of this branch node to which the pointer is currently pointing. Thereafter, this block sets the value of the pointer to point to a child (child one or zero) of this branch node as specified by this bit in the search key. Execution then proceeds, via feedback path 1422, back to decision block 1415 to test the type of a latest node to which the pointer is currently pointing, and so forth until a path is fully traversed through the search trie and a pattern node is first encountered.

When decision block 1415 determines that the pointer is pointing to a pattern node, then it routes execution, via YES path 1419, to block 1425. This latter block initializes a bit index to zero. Thereafter, a loop is entered containing blocks 1430, 1440, 1450, 1462 and 1466, to perform a bit-by-bit comparison on each pattern encountered including patterns in godparent nodes in a hierarchical pattern chain.

In particular, decision block 1430 determines whether the bit index has a value less than the number of bits in the search key (the length of which is the same as that of all the patterns in the rhizome). If not, then all bits in the search key have been tested, and hence retrieval is concluded. In this case, execution exits, via NO path 1434 emanating from decision block 1430. At this point, the pointer will have been set to point to a stored pattern that is the most specific match to that of the search key. In this case, the search has succeeded; the value of the reference field associated with this stored pattern is returned.

Alternatively, if more bits remain to be tested, i.e., the bit index is less than the number of bits in the search key, then decision block 1430 routes execution, via YES path 1432, to decision block 1440. Decision block 1440 determines whether the value of the particular bit, designated by the current value of the bit index, in the search key matches a value situated in the same bit position in the stored pattern in the pattern node to which the pointer is currently pointing. If these bit values match, meaning either that they specify the same value or that the bit in the pattern is a wildcard, then decision block 1440 routes execution, via YES path 1442, to block 1450. This latter block, when executed, increments the bit index to point to the next bit position. Thereafter, execution loops back, via path 1470, to decision block 1430 to test a bit in the next successive bit position in the search key against that in the stored pattern, and so forth.

In the non-hierarchical retrieval routine, the blocks within dotted box 1460, specifically decision block 1462 and block 1466, can be omitted. If, in this case, as a result of decision block 1440, a bit of the search key does not match a bit in the same bit position in the stored pattern for the first and only pattern node encountered, then there is no match and the retrieval operation is unsuccessful. Hence, execution exits from routine 1400, via dashed path 1480, with a "no match" message being returned.

In the hierarchical retrieval routine, the operations in dotted box 1460 are performed. Accordingly, once a bit is encountered in the search key that does not match a bit in the same bit position in the stored pattern in the current pattern node, comparison is continued with a godparent of that pattern node, should that godparent exist. Hence, if a match, at the present bit position, between the search key and the stored pattern in the current pattern node is not found, then decision block 1440 routes execution, via NO path 1444, to decision block 1462. This latter decision block, when executed, determines whether the current pattern node has a godparent node by testing its pointer to godparent field 1365 shown in FIG. 13. As noted above, if a current pattern node does not have a godparent node, a null value will be stored in this field. If the current pattern node has a godparent, as indicated by this field, then decision block 1464 shown in FIG. 14, routes execution, via YES path 1464, to block 1466. This latter block sets the pointer to point to this godparent node. Execution then loops back, via path 1470, to test the search key against one or more successive bit positions in the pattern stored in this godparent node. As noted above, by virtue of the strict hierarchy inherent in the hierarchy structure, specifically in hierarchical pattern chains therein, there is no need, at any pattern node in the chain, to recheck any bits at bit positions that have already been tested at lower levels in the chain. Accordingly, the bit index is not reset prior to looping back, via feedback path 1470, to decision block 1430 in order to match successive bit(s) in the search key against bit(s) in the same successive bit position (s) in pattern stored in this godparent node.

Alternatively, if the current pattern node does not have a godparent node, meaning that routine 1400 has now reached the end of a hierarchical chain and a match has not been found between the search key and stored patterns in all the pattern nodes in that chain, i.e., no pattern stored in a node in that chain identically matches or subsumes the search key, then the retrieval is unsuccessful. Accordingly, execution exits from routine 1400, via NO path 1468, with a "no match" message being returned.

2. Insertion Process i. Insertion Routine 1500

FIG. 15 depicts a flowchart of Insertion routine 1500 which is executed by pattern classifier 410 shown in FIG. 4. This routine, combined with routine 1600, is used to insert a new pattern node into our inventive rhizome. Apart from routine 1600, which will be discussed shortly below in conjunction with FIGS. 16A–16B, routine 1500 performs relatively few operations.

In particular, routine 1500 is entered with two parameters: VALUE and MASK. Together, as noted above, these parameters collectively specify the new pattern to be inserted, including its wildcard(s), if any. Upon entry into routine 1500, execution first proceeds to block 1510. This block, when executed, allocates sufficient memory area to accommodate a new pattern node, i.e., sufficient memory locations to store data structure 1300 (as shown in FIG. 13) for this new node. Once this allocation has occurred, block 1510 then sets the values of various fields in this structure appropriately for this new node. In particular, in order to insure that the bits of the VALUE field that correspond to wildcard indications in the MASK field are zero, the VALUE field is set to the conjunction of the given VALUE and MASK values supplied, upon entry, to this routine. The MASK and IMASK fields are set equal to the MASK value supplied to this routine. The pivot bit for this new node is set equal to the number of bits in this pattern (thereby, as in the manner stated above, distinguishing this node from a branch node). Thereafter, the pointer to godparent field for this new pattern node is set equal to a null value. Finally, the reference field is then appropriately set to a particular predefined data value, e.g., a queue designation, given for this node. Since the manner through which the value for the reference field is determined and assigned is immaterial to the present invention, it will not be described in any further detail.

Once block 1510 completes its execution, execution proceeds to decision block 1520. This decision block tests whether the rhizome (structure) is empty. If so, then the new pattern node simply becomes the root of the rhizome. In this case, the decision block routes execution, via YES path 1527, to block 1540 which sets the root of the search trie to point to the new pattern node. Thereafter, execution exits from insertion routine 1500. Alternatively, if the rhizome is not empty, then decision block 1520 routes execution, via NO path 1523, to block 1530. This latter block executes Node Insert routine 1600 to properly insert the new pattern node into the rhizome. This routine is called with two specific arguments; namely, a pointer to the root node of the rhizome, a bit index of "−1". Inasmuch as bit positions, as noted above, start with a zero value, a value of "−1" specifies that no bits of a search key have been examined thus far, i.e., an initial condition. Inasmuch as routine 1600 is recursively invoked, as and if needed, to insert and replicate structure required to handle the new pattern node being inserted, then, once routine 1600 has fully completed its execution, including all recursive iterations thereof, block 1523 completes its execution. Thereafter, execution simply exits from routine 1500.

ii. Node Insert routine 1600

Figure 16A:
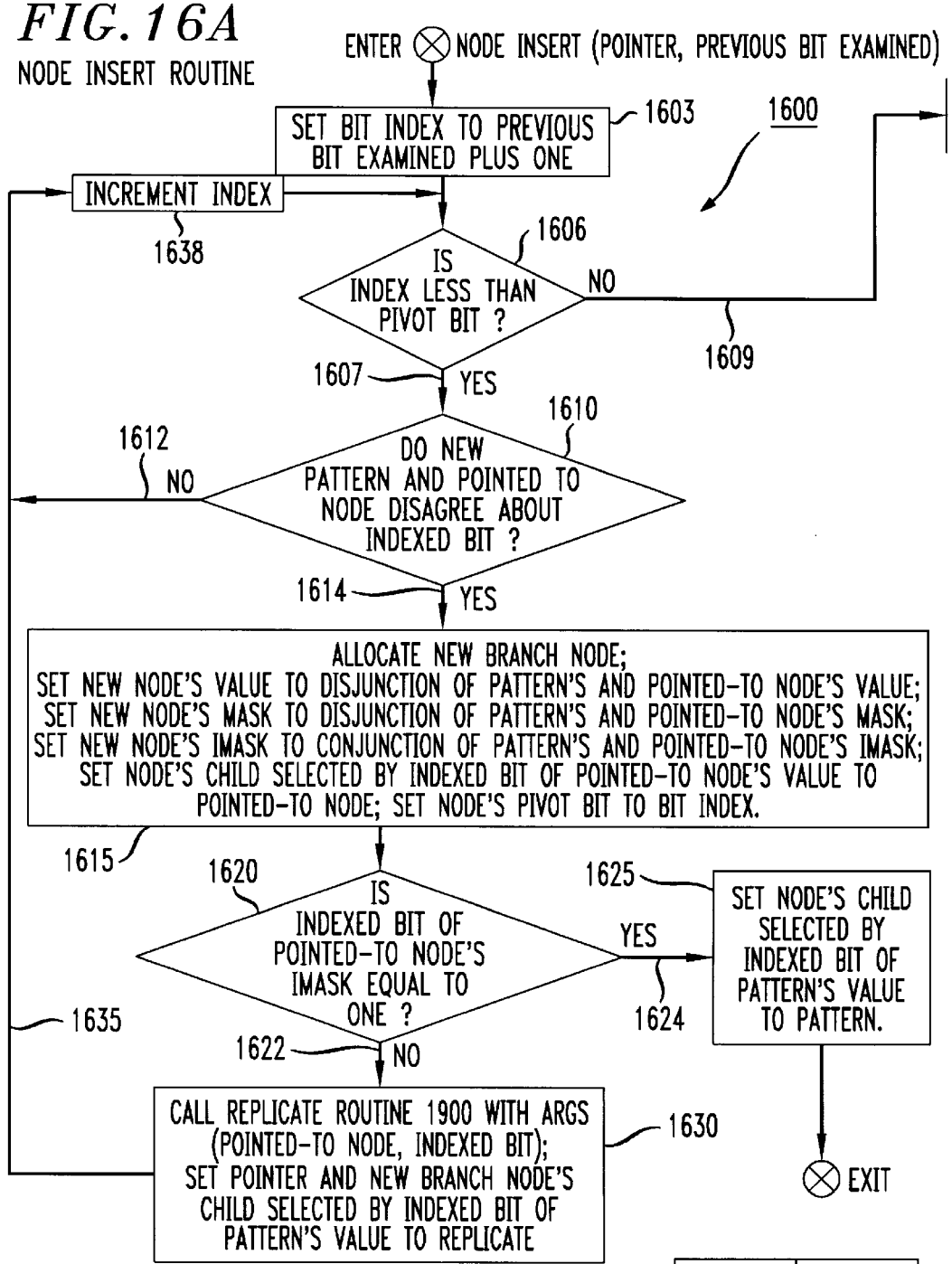
FIGS. 16A and 16B collectively depict a flowchart of Node Insert routine 1600 that is executed by, e.g., Insertion routine 1500 shown in FIG. 15.
Figure 16B:
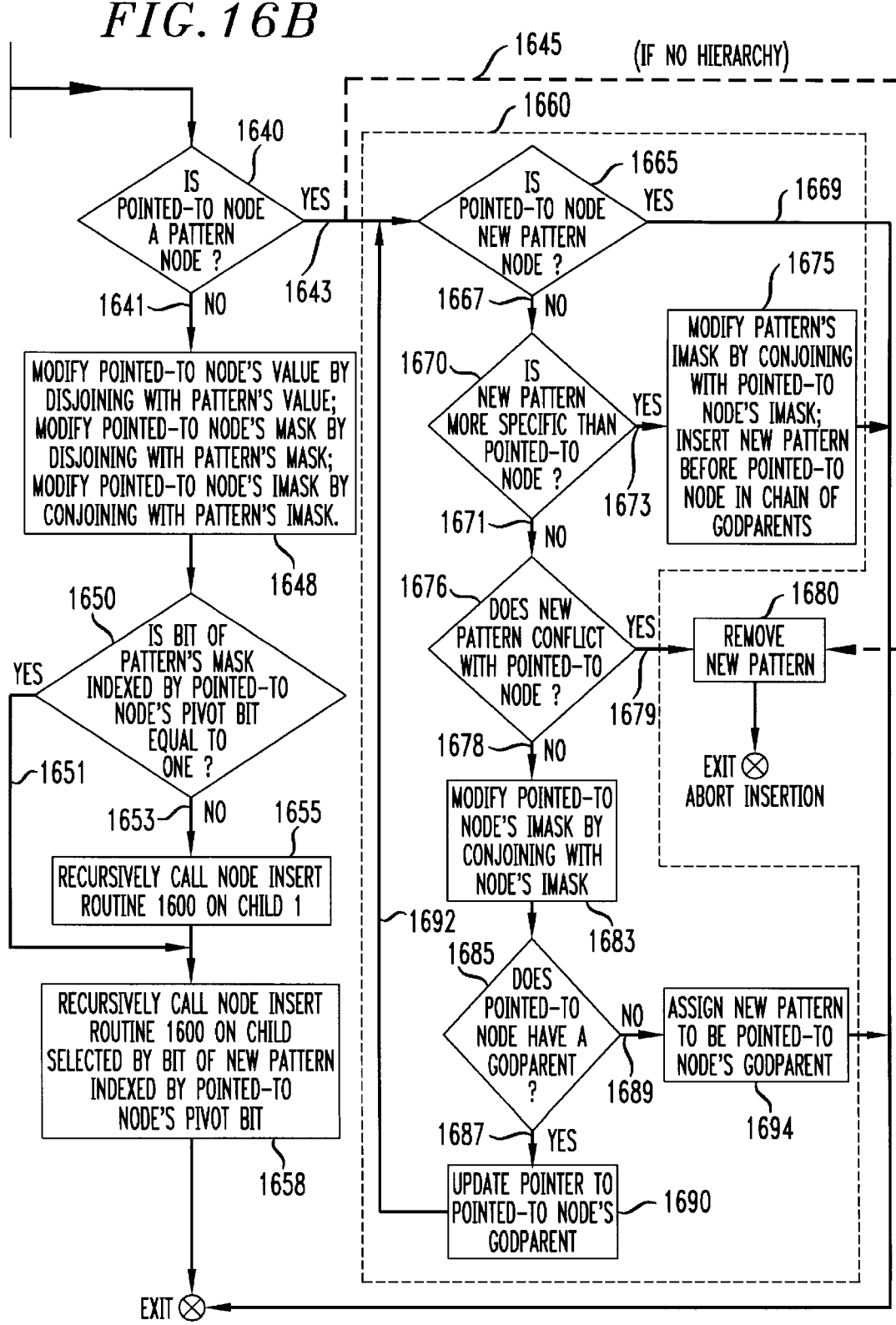

A flowchart of Node Insert routine 1600 is collectively depicted in FIGS. 16A–16B; the correct alignment of the drawing sheets for these figures is shown in FIG. 16. As noted immediately above, routine 1600 properly inserts a new pattern node into the rhizome and is called recursively, if necessary, to replicate appropriate amounts of rhizome structure.

Routine 1600 is entered with two parameters: POINTER and PREVIOUS BIT EXAMINED. The value of POINTER specifies a current node being examined, which is initially set to point to the root node; PREVIOUS BIT EXAMINED, which is initially set to "−1", specifies a bit position of the new pattern that was last examined by this routine, which, for any non-negative setting, occurred through an immediately prior recursive execution thereof.

We will describe this routine first in a summary overview fashion then in detail.

Essentially, routine 1600 first examines all of the bit indices between that of a previous branch node, starting at the root node, and that of a current node indicated by the value of POINTER (which hereinafter we will also refer to, for clarity, as the "pointed-to node"). If corresponding bits of a new pattern and the pointed-to node disagree at any of these bit indices, then this routine inserts a new branch node above the current node. The current node becomes one child of the new branch; a new pattern node, storing the new pattern, becomes the other child. However, if any of the descendants of the pointed-to node do not care about the value of the pivot bit of the newly inserted branch node, then these descendants must be copied (i.e., replicated) to the other child of the new branch node. If any such nodes are so copied, then this routine continues with the other child node. Alternatively, if no nodes are copied, then the new pattern node, for the new pattern, can be inserted directly as the other child, after which point this routine terminates.

Now, when all of the bit indices up to that of the pointed-to node have been examined, and if the new pattern node was not already inserted, routine 1600 determines whether the pointed-to node is a pattern node or a branch node.

If the pointed-to node is a branch node, then this routine will update the fields (specifically VALUE, MASK and IMASK) for the pointed-to node, and will recursively call itself. Specifically, if the new pattern does not care about the value of the bit specified by the pivot bit of the pointed-to node—i.e., a wildcard exists in new pattern at this bit position, then this routine recurses itself on both children of this node. Otherwise, if the new pattern does not have a wildcard at the bit position indexed by the pivot bit of the pointed-to node, then routine 1600 only recurses itself on the child determined by the bit at this position in the new pattern.

Alternatively, if the pointed-to node is a pattern node, then routine 1600 traces through a pattern hierarchy chain updating each successive pattern node encountered. This continues until one of four conditions occurs: (a) the new pattern is already found in the chain (because it was previously inserted via another path) in which case insertion is complete, and the routine simply exits; (b) the new pattern is more specific than that of a pattern found at a then pointed-to node in the chain, in which case the new pattern is inserted before the pointed-to node and routine 1600 terminates; (c) the new pattern conflicts (as illustrated in depiction 1130 in FIG. 11C) with a pattern found at a then pointed-to (pattern) node in the chain in which case this pointed-to node is removed from the rhizome (if it had been inserted elsewhere therein) and execution of routine 1600 aborts; and (4) the pointed-to (pattern) node does not have a godparent, in which case a new node, for the new pattern, is inserted above the current pattern node in the pattern hierarchy chain.

Specifically, upon entry into routine 1600, execution first proceeds to block 1603. This block, when executed, sets a bit index to equal the PREVIOUS BIT EXAMINED plus one (which in the case of the initial execution of this routine becomes zero, hence pointing to the first bit in the new pattern). Execution then proceeds to a loop containing blocks 1606–1638 to successively examine each bit in the new pattern, against the corresponding bits in the fields of the pointed-to node, up to that specified by the pivot bit of the pointed-to node in order to locate any bit disagreement therebetween. In particular, decision block 1606 tests whether the bit index is less than the pivot bit for the pointed-to node.

If the bit index is less than the pivot bit of the pointed-to node, then decision block 1606 routes execution, via YES path 1607, to decision block 1610. The latter decision block determines, by examining corresponding bits, whether a bit, specified by the bit index, in the new pattern and that in the pointed-to node disagree, meaning that one pattern specifies that the bit be zero and the other pattern specifies that it be one. If no such disagreement exists, then execution is fed back from decision block 1610, via NO path 1612, to block 1638, which, when executed, increments the bit index by one to point to the next bit. Execution then proceeds to decision block 1606 to test this next bit, and so forth. Alternatively, if such a disagreement exists, then decision block 1610 routes execution, via YES path 1614, to block 1615. Consequently, a new branch node must now be inserted into the rhizome, specifically the search trie therein, with a pivot bit that specifies the bit position where the disagreement exists. To do so, block 1615 allocates a new branch node and appropriately sets various fields associated with this node. In particular, the VALUE field is set to the disjunction (logical OR combination) of the VALUE field of the new pattern and the VALUE field of the pointed-to node. Similarly, the MASK field is set to the disjunction of the MASK field of the new pattern and the MASK field of the pointed-to node. Also, the IMASK field is set to the conjunction (logical AND combination) of the MASK field of the new pattern and the IMASK field of the pointed-to node. By setting these fields appropriately, based on those of higher-level nodes in the rhizome, the existence of wildcards at pattern nodes reachable through the new branch node will be propagated to that branch node. In addition, block 1615 sets a specific child pointer of the new branch node to the pointed-to node. The specific child pointer, i.e., the child zero or child one pointer, is selected based on the indexed bit of the VALUE field of the pointed-to node. The pivot bit for the new branch node is set equal to the current bit index. Once these operations have completed, execution proceeds from block 1615 to decision block 1620. This latter decision block determines whether a wildcard exists, in patterns reachable by the new branch node, at the bit position specified by the current bit index. If no such wildcards exist at this bit position, i.e., the value of the IMASK bit at this bit position in the pointed-to node is one, then decision block 1620 routes execution, via YES path 1624, to block 1625. This latter block sets the specific child pointer for the new branch node, as designated by the indexed bit of the VALUE field of the new pattern, to point to the new pattern node. Once this occurs, execution then exits from routine 1600. Alternatively, if a wildcard exists, in patterns reachable by the new branch node, at the bit position specified by the current bit index, then decision block 1620 routes execution, via NO path 1622, to block 1630. As a result of the wildcard, portions of the existing rhizome, above the pointed-to node, must be replicated to properly support the wildcard. Consequently, block 1630, when executed, invokes Replicate routine 1900 (as will be discussed in detail below in conjunction with FIG. 19) with two arguments: POINTED-TO NODE and the current INDEXED BIT. The replica returned by the replicate routine becomes a child of the new branch node, specifically the child corresponding to the indexed bit of the new pattern. The value of POINTER is set to point to this child. Once block 1630 has fully executed, i.e., Replicate routine 1900 has completed all its recursion and POINTER has been finally set, then execution is fed back, via path 1635, to block 1638 to increment the bit index for examining the next bit position in the new pattern vis-à-vis the next pivot bit in the rhizome, and so forth.

When the bit index reaches the value of the pivot bit of the pointed-to node, execution then proceeds, via NO path 1609 emanating from decision block 1606, to decision block 1640. This latter decision block determines, based on testing the value of the pivot bit stored for the new node, whether that node is a pattern node or not. If the pointed-to node is a branch node, then, having traversed this far up the search trie to where the index bit equals the pivot bit of the pointed-to node, then the pattern needs to be inserted somewhere above the pointed-to node. Therefore, execution proceeds via NO path 1641 to block 1648, where the VALUE, MASK AND IMASK fields in the pointed-to node are modified accordingly to reflect this ancestry. In particular, the VALUE and MASK fields of the pointed-to node are formed by separately disjoining the existing VALUE and MASK fields of this node with the VALUE and MASK fields of the new pattern, respectively. The IMASK field of the pointed-to node is formed by conjoining the existing IMASK field of this node with the IMASK field of the new pattern. Once these fields for the pointed-to node have been updated, execution proceeds to decision block 1650 to determine whether a wildcard exists in the new pattern at the bit position indexed by the pivot bit of the pointed-to node. If a wildcard does not exist, as given by a one in the MASK field at this bit position in the new pattern, then the new branch node will be inserted (as well as its supporting structure, with replication if necessary) on the child zero path from the pointed-to node. In this case, execution proceeds, via YES path 1651 emanating from decision block 1650, to block 1658. This latter block recursively invokes the present routine, i.e., Node Insert routine 1600, on a child of the pointed-to node, that child being selected by a bit of the new pattern indexed by the pivot bit of the pointed-to node. Once recursion fully completes and block 1658 has completely executed, execution then exits from routine 1600. Alternatively, if a wildcard exists, as given by a zero in the MASK field at this bit position in the new pattern, then nodes will need to be inserted on both sides (i.e., on both child branches) of the pointed-to node, with appropriate replication of supporting rhizome structure to support each such new node. Consequently, execution proceeds, via NO path 1653, emanating from decision block 1650, to block 1655. This latter block recursively invokes Node Insert routine 1600 for child one of the pointed-to node. Thereafter, once block 1655 has fully executed, execution next proceeds to block 1658 to appropriately insert nodes, again recursively, on now the child zero of the pointed-to node (remembering, as noted above, that a zero is set in a bit position in the VALUE field for a pattern node that has a wildcard at that position), after which execution exits from routine 1600.

In the non-hierarchical node insertion routine, the blocks within dotted box 1660, specifically decision blocks 1665, 1670, 1676 and 1685, and blocks 1675, 1683, 1690 and 1694 can all be omitted. If decision block 1640 determines that the pointed-to node is a pattern node, then the rhizome contains an extant pattern that is not distinguishable from the new pattern, either because the two patterns are identical or because they bear a hierarchical relationship to each other that is not supported in the non-hierarchical rhizome. Therefore, execution proceeds via YES path 1643 and dashed path 1645 to block 1680, where the new pattern node is removed and the insertion is aborted.

In the hierarchical node insertion routine, execution proceeds from decision block 1640, via YES path 1643, to dotted box 1660 and specifically to decision block 1665 therein. Decision block 1665 determines whether the pointed-to node is the new pattern node. If so, then, by virtue of reaching this point in routine 1600, the new pattern node has already been installed in the rhizome via an alternate path through the search trie, due to the presence of a wildcard in the new pattern. In this case, execution exits from routine 1600, via YES path 1669 and path 1696. If the pointed-to node is not the new pattern node, then the new pattern node will be inserted at an appropriate site in the pattern hierarchy that is to contain the pointed-to node. In this case, execution proceeds, via NO path 1667 emanating from decision block 1665, to decision block 1670. This latter decision block determines whether the new pattern is more specific than the pattern stored in the pointed-to (pattern) node. On the one hand, if the new pattern is so specific, then the new pattern node, storing the new pattern, is inserted before the pointed-to node in the hierarchy chain. Consequently, decision block 1670 routes execution, via YES path 1673, to block 1675. This latter block, when executed, modifies the IMASK field of the new pattern node by conjoining its value with the IMASK field of the pointed-to node and storing the result into the IMASK field of the new pattern node. The new pattern node is then inserted into the hierarchy forest and specifically within the hierarchical pattern chain but before the pointed-to node; hence, the pointed-to node becomes a godparent of the new pattern node. Thereafter, execution exits, via path 1696, from routine 1600. If, on the other hand, the new pattern is not more specific than that stored in the pointed-to (pattern) node, then decision block 1670 routes execution, via NO path 1671, to decision block 1676. This decision block determines whether the new pattern conflicts with the pattern stored at the pointed-to node, in the manner illustrated by depiction 1130 in FIG. 1C. If such a conflict exists, then admitting the new pattern node would result in a rhizome with no definable hierarchy; thus, insertion of the pattern is refused. Consequently, execution proceeds, via YES path 1679, to block 1680 to remove this particular new pattern node in favor of the pre-existing pattern node. Execution then exits from routine 1600. Now, if decision block 1676 determines that the new pattern and that stored in the pointed-to node do not conflict, then by virtue of the immediately prior test through decision block 1670, the new pattern must be more general than that at the pointed-to node, thereby necessitating that a new pattern node, for this new pattern, must be stored in the hierarchy chain but somewhere above the pointed-to (pattern) node. In this case, the IMASK field of the pointed-to node needs to be updated to account for this new pattern, particularly for any wildcard(s) therein. Accordingly, decision block 1676 routes execution, via NO path 1678, to block 1683. This latter block modifies the IMASK field of the pointed-to node as being the conjunction of the existing IMASK field of this node with the IMASK field of the new pattern node. Thereafter, execution proceeds to decision block 1685. This decision block determines whether the pointed-to node has any godparents, i.e., any pattern nodes above it in the hierarchy chain, by testing the godparent pointer of this node (specifically whether it contains, as discussed above, a null value). If no such godparents exist, then execution proceeds, via NO path 1689 from decision block 1685, to block 1694 which, when executed, assigns the new pattern node as a godparent of the pointed-to node. Once this occurs, execution exits, via path 1696, from routine 1600. If, however, decision block 1685 determines that the pointed-to node has a godparent, then the operations within box 1660 are repeated but at an incrementally next higher level in this hierarchy chain. Specifically, execution proceeds, via YES path 1687, to block 1690 which sets POINTER to point to the godparent of the now prior pointed-to node, the godparent now being the pointed-to node for the next iteration through the operations shown in box 1660. Execution then loops back, via feedback path 1692, to decision block 1665, to consider the next level of the pattern hierarchy chain, and so forth, until the new pattern node, containing this new pattern, has been inserted at a proper hierarchical point within the chain.

iii. Replicate Routine 1900

Figure 19:
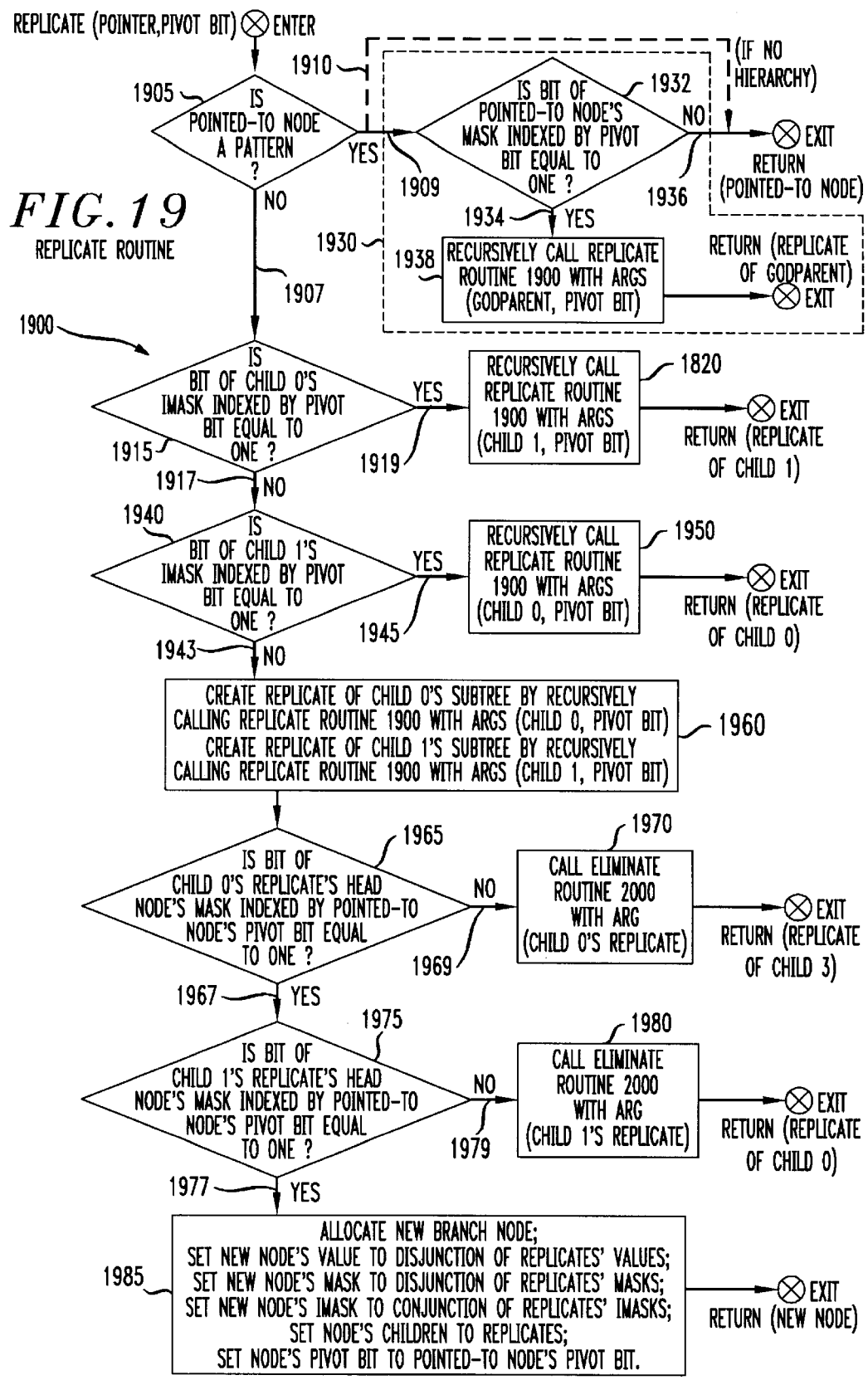
FIG. 19 depicts a flowchart of Replicate routine 1900 that is executed by, e.g., Node Insert routine 1600 shown in FIGS. 16A and 16B.

FIG. 19 depicts a flowchart of Replicate routine 1900. This routine is a utility, called during pattern node insertion, for, as noted above, replicating all pattern nodes along with their supporting branch nodes which do not care about a value of a given bit index, i.e., the bit position in the IMASK field has a value of zero.

Routine 1900 is entered with two parameters: POINTER and PIVOT BIT. Together, as noted above, these specify a particular node location within the rhizome at which replication is to start and all pattern nodes (i.e., those patterns that do not care about the value of the bit specified by the value of PIVOT BIT), along with their supporting branch structure, that need to be replicated off that particular node.

We will describe this routine first in a summary overview fashion then in detail.

Essentially, routine 1900 traverses the search trie until it reaches a pattern node. When the routine finds such a node, it recursively traces through a pattern hierarchy chain, should it exist, for that node until a pattern node is found that has a stored pattern that does not care about the given bit index (PIVOT BIT value). As such, by virtue of strict hierarchy in the chain, all godparents of this pattern node do not care about this bit index as well.

In that regard, as the routine first traverses through successive branch nodes in the trie, the routine determines whether each branch of a current node leads to any pattern node having a pattern that does not care about the value of the given bit index. If only one branch leads to such a pattern, then the current node does not need to be replicated; hence, the routine only recurses on that one child node. Alternatively, if both branches emanating from the current node contain such a pattern, then the current node may need to be replicated; hence the routine will recurse on both child nodes therefrom, replicating as necessary. Once the recursions are complete, routine 1900 determines whether the resulting structure on each side of the current node contains a pattern node having a pattern that cares about the pivot bit of the current node. If such a pattern node exists on both sides of the current node, then the current node is itself replicated and the children of this replicated node are set to the replicas returned by the prior recursive calls to the replicate routine. If such a pattern node exists on only one side of the current node, then the current node is not replicated and the replicated branch that does not lead to a pattern node that cares about the pivot bit of the current node is eliminated. If such a pattern node does not exist on either side of the current node, then one branch is arbitrarily chosen; the other branch is eliminated.

Specifically, upon entry into routine 1900, execution first proceeds to block 1905. This block, when executed, determines whether the pointed-to node is a pattern node. In the non-hierarchical replicate routine, the blocks within dotted box 1930, specifically decision block 1932 and block 1938, can be omitted. Thus, in this case, if the pointed-to node is a pattern node, then execution exits via YES path 1909 and dashed path 1910, with the address of the current pattern node being returned. In the hierarchical replicate routine, if the pointed-to node is a pattern node, then execution proceeds, via YES path 1919, to decision block 1932. This decision block determines whether the bit, indexed by the pivot bit, in the MASK field of the pointed-to node equals one. If this bit does not equal one, i.e., it equals zero, hence specifying a bit for which a wildcard exists either in this pattern node or higher in the pattern hierarchy and for which this pattern does not care, then execution exits routine 1900, via NO path 1936 emanating from decision block 1932. The address of the pointed-to node is returned. Alternatively, if this bit equals one, i.e., this pattern cares about the value at this bit position, then decision block 1932 routes execution, via YES path 1934, to block 1938. This latter block recursively invokes the present routine, i.e., Replicate routine 1900, but with POINTER set to specify the godparent of the current pattern node. After this recursive execution, execution exits from this routine with an address of a god-ancestor being returned.

Alternatively, if the pointed-to node is not a pattern node, then decision block 1905 routes execution, via NO path 1907, to decision block 1915. This latter block, along with decision block 1940 which follows, successively examines the pivot bit of the IMASK field associated with each child node of the pointed-to node. Specifically, decision block 1915, when executed, tests whether the bit in the IMASK field, indexed by the current pivot bit, of the node on the child zero branch of the pointed-to node equals one. If it does, then all patterns accessible through this node care about the value of this bit. Consequently, no rhizome structure on this side of the pointed-to node, needs to be replicated. Hence, decision block 1915 routes execution, via YES path 1919, to block 1920. This latter block recursively invokes routine 1900, but with POINTER set to specify the child one node of the pointed-to node. After this recursive execution, execution exits from this routine with an address of a replicate of the nodal structure on the child one branch being returned. Alternatively, if the bit in the IMASK field, designated by the current pivot bit, of the node on the child zero branch of the pointed-to node equals zero, indicating that some pattern node reachable via the child zero branch does not care about the value of this bit, then decision block 1915 routes execution, via NO path 1917, to decision block 1940 to examine the node on the child one branch of the pointed-to node. Specifically, decision block 1940, when executed, tests whether the bit in the IMASK field, designated by the current pivot bit, of the node on the child one branch of the pointed-to node equals one. If it does, then all patterns accessible through this node care about the value of this bit. Consequently, no nodal structure on this side of the pointed-to node, needs to be replicated. Hence, decision block 1940 routes execution, via YES path 1945, to block 1950. This latter block recursively invokes replicate routine 1900, but with POINTER set to specify the node on the child zero branch of the pointed-to node. After this recursive execution, execution exits from this routine with an address of a replicate of the nodal structure on the child zero branch, being returned.

If, however, the bit in the IMASK field of the nodes on the child zero and one branches from the pointed-to node are both equal to zero, then it may be necessary to replicate the current node. On the other hand, it may not be so necessary, since a replica of the current node is only needed if at least one replicated pattern specifies that the pivot bit of the current node is a zero and at least one replicated pattern specifies that the pivot bit of the current node is a one. The only way to determine this, short of storing a matrix of data at each branch node, is to actually perform the replications of both child branches and then to examine each resulting replica for such patterns, then replicating the current node, if it is required, or eliminating one of the newly replicated sub-structures, if it is not. Thus, decision block 1940 routes execution, via NO path 1943, to block 1960. This latter block, when executed, first recursively invokes replicate routine 1900, with, as arguments thereto, the address of the node on the child zero branch and the current pivot bit. This causes the sub-structure extending from the child zero branch to be examined and replicated as necessary. Once this replication completes, block 1960 recursively invokes routine 1900 again, but with, as arguments thereto, the address of the node on the child one branch and the current pivot bit. This recursive operation causes the sub-structure extending from the child one branch to be examined and replicated as necessary. Once the appropriate portions of the sub-structure have been replicated, execution passes to decision block 1965.

Once the sub-structures of both child branches have been replicated, blocks 1965–1985 determine whether both replicated sub-structures are necessary. If they are, then the current node is replicated; otherwise, the redundant sub-structure is eliminated.

In particular, decision blocks 1965 and 1975 collectively determine whether a bit, indexed by the current pivot bit in the pointed-to node, in the MASK field, of head nodes of both replicated branches of the current node, equals one, i.e., whether patterns reachable through both of these child branches care about the value of the pivot bit of the current node. To accomplish this, decision block 1965 first tests the replicated child zero branch of the current node. If the indexed bit in the MASK field of the head node of the replicated child zero branch equals zero, i.e., indicative of a bit that all patterns reachable through this node do not care about (a wildcard exists at that bit position in all of these patterns), then decision block 1965 routes execution, via NO path 1969, to block 1970. This latter block, when executed, invokes Eliminate routine 2000 (discussed in detail below in conjunction with FIG. 20) to remove this particular replicated nodal structure. Once block 1970 completes execution, execution exits from routine 1900 and the address of the replicate of the child one branch is returned. Alternatively, if indexed bit in the MASK field of the head node of the replicated child zero branch equals one, then decision block 1965 routes execution, via YES path 1967, to decision block 1975. This latter decision block tests the child one branch of the replicate node. If the indexed bit in the MASK field of the head node of the replicated child one branch equals zero, i.e., indicative of a bit that all patterns reachable through this node do not care about (a wildcard exists at that bit position in all of these patterns), then decision block 1965 routes execution, via NO path 1979, to block 1980. This latter block, when executed, invokes Eliminate routine 2000 to remove this particular replicated nodal structure. Once block 1980 completes execution, execution exits from routine 1900 and the address of the replicate of the child zero branch is returned. Alternatively, if indexed bit in the MASK field of the head node of the replicated child one branch equals one, then decision block 1975 routes execution, via YES path 1977, to block 1985. This latter block, when executed, replicates the current node by allocating a new branch node and setting the contents of its fields. Specifically, the VALUE and MASK fields for the new branch node are set to the disjunction of the VALUE and MASK fields, respectively, of the replicate head nodes. The IMASK field for this new node is set to the conjunction of the IMASK field of the replicate head nodes. The child pointers are set to point to the respective replicas of the child branches of the current node. Lastly, the pivot bit of this new node is set to the current pivot bit of the pointed-to node. After these operations have occurred, execution then exits from routine 1900 with the address of the new node being returned.

3. Removal Process i. Removal Routine 1700

FIG. 17 depicts a flowchart of Removal routine 1700 which is also executed by pattern classifier 410 shown in FIG. 4. This routine, combined with routine 1800, is used to delete an existing pattern node from our inventive rhizome. Apart from routine 1800, which will be discussed shortly below in conjunction with FIG. 18, routine 1700 also performs relatively few operations.

In particular, routine 1700 is entered with one parameter: PATTERN, which specifies the particular pattern node that is to be removed. Upon entry into routine 1700, execution first proceeds to block 1710. This block, when executed, invokes Recursive Node Remove routine 1800 with a single argument, i.e., a pointer to the root node of the rhizome. Routine 1800 is recursively invoked, as and if needed, to remove all now unnecessary structure that solely supports the pattern to be removed. Once routine 1800 has fully completed its execution, including all recursive executions thereof, block 1710 completes its execution. Thereafter, block 1720 executes to deallocate the pattern node; hence, freeing memory locations previously allocated to this node for subsequent reuse. Thereafter, execution simply exits from routine 1700.

ii. Node Remove Routine 1800

FIG. 18 depicts a flowchart of Node Remove routine 1800. As noted immediately above, routine 1800 removes, through recursive execution, if needed, all now unnecessary structure that solely supports the pattern to be removed.

Routine 1800 is entered with one parameter: POINTER, which specifies a pattern node which is to be removed from the rhizome. To the extent any underlying structure in the rhizome exists only to support just the pattern node being removed, then that underlying structure will be removed. This routine does not physically remove pattern nodes from memory, i.e., de-allocating memory locations for those nodes (which is the function of Removal routine 1700, but rather it removes pointers in the structure to the indicated pattern node.

We will describe routine 1800 first in a summary overview fashion then in detail.

Routine 1800 performs two completely different sets of operations depending upon whether the current node is a branch node or a pattern node. In the non-hierarchical node remove routine, if the current node is a pattern node, then it must be the pattern node that is being removed. Therefore, the child pointer in the parent branch node that points to the current node is set to null; the routine then terminates. In the hierarchical node remove routine, if the current node is a pattern node, then it may be the pattern node that is being removed or it may be a god-descendent of the pattern node that is being removed. Thus, it is necessary to determine whether the current node is the pattern node to be removed. If it is, then the current node is removed from the chain of godparents, and the routine then terminates; otherwise, the routine recurses on the godparent of the current node, following which the routine updates the IMASK field of the current node to reflect changes in its god-ancestry, and the routine then terminates.

If, however, the current node is a branch node, then routine 1800 determines whether the pattern to be removed cares about the pivot bit of the current node. If it does, then the routine recurses on a child node of the current node determined by the bit of the pattern indexed by the pivot bit of the current node. Otherwise, the routine recurses on both child nodes of the current node. The routine then determines whether the current node is still necessary. Specifically, if the removed pattern does not care about the pivot bit of the current node, then the presence of this pattern in the structure could not have been sustaining the current node; hence, the current node must still be necessary. Otherwise, the routine determines whether any pattern, reachable through the same branch as the removed pattern, still exists that cares about the value of the pivot bit of the current node. If there is such a pattern, then the current node is still necessary. Alternatively, if such a pattern does not exist, then the current node is no longer necessary. Consequently, the current node is then removed from the rhizome.

Specifically, upon entry into routine 1800, execution first proceeds to decision block 1802. This block, when executed, determines, by checking the value of the pivot bit as discussed above, whether the pointed-to node is a pattern node. In the event the current node is a pattern node, execution proceeds, via YES path 1803, to Pattern Node Removal sub-routine 1807. In the non-hierarchical node remove routine, the blocks within dotted box 1850, specifically decision block 1855, 1865 and 1875, and blocks 1870, 1880 and 1885, can be omitted. Thus, in this case, if the current node is a pattern node, then execution proceeds, via YES path 1803 and dashed path 1813, to block 1860. Block 1860 removes the pointed-to node, i.e., the sole pattern node in a chain if no pattern hierarchy exists. This removal is effected by setting the child pointer, in the parent branch node that points to the current node, to a null value. Thereafter, execution exits, via path 1862, from routine 1800.

In the hierarchical node remove routine, if the current node is a pattern node, then execution proceeds, via YES path 1803, to decision block 1855. This decision block, when executed, determines whether the pointed-to node stores the particular pattern that is to be removed, i.e., whether this stored pattern identically matches that which is to be removed. If it does match, then decision block 1855 routes execution, via YES path 1859, to block 1860 to remove this particular node. If, however, the pattern to be removed does not exactly match that at the pointed-to node, then decision block 1855 routes execution, via NO path 1857, to decision block 1865. This latter decision block tests whether the pointed-to node has a godparent. If the pointed-to node has a godparent, then decision block 1865 routes execution, via YES path 1869, to block 1870. This latter block recursively invokes this routine, i.e., Node Remove routine 1800, on the godparent of the pointed-to node, i.e., POINTER is set to point to this godparent. Once all such recursive execution has completed, execution of block 1870 completes with execution proceeding to decision block 1875. Execution also reaches this decision block, via NO path 1867 emanating from decision block 1865, in the event the pointed-to node does not have a godparent. Decision block 1875 again tests whether the pointed-to node has a godparent, since this godparent may have been just been removed through now completed recursive execution of routine 1800 (invoked through block 1870). In the event the pointed-to node still has a godparent, i.e., the current node previously had more than one godparent, only one of which was removed via recursive execution of routine 1800, then decision block 1875 routes execution, via YES path 1877, to block 1880. This latter block, when executed, sets the IMASK field in the pointed-to node equal to the IMASK field of its godparent. Thereafter, execution exits from routine 1800. Alternatively, if the pointed-to node now does not have a godparent, i.e., this node is now the highest pattern node in a pattern hierarchy chain, then decision block 1875 routes execution, via NO path 1879, to block 1885. This latter block, when executed, sets the IMASK field in the pointed-to node equal to the MASK field for this node. Thereafter, execution exits from routine 1800.

If, on the other hand, decision block 1802 determines that the pointed-to node is a branch node, then block 1802 routes execution, via NO path 1804, to Branch Node Removal sub-routine 1810. Upon entry into sub-routine 1810, execution first proceeds to decision block 1815. This decision block determines whether the pattern to be removed has a one in the bit position of its MASK field indexed by the pivot bit of the pointed-to node, i.e., whether a wildcard exists in the associated stored pattern at this bit position (in which case the corresponding MASK bit would be zero).

If the indexed MASK bit in the pattern to be removed is zero, then the current branch node does not exist merely to support the pattern to be removed; therefore, the current branch node will remain in the structure. In this case, decision block 1815 routes execution, via NO path 1817, to block 1835. This latter block, when executed, recursively invokes routine 1800, i.e., Node Remove routine 1800, twice in succession: once for one child of the current pointed-to node and the other for the other child of that node. Once all such recursive executions have completed, block 1835 terminates its execution with execution passing to block 1840. This latter block updates the VALUE, MASK and IMASK fields of the pointed-to node. Specifically, the VALUE and MASK fields of the pointed-to node are set equal to the disjunction of the VALUE and MASK fields of both of its child nodes. The IMASK field of the pointed-to node is set equal to the conjunction of IMASK fields of both of its child nodes. Once this occurs, execution exits from routine 1800.

However, if decision block 1815 determines that the pattern to be removed has a one-valued MASK bit at the bit position indexed by the pivot bit of the pointed-to node, i.e., a wildcard does not exist at this bit position in the pattern, then decision block 1815 routes execution, via YES path 1819, to block 1820. Hence, the search for the pattern to be removed can be confined to one child branch of the current node. Consequently, block 1820, when executed, recursively invokes this routine, i.e., Node Remove routine 1800, with, as an argument, the child node selected by a bit of the VALUE field of the pattern to be removed and indexed by the pivot bit in the pointed-to node. Once this recursive execution has fully completed to remove appropriate structure on one side of the pointed-to node, execution proceeds to decision block 1825. Through a two-part test, this decision block determines whether the current pointed-to branch node itself can be removed. In particular, block 1825 first determines whether, given the value of a bit of the VALUE field of the pattern to be removed indexed by the pivot bit, the pointed-to branch node has a corresponding child node. Second, this block determines whether a bit in the MASK field of that particular child node, at a bit position indexed by the pivot bit of the pointed-to node, is a one, i.e., whether any pattern node reachable through this branch node has a pattern that cares about the value of this particular bit position therein. If both tests are satisfied, then the current pointed-to branch node is necessary and can not be removed from the rhizome. In this case, decision block 1825 routes execution, via YES path 1827, to block 1840 to appropriately update, as described above, the fields associated with the current pointed-to branch node; after which, execution exits from routine 1800. Alternatively, if the current pointed-to branch node does not satisfy both of the conditions tested by decision block 1825, then the current pointed-to branch node is unnecessary and can be removed in its entirety without any adverse affects on the remaining rhizome structure. In this case, decision block 1825 routes execution, via NO path 1829, to block 1830. This latter block, when executed, replaces the current pointed-to branch node by one of its child nodes other than the corresponding child node selected within decision block 1825. Thereafter, the child node selected by decision block 1825 is eliminated. Finally, the current pointed-to branch node is de-allocated. Once block 1830 has fully executed, execution then exits from routine 1800.

iii. Eliminate Routine 2000

FIG. 20 depicts a flowchart of Eliminate routine 2000. This routine is a utility, called during pattern node removal and replication, usually recursively for, as noted above, removing entire sub-structure rooted at a given node. This routine eliminates such sub-structure for either of two reasons: (a) that chain has become unnecessary during node removal, i.e., the pattern node which it supports is being removed; or (b) during the course of replicating rhizome structure, a redundant branch chain has been created and, to simplify the rhizome, should be collapsed. Essentially, this routine recursively traverses nodal structure, stopping at pattern nodes. As the routine moves back up a recursion stack, the routine deallocates each branch node it encountered. This routine does not eliminate pattern nodes; that is provided, as discussed above, through Removal routine 1800.

In particular, routine 2000 is entered with one parameter: POINTER, which specifies the particular branch node that is to be eliminated. Upon entry into routine 2000, execution first proceeds to decision block 2010. This decision block tests whether POINTER points to a branch node or a pattern node—inasmuch as this routine will only remove the former. If the pointed-to node, specified by the value of POINTER, is a pattern node, then execution simply exits from routine 2000, via YES path 2017 emanating from decision block 2010. Alternatively, if the pointed-to node is a branch node, then decision block 2010 routes execution, via NO path 2013, to block 2020. This block recursively invokes this same routine, i.e., Eliminate routine 2000, but with the value of POINTER set to the child zero node of the pointed-to node. After this recursion completes, execution then proceeds to block 2030 which recursively invokes this same routine, i.e., Eliminate routine 2000, but with the value of POINTER set to the child one node of the pointed-to node. After this recursion completes, execution then proceeds to block 2040, which deallocates all memory locations assigned to this branch node.

This routine effectively performs a postorder traversal of the search trie rooted at a given branch node, deallocating each branch node after all branch nodes deeper in the structure have been deallocated.

Asymptotically, average search time in the rhizome is a logarithmic function of a number of elements stored in the rhizome rather than linear in the number of elements, as occurs with conventional databases of patterns containing wildcards. Hence, use of our inventive rhizome, particularly with a large classification database—as frequently occurs in packet classifiers, appears to provide significant time savings over conventional classification techniques known in the art.

By now, it should be clearly apparent to one skilled in the art that if no wildcard-based patterns exist or are to be inserted in our inventive rhizome, then the remaining rhizome structure would be identical to a conventional Patricia tree—thereby providing full backward compatibility therewith. Furthermore, when operating on our inventive rhizome in the absence of any wildcard-based patterns, our inventive retrieval, insertion and removal processes would each advantageously operate with substantially, if not identically, the same degree of computational complexity as would corresponding processes for a conventional Patricia tree. Therefore, in the absence of any wildcard-based patterns, use of our inventive rhizome does not engender any performance penalty over use of a conventional Patricia tree.

Furthermore, though we described our search trie and hierarchy forest as being search and hierarchy structures stored in memory, specifically memory 340 shown in FIG. 3, these structures can just as easily be stored in any computer readable media, such as a floppy or other transportable media, e.g., a magnetic or optical disk, or even in suitable non-volatile memory, such as flash memory.

Although two embodiments which incorporate the teachings of our present invention have been shown and described in considerable detail herein, those skilled in the art can readily devise many other embodiments that still utilize these teachings.

We claim:

1. A memory containing a stored trie-indexed forest having hierarchically-related pattern values stored therein and for access therefrom by a program executing on a computer, said pattern values having at least one wildcard therein, the memory comprising:

search and pattern structures formed of branch and pattern nodes, respectively, each of said branch and pattern nodes being defined by a memory structure for each such node;

said search structure having a plurality of linked branch nodes collectively defining a binary search trie which indexes into a subset of the pattern nodes, wherein the memory structure for each of said branch nodes, along a search path containing said node, has an address stored therein to a next one of said nodes situated on said path, said next one node being either a different one of the branch nodes or a given one of the subset of the pattern nodes; and said pattern structure having a set of pattern nodes, wherein the memory structure for each of said pattern nodes stores a corresponding one of the pattern values and at least one of said pattern values has said wildcard therein.

2. The memory in claim 1 wherein the memory structure for each of said nodes comprises a plurality of different memory locations.

3. The memory in claim 2 wherein each of the branch nodes has a pivot bit associated therewith and first and second linkages to first and second other ones, respectively, of said nodes, said first and second nodes being child one and child zero nodes, respectively, of said each branch node; said pivot bit being a bit index that specifies a particular bit in an input search key; and wherein said pivot bit and addresses, representing said linkages and as child one and child zero pointers, are stored within corresponding ones of the memory locations in the memory structure for said each branch node.

4. The memory in claim 3 wherein the pivot bit in each of said branch nodes specifies a corresponding disagreement between individual bits, at a bit position specified by the pivot bit, in a pair of said pattern values.

5. The memory in claim 4 wherein the branch nodes that form the search structure are organized, by virtue of linkages thereamong, in ascending order of their corresponding pivot bits from a root node, having a lowest bit index, in said trie to said pattern structure.

6. The memory in claim 5 wherein the memory structure for each of the branch nodes further comprises, parameters for specifying presence and location of a wildcard in a stored pattern value associated with a pattern node reachable through a series of linkages extending from said each branch node.

7. The memory in claim 6 wherein, for each of the branch nodes, said parameters comprise values for VALUE, MASK and IMASK parameters stored in corresponding locations in the memory structure, wherein for any one of the branch nodes, the VALUE parameter is a first predefined function of the VALUE parameters of the child one and zero nodes emanating from said one branch node, the MASK parameter is a second predefined function of MASK parameters of the child one and child zero nodes emanating from said one branch node, and the IMASK parameter is a third predefined function of IMASK parameters of the child one and child zero nodes emanating from said one branch node.

8. The memory in claim 7 wherein said first and second functions are each a disjunction function, and said third function is a conjunction function.

9. The memory in claim 8 wherein said first and second functions is the disjunction function taken up to the pivot bit position for said one branch node, and the third function is the conjunction function taken up to the pivot bit position for said one branch node.

10. The memory in claim 3 wherein the memory structure for the pattern node stores, in separate memory locations, a corresponding one of the pattern values.

11. The memory in claim 10 wherein the memory structure for each of the pattern nodes further comprises parameters for specifying presence and location of a wildcard in a stored pattern value associated with one of said pattern nodes in an associated hierarchy containing and upwardly extending from said each pattern node.

12. The memory in claim 11 wherein, for each of the pattern nodes, said parameters comprise values for VALUE, MASK and IMASK parameters stored in corresponding locations in the memory structure, wherein for any one of the pattern nodes, the VALUE parameter is a corresponding one of the stored pattern values, the MASK parameter specifies a wildcard in any bit position in said VALUE parameter for said one pattern node; and the IMASK parameter is set to the MASK parameter of said one pattern node.

13. A computer readable storage medium containing a stored trie-indexed forest having hierarchically-related pattern values stored therein, said pattern values having at least one wildcard therein, the medium comprising:

search and pattern structures formed of branch and pattern nodes, respectively, each of said branch and pattern nodes being defined by a memory structure for each such node;

said search structure having a plurality of linked branch nodes collectively defining a binary search trie which indexes into a subset of the pattern nodes, wherein the memory structure for each of said branch nodes, along a search path containing said node, has an address stored therein to a next one of said nodes situated on said path, said next one node being either a different one of the branch nodes or a given one of the subset of the pattern nodes; and said pattern structure comprising a set of pattern nodes, wherein the memory structure for each of said pattern nodes stores a corresponding one of the pattern values and at least one of said pattern values has said wildcard therein.

14. The storage medium in claim 13 wherein the memory structure for each of said nodes comprises a plurality of different memory locations.

15. The storage medium in claim 14 wherein each of the branch nodes has a pivot bit associated therewith and first and second linkages to first and second other ones, respectively, of said nodes, said first and second nodes being child one and child zero nodes, respectively, of said each branch node; said pivot bit being a bit index that specifies a particular bit in an input search key; and wherein said pivot bit and addresses, representing said linkages and as child one and child zero pointers, are stored within corresponding ones of the memory locations in the memory structure for said each branch node.

16. The storage medium in claim 15 wherein the pivot bit in each of said branch nodes specifies a corresponding disagreement between individual bits, at a bit position specified by the pivot bit, in a pair of said pattern values.

17. The storage medium in claim 16 wherein the branch nodes that form the search structure are organized, by virtue of linkages thereamong, in ascending order of their corresponding pivot bits from a root node, having a lowest bit index, in said trie to said pattern structure.

18. The storage medium in claim 17 wherein the memory structure for each of the branch nodes further comprises, parameters for specifying presence and location of a wildcard in a stored pattern value associated with a pattern node reachable through a series of linkages extending from said each branch node.

19. The storage medium in claim 18 wherein, for each of the branch nodes, said parameters comprise values for VALUE, MASK and IMASK parameters stored in corresponding locations in the memory structure, wherein for any one of the branch nodes, the VALUE parameter is a first predefined function of the VALUE parameters of the child one and zero nodes emanating from said one branch node, the MASK parameter is a second predefined function of MASK parameters of the child one and child zero nodes emanating from said one branch node, and the IMASK parameter is a third predefined function of IMASK parameters of the child one and child zero nodes emanating from said one branch node.

20. The storage medium in claim 19 wherein said first and second functions are each a disjunction function, and said third function is a conjunction function.

21. The storage medium in claim 20 wherein said first and second functions is the disjunction function taken up to the pivot bit position for said one branch node, and the third function is the conjunction function taken up to the pivot bit position for said one branch node.

22. The storage medium in claim 15 wherein the memory structure for the pattern node stores, in separate memory locations, a corresponding one of the pattern values.

23. The storage medium in claim 22 wherein the memory structure for each of the pattern nodes further comprises parameters for specifying presence and location of a wildcard in a stored pattern value associated with one of said pattern nodes in an associated hierarchy containing and upwardly extending from said each pattern node.

24. The storage medium in claim 23 wherein, for each of the pattern nodes, said parameters comprise values for VALUE, MASK and IMASK parameters stored in corresponding locations in the memory structure, wherein for any one of the pattern nodes, the VALUE parameter is a corresponding one of the stored pattern values, the MASK parameter specifies a wildcard in any bit position in said VALUE parameter for said one pattern node; and the IMASK parameter is set to the MASK parameter of said one pattern node.

25. A method responsive to an input key, for use with a data structure having pattern values stored therein, said pattern values having at least one wildcard therein, in retrieving one of said pattern values from said data structure which identically matches or subsumes the key, wherein said data structure has a search trie and a pattern set, said search trie being formed of a plurality of branch nodes organized into a binary search trie extending from a root node therein to said pattern set, said pattern set having a plurality of pattern nodes, each of the pattern nodes having a different corresponding one of the pattern values associated therewith and at least one of said pattern values has said wildcard therein;

the method comprises the steps of:

traversing along a path through the search trie in order to reach one of the pattern nodes in said pattern set, the path being defined by the input key and pivot bit values associated with ones of said branch nodes; and determining whether the input key either matches or is subsumed by a pattern value associated with said one pattern node.

26. The method in claim 25 wherein said traversing step comprises the step of tracing along the path by branching from each successive branch node encountered along said path, starting at the root node, in a direction therefrom as specified by a bit of the input key indexed by the pivot bit of said each branch node until said one pattern node is encountered.

27. The method in claim 26 wherein the tracing step comprises the steps of:

examining, when the path reaches said successive branch node, a particular bit in the input key indexed by a value of the pivot bit associated with said successive branch node; and branching, as specified by a value of the particular bit along either a child zero branch or a child one branch, both branches emanating from the successive branch node, to reach a child one or child zero node as a next node along said path, said next node being either a different one of the branch nodes, having a higher pivot bit associated therewith than that of the successive branch node, or the one pattern node.

28. The method in claim 27 further comprising the steps of, if the key identically matches or is subsumed by the desired one pattern value:

accessing a reference value associated with said desired one pattern value; and returning the stored reference associated with said desired one pattern value.

29. The method in claim 28 further comprising the step of:

returning a message, indicative of a no match condition, in the event said input key did not match nor was subsumed by the pattern value stored in said one pattern node.

30. The method in claim 29 further comprising the step of inserting a new pattern node, into said pattern set, for storing a new pattern value in the data structure.

31. The method in claim 30 wherein said inserting step further comprises the steps of:

inserting said new pattern node at a proper location within said pattern set, said inserting comprises updating stored parameter values associated with existing ones of the nodes in the data structure such that said new pattern node is situated properly and is fully reachable therethrough; and if said pattern set contains a wildcard-based pattern, replicating sufficient structure in said search trie, where necessary, based on bit positions where bit disagreements occur among bits in corresponding bit positions in said new pattern and existing pattern values stored in the data structure, such that the new pattern node is reachable over all different paths that, as a result of a wildcard, can be extended through the search trie to the new pattern node.

32. The method in claim 31 wherein each of said branch nodes in said search trie has a corresponding data structure associated therewith, the replicating step comprises the step of defining a data structure for each new branch node formed in said search trie, wherein the defining step comprises the step of:

storing, in corresponding memory locations in said data structure for said new branch node:

a corresponding one of the pivot bits associated with said new branch node;

child zero and child one pointers to child one and child zero nodes; and values for VALUE, MASK and IMASK parameters.

33. The method in claim 32 wherein said storing step further comprises the steps of:

forming the VALUE parameter as a first predefined function of the VALUE parameters of the child one and zero nodes emanating from said new branch node;

forming the MASK parameter as a second predefined function of MASK parameters of the child one and child zero nodes emanating from said new branch node; and forming the IMASK parameter as a third predefined function of IMASK parameters of the child one and child zero nodes emanating from said new branch node.

34. The method in claim 33 wherein said first and second functions are each a disjunction function, and said third function is a conjunction function.

35. The method in claim 34 wherein said first and second functions is the disjunction function taken up to the pivot bit position for said one branch node, and the third function is the conjunction function taken up to the pivot bit position for said one branch node.

36. The method in claim 31 wherein each of said pattern nodes in said pattern set has a corresponding data structure associated therewith, the inserting step comprises the step of defining a data structure for each new pattern node formed in said pattern set, wherein the defining step comprises the step of storing, in corresponding memory locations in said data structure:

a reference value; and values for VALUE, MASK and IMASK parameters.

37. The method in claim 36 wherein said storing step further comprises the steps of:

setting the VALUE parameter equal to a new pattern value to be stored in said each new pattern node;

forming the MASK parameter to specify a wildcard in any bit position in said VALUE parameter for said each new pattern node; and forming the IMASK parameter as the MASK parameter of said each new pattern node.

38. The method in claim 29 further comprising the step of removing an existing pattern node, from said pattern set, so as to remove a pattern value associated therewith from said data structure.

39. The method in claim 38 wherein the removing step comprises the steps of:

eliminating structure from the search trie solely needed to previously support said existing pattern node; and updating stored parameter values associated with remaining ones of the nodes in the data structure such that the existing pattern node is fully removed from the data structure and is not reachable therein.

40. The method in claim 39 wherein each branch node in the search trie has a corresponding data structure associated therewith, the data structure storing in separate fields therein: a corresponding one of the pivot bits associated with said each branch node; child zero and child one pointers to child one and child zero nodes; and values for VALUE, MASK and IMASK parameters; and wherein said updating step for, a remaining one of the branch nodes in the forest, comprises the steps of:

forming the VALUE parameter as a first predefined function of the VALUE parameters of the child one and zero nodes emanating from said remaining one branch node;

forming the MASK parameter as a second predefined function of MASK parameters of the child one and child zero nodes emanating from said remaining one branch node; and forming the IMASK parameter as a third predefined function of IMASK parameters of the child one and child zero nodes emanating from said remaining one branch node.

41. The method in claim 40 wherein said first and second functions are each a disjunction function, and said third function is a conjunction function.

42. The method in claim 41 wherein said first and second functions is the disjunction function taken up to the pivot bit position for said remaining one branch node, and the third function is the conjunction function taken up to the pivot bit position for said remaining one branch node.

43. A computer readable medium having computer executable instructions stored therein for performing the steps recited in claim 25.

44. Apparatus, responsive to an input key, for use in a computer system, having a processor, for retrieving a pattern value from a data structure having at least one stored wildcard-based pattern value therein such that the retrieved pattern identically matches or subsumes the key, wherein the apparatus comprises:

the processor, and a memory having executable instructions and a data structure stored therein; the data structure having a search trie and a pattern set, said search trie being formed of a plurality of branch nodes organized into a binary search trie extending from a root node therein to said pattern set, said pattern set having a plurality of pattern nodes, each of the pattern nodes having a different corresponding one of the pattern values associated therewith and at least one of pattern values has a wildcard therein; and wherein the processor, in response to the stored instructions:

traverses along a path through the search trie in order to reach one of the pattern nodes in said pattern set, the path being defined by the input key and pivot bit values associated with ones of said branch nodes; and determines whether the input key either matches or is subsumed by a pattern value associated with said one pattern node.

45. The apparatus in claim 44 wherein the processor, in response to the stored instructions, traces along the path by branching from each successive branch node encountered along said path, starting at the root node, in a direction therefrom as specified by a bit of the input key indexed by the pivot bit of said each branch node until said one pattern node is encountered.

46. The apparatus in claim 45 wherein the processor, in response to the stored instructions:

examines, when the path reaches said successive branch node, a particular bit in the input key indexed by a value of the pivot bit associated with said successive branch node; and branches, as specified by a value of the particular bit along either a child zero branch or a child one branch, both child branches emanating from the successive branch node, to reach a child one or child zero node as a next node along said path, said next node being either a different one of the branch nodes, having a higher pivot bit associated therewith than that of the successive branch node, or the one pattern node.

47. The apparatus in claim 46 wherein the processor, in response to the stored instructions, if the key identically or is subsumed by the desired one pattern value:

accesses a reference value associated with said desired one pattern value; and returns the stored reference associated with said desired one pattern value.

48. The apparatus in claim 47 wherein the processor, in response to the stored instructions, returns a message, indicative of a no match condition, in the event said input key did not match nor was subsumed by the pattern value stored in said one pattern node.

49. The apparatus in claim 48 wherein the processor, in response to the stored instructions, inserts a new pattern node, into said pattern set, for storing a new pattern value in the data structure.

50. The apparatus in claim 49 wherein the processor, in response to the stored instructions:

inserts said new pattern node at a proper location within said pattern set, and, through so doing, updates stored parameter values associated with existing ones of the nodes in the data structure such that said new pattern node is situated properly and is fully reachable therethrough; and if said pattern set contains a wildcard-based pattern, replicates sufficient structure in said search trie, where necessary, based on bit positions where bit disagreements occur among bits in corresponding bit positions in said new pattern and existing pattern values stored in the data structure, such that the new pattern node is reachable over all different paths that, as a result of a wildcard, can be extended through the search trie to the new pattern node.

51. The apparatus in claim 50 wherein each of said branch nodes in said search trie has a corresponding data structure associated therewith, and the processor, in response to the stored instructions, defines a data structure for each new branch node formed in said search trie, and through so doing stores, in corresponding memory locations in said data structure for said new branch node:
   a corresponding one of the pivot bits associated with said new branch node;
   child zero and child one pointers to child one and child zero nodes; and
   values for VALUE, MASK and IMASK parameters.

52. The apparatus in claim 51 wherein the processor, in response to the stored instructions:
   forms the VALUE parameter as a first predefined function of the VALUE parameters of the child one and zero nodes emanating from said new branch node;
   forms the MASK parameter as a second predefined function of MASK parameters of the child one and child zero nodes emanating from said new branch node; and
   forms the IMASK parameter as a third predefined function of IMASK parameters of the child one and child zero nodes emanating from said new branch node.

53. The apparatus in claim 52 wherein said first and second functions are each a disjunction function, and said third function is a conjunction function.

54. The apparatus in claim 53 wherein said first and second functions is the disjunction function taken up to the pivot bit position for said one branch node, and the third function is the conjunction function taken up to the pivot bit position for said one branch node.

55. The apparatus in claim 50 wherein each of said pattern nodes in said pattern set has a corresponding data structure associated therewith, and the processor, in response to the stored instructions, defines a data structure for each new pattern node formed in said pattern set, and through so doing stores, in corresponding memory locations in said data structure:
   a reference value; and
   values for VALUE, MASK and IMASK parameters.

56. The apparatus in claim 55 wherein the processor, in response to the stored instructions:
   sets the VALUE parameter equal to a new pattern value to be stored in said each new pattern node;
   forms the MASK parameter to specify a wildcard in any bit position in said VALUE parameter for said each new pattern node; and
   forms the IMASK parameter as the MASK parameter of said each new pattern node.

57. The apparatus in claim 48 wherein the processor, in response to the stored instructions, removes an existing pattern node, from said pattern set, so as to remove a pattern value associated therewith from said data structure.

58. The apparatus in claim 57 wherein the processor, in response to the stored instructions:
   eliminates structure from the search trie solely needed to previously support said existing pattern node; and
   updates stored parameter values associated with remaining ones of the nodes in the data structure such that the existing pattern node is fully removed from the data structure and is not reachable therein.

59. The apparatus in claim 58 wherein each branch node in the search trie has a corresponding data structure associated therewith, the data structure storing in separate fields therein: a corresponding one of the pivot bits associated with said each branch node; child zero and child one pointers to child one and child zero nodes; and values for VALUE, MASK and IMASK parameters; and wherein the processor, in response to the stored instructions for, a remaining one of the branch nodes in the forest:
   forms the VALUE parameter as a first predefined function of the VALUE parameters of the child one and zero nodes emanating from said remaining one branch node;
   forms the MASK parameter as a second predefined function of MASK parameters of the child one and child zero nodes emanating from said remaining one branch node; and
   forms the IMASK parameter as a third predefined function of IMASK parameters of the child one and child zero nodes emanating from said remaining one branch node.

60. The apparatus in claim 59 wherein said first and second functions are each a disjunction function, and said third function is a conjunction function.

61. The apparatus in claim 60 wherein said first and second functions is the disjunction function taken up to the pivot bit position for said remaining one branch node, and the third function is the conjunction function taken up to the pivot bit position for said remaining one branch node.

62. A memory containing a stored trie-indexed forest having hierarchically-related pattern values stored therein and for access therefrom by a program executing on a computer, said pattern values having wildcards therein, the memory comprising:
   search and hierarchy structures formed of branch and pattern nodes, respectively, each of said branch and pattern nodes being defined by a memory structure for each such node;
   said search structure having a plurality of linked branch nodes collectively defining a binary search trie which indexes into a subset of the pattern nodes, wherein the memory structure for each of said branch nodes, along a search path containing said node, has an address stored therein to a next one of said nodes situated on said path, said next one node being either a different one of the branch nodes or a given one of the subset of the pattern nodes; and
   said hierarchy structure having linkages amongst said pattern nodes so as to define hierarchical nodal relationships occurring among the pattern values associated therewith, wherein the memory structure for each of said pattern nodes stores a corresponding one of the pattern values and an address to the memory structure, for another one of the pattern nodes, which stores a differing one of the pattern values having a wildcard therein and situated at a next higher level of an associated hierarchy.

63. The memory in claim 62 wherein the memory structure for each of said nodes comprises a plurality of different memory locations.

64. The memory in claim 63 wherein each of the branch nodes has a pivot bit associated therewith and first and second linkages to first and second other ones, respectively, of said nodes, said first and second nodes being child one and child zero nodes, respectively, of said each branch node; said pivot bit being a bit index that specifies a particular bit in an input search key; and wherein said pivot bit and addresses, representing said linkages and as child one and child zero pointers, are stored within corresponding ones of the memory locations in the memory structure for said each branch node.

65. The memory in claim 64 wherein the pivot bit in each of said branch nodes specifies a corresponding disagreement between individual bits, at a bit position specified by the pivot bit, in a pair of said pattern values.

66. The memory in claim 65 wherein the branch nodes that form the search structure are organized, by virtue of linkages thereamong, in ascending order of their corresponding pivot bits from a root node, having a lowest bit index, in said trie to said hierarchy structure.

67. The memory in claim 66 wherein the memory structure for each of the branch nodes further comprises, parameters for specifying presence and location of a wildcard in a stored pattern value associated with a pattern node reachable through a series of linkages extending from said each branch node.

68. The memory in claim 67 wherein, for each of the branch nodes, said parameters comprise values for VALUE, MASK and IMASK parameters stored in corresponding locations in the memory structure, wherein for any one of the branch nodes, the VALUE parameter is a first predefined function of the VALUE parameters of the child one and zero nodes emanating from said one branch node, the MASK parameter is a second predefined function of MASK parameters of the child one and child zero nodes emanating from said one branch node, and the IMASK parameter is a third predefined function of IMASK parameters of the child one and child zero nodes emanating from said one branch node.

69. The memory in claim 68 wherein said first and second functions are each a disjunction function, and said third function is a conjunction function.

70. The memory in claim 69 wherein said first and second functions is the disjunction function taken up to the pivot bit position for said one branch node, and the third function is the conjunction function taken up to the pivot bit position for said one branch node.

71. The memory in claim 64 wherein the memory structure for the pattern node stores, in separate memory locations, a corresponding one of the pattern values and, as a godparent pointer, the address to a next higher node in the hierarchy associated therewith.

72. The memory in claim 71 wherein the memory structure for each of the pattern nodes further comprises parameters for specifying presence and location of a wildcard in a stored pattern value associated with one of said pattern nodes in an associated hierarchy containing and upwardly extending from said each pattern node.

73. The memory in claim 72 wherein, for each of the pattern nodes, said parameters comprise values for VALUE, MASK and IMASK parameters stored in corresponding locations in the memory structure, wherein for any one of the pattern nodes, the VALUE parameter is a corresponding one of the stored pattern values, the MASK parameter specifies a wildcard in any bit position in said VALUE parameter for said one pattern node; and the IMASK parameter, if said one pattern node has a hierarchy associated therewith, is a fourth predefined function of the MASK parameter of said one pattern node and the IMASK parameter of a godparent to said one pattern node or, if said one pattern node does not have a hierarchy associated therewith, is set to the MASK parameter of said one pattern node.

74. The memory in claim 73 wherein said fourth function is a conjunction function.

75. A computer readable storage medium containing a stored trie-indexed forest having hierarchically-related pattern values stored therein, said pattern values having wildcards therein, the medium comprising:

search and hierarchy structures formed of branch and pattern nodes, respectively, each of said branch and pattern nodes being defined by a memory structure for each such node;

said search structure having a plurality of linked branch nodes collectively defining a binary search trie which indexes into a subset of the pattern nodes, wherein the memory structure for each of said branch nodes, along a search path containing said node, has an address stored therein to a next one of said nodes situated on said path, said next one node being either a different one of the branch nodes or a given one of the subset of the pattern nodes; and said hierarchy structure having linkages amongst said pattern nodes so as to define hierarchical nodal relationships occurring among the pattern values associated therewith, wherein the memory structure for each of said pattern nodes stores a corresponding one of the pattern values and an address to the memory structure, for another one of the pattern nodes, which stores a differing one of the pattern values having a wildcard therein and situated at a next higher level of an associated hierarchy.

76. The storage medium in claim 75 wherein the memory structure for each of said nodes comprises a plurality of different memory locations.

77. The storage medium in claim 76 wherein each of the branch nodes has a pivot bit associated therewith and first and second linkages to first and second other ones, respectively, of said nodes, said first and second nodes being child one and child zero nodes, respectively, of said each branch node; said pivot bit being a bit index that specifies a particular bit in an input search key; and wherein said pivot bit and addresses, representing said linkages and as child one and child zero pointers, are stored within corresponding ones of the memory locations in the memory structure for said each branch node.

78. The storage medium in claim 77 wherein the pivot bit in each of said branch nodes specifies a corresponding disagreement between individual bits, at a bit position specified by the pivot bit, in a pair of said pattern values.

79. The storage medium in claim 78 wherein the branch nodes that form the search structure are organized, by virtue of linkages thereamong, in ascending order of their corresponding pivot bits from a root node, having a lowest bit index, in said trie to said hierarchy structure.

80. The storage medium in claim 79 wherein the memory structure for each of the branch nodes further comprises, parameters for specifying presence and location of a wildcard in a stored pattern value associated with a pattern node reachable through a series of linkages extending from said each branch node.

81. The storage medium in claim 80 wherein, for each of the branch nodes, said parameters comprise values for VALUE, MASK and IMASK parameters stored in corresponding locations in the memory structure, wherein for any one of the branch nodes, the VALUE parameter is a first predefined function of the VALUE parameters of the child one and zero nodes emanating from said one branch node, the MASK parameter is a second predefined function of MASK parameters of the child one and child zero nodes emanating from said one branch node, and the IMASK parameter is a third predefined function of IMASK parameters of the child one and child zero nodes emanating from said one branch node.

82. The storage medium in claim 81 wherein said first and second functions are each a disjunction function, and said third function is a conjunction function.

83. The storage medium in claim 82 wherein said first and second functions is the disjunction function taken up to the pivot bit position for said one branch node, and the third function is the conjunction function taken up to the pivot bit position for said one branch node.

84. The storage medium in claim 77 wherein the memory structure for the pattern node stores, in separate memory locations, a corresponding one of the pattern values and, as a godparent pointer, the address to a next higher node in the hierarchy associated therewith.

85. The storage medium in claim 84 wherein the memory structure for each of the pattern nodes further comprises parameters for specifying presence and location of a wildcard in a stored pattern value associated with one of said pattern nodes in an associated hierarchy containing and upwardly extending from said each pattern node.

86. The storage medium in claim 85 wherein, for each of the pattern nodes, said parameters comprise values for VALUE, MASK and IMASK parameters stored in corresponding locations in the memory structure, wherein for any one of the pattern nodes, the VALUE parameter is a corresponding one of the stored pattern values, the MASK parameter specifies a wildcard in any bit position in said VALUE parameter for said one pattern node; and the IMASK parameter, if said one pattern node has a hierarchy associated therewith, is a fourth predefined function of the MASK parameter of said one pattern node and the IMASK parameter of a godparent to said one pattern node or, if said one pattern node does not have a hierarchy associated therewith, is set to the MASK parameter of said one pattern node.

87. The storage medium in claim 86 wherein said fourth function is a conjunction function.

88. A method responsive to an input key, for use with a data structure having hierarchically-related pattern values stored therein, said pattern values having wildcards therein, in retrieving one of said pattern values from said data structure which identically matches or subsumes the key,
wherein said data structure has a search trie and a hierarchy forest, said search trie being formed of a plurality of branch nodes organized into a binary search trie extending from a root node therein to said hierarchy forest, said hierarchy forest having a plurality of pattern nodes, each having a different corresponding one of the pattern values associated therewith, and at least one hierarchy of pattern nodes with associated pattern values of increasing generality;
the method comprises the steps of:
traversing along a path through the search trie in order to reach one of the pattern nodes in said hierarchy forest, the path being defined by the input key and pivot bit values associated with ones of said branch nodes; and
determining whether the input key either matches a pattern value associated with said one pattern node or is subsumed by a different pattern value associated with a different one of pattern nodes situated at an increasingly higher level of a hierarchy containing said one pattern node, so as to locate a desired one of the pattern values, stored in the hierarchy, that either identically matches or most specifically subsumes the input key.

89. The method in claim 88 wherein said traversing step comprises the step of tracing along the path by branching from each successive branch node encountered along said path, starting at the root node, in a direction therefrom as specified by a bit of the input key indexed by the pivot bit of said each branch node until said one pattern node is encountered.

90. The method in claim 89 wherein the tracing step comprises the steps of:
examining, when the path reaches said successive branch node, a particular bit in the input key indexed by a value of the pivot bit associated with said successive branch node; and
branching, as specified by a value of the particular bit along either a child zero branch or a child one branch, both branches emanating from the successive branch node, to reach a child one or child zero node as a next node along said path, said next node being either a different one of the branch nodes, having a higher pivot bit associated therewith than that of the successive branch node, or the one pattern node.

91. The method in claim 90 further comprising the steps of, if the key identically matches or is subsumed by the desired one pattern value:
accessing a reference value associated with said desired one pattern value; and
returning the stored reference associated with said desired one pattern value.

92. The method in claim 91 further comprising the steps of:
returning a message, indicative of a no match condition, in the event said input key did not match the pattern value stored in said one pattern node; or
if said one pattern node does have a hierarchy associated therewith, returning a message, indicative of the no match condition, in the event said input key did not match nor was subsumed by the pattern value stored in said one pattern node nor any of the pattern values stored at all increasingly higher levels of the hierarchy.

93. The method in claim 92 further comprising the step of inserting a new pattern node, into said hierarchy forest, for storing a new pattern value in the data structure.

94. The method in claim 93 wherein said inserting step further comprises the steps of:
inserting said new pattern node at a proper hierarchical location within said hierarchy forest, said inserting comprises updating stored parameter values associated with existing ones of the nodes in the data structure such that said new pattern node is situated properly and is fully reachable therethrough; and
if said hierarchy forest contains a wildcard-based pattern, replicating sufficient structure in said search trie, where necessary, based on bit positions where bit disagreements occur among bits in corresponding bit positions in said new pattern and existing pattern values stored in the data structure, such that the new pattern node is reachable over all different paths that, as a result of a wildcard, can be extended through the search trie to the new pattern node.

95. The method in claim 94 wherein each of said branch nodes in said search trie has a corresponding data structure associated therewith, the replicating step comprises the step of defining a data structure for each new branch node formed in said search trie, wherein the defining step comprises the step of:
storing, in corresponding memory locations in said data structure for said new branch node:
a corresponding one of the pivot bits associated with said new branch node;
child zero and child one pointers to child one and child zero nodes; and
values for VALUE, MASK and IMASK parameters.

96. The method in claim 95 wherein said storing step further comprises the steps of:
forming the VALUE parameter as a first predefined function of the VALUE parameters of the child one and zero nodes emanating from said new branch node;
forming the MASK parameter as a second predefined function of MASK parameters of the child one and child zero nodes emanating from said new branch node; and forming the IMASK parameter as a third predefined function of IMASK parameters of the child one and child zero nodes emanating from said new branch node.

97. The method in claim 96 wherein said first and second functions are each a disjunction function, and said third function is a conjunction function.

98. The method in claim 97 wherein said first and second functions is the disjunction function taken up to the pivot bit position for said one branch node, and the third function is the conjunction function taken up to the pivot bit position for said one branch node.

99. The method in claim 94 wherein each of said pattern nodes in said hierarchy forest has a corresponding data structure associated therewith, the inserting step comprises the step of defining a data structure for each new pattern node formed in said hierarchy forest, wherein the defining step comprises the step of storing, in corresponding memory locations in said data structure:

a reference value;

a pointer to a next higher pattern node in a hierarchy containing said new pattern node; and values for VALUE, MASK and IMASK parameters.

100. The method in claim 99 wherein said storing step further comprises the steps of:

setting the VALUE parameter equal to a new pattern value to be stored in said each new pattern node;

forming the MASK parameter to specify a wildcard in any bit position in said VALUE parameter for said each new pattern node; and forming the IMASK parameter as a fourth predefined function of the MASK parameter of said each new pattern node and the IMASK parameter of a godparent to said each new pattern node does not have a hierarchy associated therewith, as the MASK parameter of said each new pattern node.

101. The method in claim 100 wherein said fourth function is a conjunction function.

102. The method in claim 101 further comprising the step of removing an existing pattern node, from said hierarchy forest, so as to remove a pattern value associated therewith from said data structure.

103. The method in claim 102 wherein the removing step comprises the steps of:

eliminating structure from the search trie solely needed to previously support said existing pattern node; and updating stored parameter values associated with remaining ones of the nodes in the data structure such that the existing pattern node is fully removed from the data structure and is not reachable therein.

104. The method in claim 103 wherein each branch node in the search trie has a corresponding data structure associated therewith, the data structure storing in separate fields therein: a corresponding one of the pivot bits associated with said each branch node; child zero and child one pointers to child one and child zero nodes; and values for VALUE, MASK and IMASK parameters; and wherein said updating step for, a remaining one of the branch nodes in the forest, comprises the steps of:

forming the VALUE parameter as a first predefined function of the VALUE parameters of the child one and zero nodes emanating from said remaining one branch node;

forming the MASK parameter as a second predefined function of MASK parameters of the child one and child zero nodes emanating from said remaining one branch node; and forming the IMASK parameter as a third predefined function of IMASK parameters of the child one and child zero nodes emanating from said remaining one branch node.

105. The method in claim 104 wherein said first and second functions are each a disjunction function, and said third function is a conjunction function.

106. The method in claim 105 wherein said first and second functions is the disjunction function taken up to the pivot bit position for said remaining one branch node, and the third function is the conjunction function taken up to the pivot bit position for said remaining one branch node.

107. The method in claim 103 wherein each pattern node in the hierarchy forest has a corresponding data structure associated therewith, the data structure storing in separate fields therein: a reference value; a pointer to a next higher pattern node in a hierarchy containing said new pattern node; and values for VALUE, MASK and IMASK parameters, wherein said updating step for, a remaining one of the pattern nodes in the data structure, comprises the step of:

forming the IMASK parameter as a fourth predefined function of the MASK parameter of said remaining one pattern node and the IMASK parameter of a godparent to said remaining one pattern node does not have a hierarchy associated therewith, as the MASK parameter of said remaining one pattern node.

108. The method in claim 107 wherein said fourth function is a conjunction function.

109. A computer readable medium having computer executable instructions stored therein for performing the steps recited in claim 88.

110. Apparatus, responsive to an input key, for use in a computer system, having a processor, for retrieving a pattern value from a data structure having stored wildcard-based pattern values therein such that the retrieved pattern identically matches or subsumes the key, wherein the apparatus comprises:

the processor, and a memory having executable instructions and a data structure stored therein; the data structure having a search trie and a hierarchy forest, said search trie being formed of a plurality of branch nodes organized into a binary search trie extending from a root node therein to said hierarchy forest, said hierarchy forest having a plurality of pattern nodes, each having a different corresponding one of the pattern values associated therewith, organized into at least one hierarchy of pattern nodes with associated pattern values of increasing generality wherein at least one of the pattern values in the hierarchy contains a wildcard; and wherein the processor, in response to the stored instructions:

traverses along a path through the search trie in order to reach one of the pattern nodes in said hierarchy forest, the path being defined by the input key and pivot bit values associated with ones of said branch nodes; and determines whether the input key either matches a pattern value associated with said one pattern node or is subsumed by a different pattern value associated with a different one of pattern nodes situated at an increasingly higher level of a hierarchy containing said one pattern node, so as to locate a desired one of the pattern values, stored in the hierarchy, that either identically matches or most specifically subsumes the input key.

111. The apparatus in claim 110 wherein the processor, in response to the stored instructions, traces along the path by branching from each successive branch node encountered along said path, starting at the root node, in a direction therefrom as specified by a bit of the input key indexed by the pivot bit of said each branch node until said one pattern node is encountered.

112. The apparatus in claim 111 wherein the processor, in response to the stored instructions:

examines, when the path reaches said successive branch node, a particular bit in the input key indexed by a value of the pivot bit associated with said successive branch node; and branches, as specified by a value of the particular bit along either a child zero branch or a child one branch, both child branches emanating from the successive branch node, to reach a child one or child zero node as a next node along said path, said next node being either a different one of the branch nodes, having a higher pivot bit associated therewith than that of the successive branch node, or the one pattern node.

113. The apparatus in claim 112 wherein the processor, in response to the stored instructions, if the key identically or is subsumed by the desired one pattern value:

accesses a reference value associated with said desired one pattern value; and returns the stored reference associated with said desired one pattern value.

114. The apparatus in claim 113 wherein the processor, in response to the stored instructions, returns a message, indicative of the no match condition, in the event said input key did not match nor was subsumed by the pattern value stored in said one pattern node nor in any of the pattern values stored at all increasingly higher levels of the hierarchy.

115. The apparatus in claim 114 wherein the processor, in response to the stored instructions, inserts a new pattern node, into said hierarchy forest, for storing a new pattern value in the data structure.

116. The apparatus in claim 115 wherein the processor, in response to the stored instructions:

inserts said new pattern node at a proper hierarchical location within said hierarchy forest, and, through so doing, updates stored parameter values associated with existing ones of the nodes in the data structure such that said new pattern node is situated properly and is fully reachable therethrough; and if said hierarchy forest contains a wildcard-based pattern, replicates sufficient structure in said search trie, where necessary, based on bit positions where bit disagreements occur among bits in corresponding bit positions in said new pattern and existing pattern values stored in the data structure, such that the new pattern node is reachable over all different paths that, as a result of a wildcard, can be extended through the search trie to the new pattern node.

117. The apparatus in claim 116 wherein each of said branch nodes in said search trie has a corresponding data structure associated therewith, and the processor, in response to the stored instructions, defines a data structure for each new branch node formed in said search trie, and through so doing stores, in corresponding memory locations in said data structure for said new branch node:

a corresponding one of the pivot bits associated with said new branch node;

child zero and child one pointers to child one and child zero nodes; and values for VALUE, MASK and IMASK parameters.

118. The apparatus in claim 117 wherein the processor, in response to the stored instructions:

forms the VALUE parameter as a first predefined function of the VALUE parameters of the child one and zero nodes emanating from said new branch node;

forms the MASK parameter as a second predefined function of MASK parameters of the child one and child zero nodes emanating from said new branch node; and forms the IMASK parameter as a third predefined function of IMASK parameters of the child one and child zero nodes emanating from said new branch node.

119. The apparatus in claim 118 wherein said first and second functions are each a disjunction function, and said third function is a conjunction function.

120. The apparatus in claim 119 wherein said first and second functions is the disjunction function taken up to the pivot bit position for said one branch node, and the third function is the conjunction function taken up to the pivot bit position for said one branch node.

121. The apparatus in claim 116 wherein each of said pattern nodes in said hierarchy forest has a corresponding data structure associated therewith, and the processor, in response to the stored instructions, defines a data structure for each new pattern node formed in said hierarchy forest, and through so doing stores, in corresponding memory locations in said data structure:

a reference value;

a pointer to a next higher pattern node in a hierarchy containing said new pattern node; and values for VALUE, MASK and IMASK parameters.

122. The apparatus in claim 121 wherein the processor, in response to the stored instructions:

sets the VALUE parameter equal to a new pattern value to be stored in said each new pattern node;

forms the MASK parameter to specify a wildcard in any bit position in said VALUE parameter for said each new pattern node; and forms the IMASK parameter as a fourth predefined function of the MASK parameter of said each new pattern node and the IMASK parameter of a godparent to said each new pattern node.

123. The apparatus in claim 122 wherein said fourth function is a conjunction function.

124. The apparatus in claim 114 wherein the processor, in response to the stored instructions, removes an existing pattern node, from said hierarchy forest, so as to remove a pattern value associated therewith from said data structure.

125. The apparatus in claim 124 wherein the processor, in response to the stored instructions:

eliminates structure from the search trie solely needed to previously support said existing pattern node; and updates stored parameter values associated with remaining ones of the nodes in the data structure such that the existing pattern node is fully removed from the data structure and is not reachable therein.

126. The apparatus in claim 125 wherein each branch node in the search trie has a corresponding data structure associated therewith, the data structure storing in separate fields therein: a corresponding one of the pivot bits associated with said each branch node; child zero and child one pointers to child one and child zero nodes; and values for VALUE, MASK and IMASK parameters; and wherein the processor, in response to the stored instructions for, a remaining one of the branch nodes in the forest:

forms the VALUE parameter as a first predefined function of the VALUE parameters of the child one and zero nodes emanating from said remaining one branch node;

forms the MASK parameter as a second predefined function of MASK parameters of the child one and child zero nodes emanating from said remaining one branch node; and forms the IMASK parameter as a third predefined function of IMASK parameters of the child one and child zero nodes emanating from said remaining one branch node.

127. The apparatus in claim 126 wherein said first and second functions are each a disjunction function, and said third function is a conjunction function.

128. The apparatus in claim 127 wherein said first and second functions is the disjunction function taken up to the pivot bit position for said remaining one branch node, and the third function is the conjunction function taken up to the pivot bit position for said remaining one branch node.

129. The apparatus in claim 125 wherein each pattern node in the hierarchy forest has a corresponding data structure associated therewith, the data structure storing in separate fields therein: a reference value; a pointer to a next higher pattern node in a hierarchy containing said new pattern node; and values for VALUE, MASK and IMASK parameters, wherein the processor, in response to the stored instructions and for a remaining one of the pattern nodes in the data structure, forms the IMASK parameter as a fourth predefined function of the MASK parameter of said remaining one pattern node and the IMASK parameter of a godparent to said remaining one pattern node.

130. The apparatus in claim 129 wherein said fourth function is a conjunction function.

\* \* \* \* \*

UNITED STATES PATENT AND TRADEMARK OFFICE
CERTIFICATE OF CORRECTION

PATENT NO : 5,995,971
DATED : November 30, 1999
INVENTOR(S): John R. DOUCEUR, Ofer BAR, Yoram BERNET It is certified that error appears in the above-identified patent and that said Letters Patent are hereby corrected as shown below:

Title page, item [73], Change "Micdrosoft" to --Microsoft--;

Column 4, line 12 Delete "data"; and

Column 7, line 57 Change "Remove" to --Removal--.

Signed and Sealed this

Twenty-second Day of May, 2001

Attest:

NICHOLAS P. GODICI

*Attesting Officer*  *Acting Director of the United States Patent and Trademark Office*